United States Patent
Briggs et al.

(12)

(10) Patent No.: US 8,997,362 B2
(45) Date of Patent: Apr. 7, 2015

(54) PORTABLE ARTICULATED ARM COORDINATE MEASURING MACHINE WITH OPTICAL COMMUNICATIONS BUS

(71) Applicant: FARO Technologies, Inc., Lake Mary, FL (US)

(72) Inventors: Clark H. Briggs, DeLand, FL (US); Frederick York, Longwood, FL (US)

(73) Assignee: FARO Technologies, Inc., Lake Mary, FL (US)

( * ) Notice: Subject to any disclaimer, the term of this patent is extended or adjusted under 35 U.S.C. 154(b) by 192 days.

(21) Appl. No.: 13/796,837

(22) Filed: Mar. 12, 2013

(65) Prior Publication Data

US 2014/0101953 A1    Apr. 17, 2014

Related U.S. Application Data

(60) Provisional application No. 61/672,365, filed on Jul. 17, 2012, provisional application No. 61/683,424, filed on Aug. 15, 2012.

(51) Int. Cl.
| | |
|---|---|
| *G01B 11/03* | (2006.01) |
| *G01B 5/008* | (2006.01) |
| *G01B 11/00* | (2006.01) |

(Continued)

(52) U.S. Cl.
CPC .............. *G01B 5/008* (2013.01); *G01B 11/005* (2013.01); *G02B 6/32* (2013.01); *G02B 6/3604* (2013.01)

(58) Field of Classification Search
CPC ....... G01B 5/008; G01B 7/008; G01B 11/005

USPC ............................................ 33/503; 356/614
See application file for complete search history.

(56) References Cited

U.S. PATENT DOCUMENTS

| | | | |
|---|---|---|---|
| 1,535,312 | A | 4/1925 | Hosking |
| 1,538,758 | A | 5/1925 | Taylor |
| 1,918,813 | A | 7/1933 | Kinzy |

(Continued)

FOREIGN PATENT DOCUMENTS

| | | |
|---|---|---|
| AU | 2005200937 A1 | 9/2006 |
| CN | 2236119 | 9/1996 |

(Continued)

OTHER PUBLICATIONS

German Patent Application No. 11 2011 100 291.2 dated Dec. 20, 2012.

(Continued)

*Primary Examiner* — Christopher Fulton
(74) *Attorney, Agent, or Firm* — Cantor Colburn LLP

(57) ABSTRACT

A portable articulated arm coordinate measurement machine (AACMM) having opposed first and second ends and a plurality of connected arm segments each having at least one position transducer for producing a position signal; an electronic circuit configured to receive the position signals; a first bus for communication with the electronic circuit, wherein at least a portion of the first bus is an optical communication bus configured to transmit light; and a rotary coupler having a first portion and a second portion, the second portion configured to rotate relative to the first portion, the first portion affixed to the first arm segment, the rotary coupler configured to transfer signals on the optical communication bus between the first portion and the second portion.

20 Claims, 26 Drawing Sheets

(51) Int. Cl.
*G02B 6/36* (2006.01)
*G02B 6/32* (2006.01)

(56) References Cited

U.S. PATENT DOCUMENTS

| | | |
|---|---|---|
| 2,316,573 A | 4/1943 | Egy |
| 2,333,243 A | 11/1943 | Glab |
| 2,702,683 A | 2/1955 | Green et al. |
| 2,748,926 A | 6/1956 | Leahy |
| 2,924,495 A | 2/1960 | Haines |
| 2,966,257 A | 12/1960 | Littlejohn |
| 2,983,367 A | 5/1961 | Paramater et al. |
| 3,066,790 A | 12/1962 | Armbruster |
| 3,447,852 A | 6/1969 | Barlow |
| 3,458,167 A | 7/1969 | Cooley, Jr. |
| 3,830,567 A | 8/1974 | Riegl |
| 3,899,145 A | 8/1975 | Stephenson |
| 3,945,729 A | 3/1976 | Rosen |
| 4,138,045 A | 2/1979 | Baker |
| 4,178,515 A | 12/1979 | Tarasevich |
| 4,340,008 A | 7/1982 | Mendelson |
| 4,379,461 A | 4/1983 | Nilsson et al. |
| 4,424,899 A | 1/1984 | Rosenberg |
| 4,430,796 A | 2/1984 | Nakagawa |
| 4,457,625 A | 7/1984 | Greenleaf et al. |
| 4,506,448 A | 3/1985 | Topping et al. |
| 4,537,233 A | 8/1985 | Vroonland et al. |
| 4,606,696 A | 8/1986 | Slocum |
| 4,659,280 A | 4/1987 | Akeel |
| 4,663,852 A | 5/1987 | Guarini |
| 4,664,588 A | 5/1987 | Newell et al. |
| 4,676,002 A | 6/1987 | Slocum |
| 4,714,339 A | 12/1987 | Lau et al. |
| 4,733,961 A | 3/1988 | Mooney |
| 4,736,218 A | 4/1988 | Kutman |
| 4,751,950 A | 6/1988 | Bock |
| 4,767,257 A | 8/1988 | Kato |
| 4,790,651 A | 12/1988 | Brown et al. |
| 4,816,822 A | 3/1989 | Vache et al. |
| 4,870,274 A | 9/1989 | Hebert et al. |
| 4,882,806 A | 11/1989 | Davis |
| 4,954,952 A | 9/1990 | Ubhayakar et al. |
| 4,982,841 A | 1/1991 | Goedecke |
| 4,984,881 A | 1/1991 | Osada et al. |
| 4,996,909 A | 3/1991 | Vache et al. |
| 5,025,966 A | 6/1991 | Potter |
| 5,027,951 A | 7/1991 | Johnson |
| 5,069,524 A | 12/1991 | Watanabe et al. |
| 5,155,684 A | 10/1992 | Burke et al. |
| 5,168,532 A | 12/1992 | Seppi et al. |
| 5,189,797 A | 3/1993 | Granger |
| 5,205,111 A | 4/1993 | Johnson |
| 5,211,476 A | 5/1993 | Coudroy |
| 5,213,240 A | 5/1993 | Dietz et al. |
| 5,218,427 A | 6/1993 | Koch |
| 5,219,423 A | 6/1993 | Kamaya |
| 5,239,855 A | 8/1993 | Schleifer et al. |
| 5,289,264 A | 2/1994 | Steinbichler |
| 5,289,855 A | 3/1994 | Baker et al. |
| 5,313,261 A | 5/1994 | Leatham et al. |
| 5,319,445 A | 6/1994 | Fitts |
| 5,329,347 A | 7/1994 | Wallace et al. |
| 5,329,467 A | 7/1994 | Nagamune et al. |
| 5,332,315 A | 7/1994 | Baker et al. |
| 5,371,347 A | 12/1994 | Plesko |
| 5,372,250 A | 12/1994 | Johnson |
| 5,373,346 A | 12/1994 | Hocker |
| 5,402,365 A | 3/1995 | Kozikaro et al. |
| 5,402,582 A | 4/1995 | Raab |
| 5,412,880 A | 5/1995 | Raab |
| 5,430,384 A | 7/1995 | Hocker |
| 5,446,846 A | 8/1995 | Lennartsson |
| 5,455,670 A | 10/1995 | Payne et al. |
| 5,455,993 A | 10/1995 | Link et al. |
| 5,510,977 A | 4/1996 | Raab |
| 5,517,297 A | 5/1996 | Stenton |
| 5,528,354 A | 6/1996 | Uwira |
| 5,528,505 A | 6/1996 | Granger et al. |
| 5,535,524 A | 7/1996 | Carrier et al. |
| 5,611,147 A | 3/1997 | Raab |
| 5,623,416 A | 4/1997 | Hocker, III |
| 5,629,756 A | 5/1997 | Kitajima |
| 5,668,631 A | 9/1997 | Norita et al. |
| 5,675,326 A | 10/1997 | Juds et al. |
| 5,677,760 A | 10/1997 | Mikami et al. |
| 5,682,508 A | 10/1997 | Hocker, III |
| 5,716,036 A | 2/1998 | Isobe et al. |
| 5,724,264 A | 3/1998 | Rosenberg et al. |
| 5,734,417 A | 3/1998 | Yamamoto et al. |
| 5,745,225 A | 4/1998 | Watanabe et al. |
| 5,752,112 A | 5/1998 | Paddock et al. |
| 5,754,449 A | 5/1998 | Hoshal et al. |
| 5,768,792 A | 6/1998 | Raab |
| 5,793,993 A | 8/1998 | Broedner et al. |
| 5,829,148 A | 11/1998 | Eaton |
| 5,831,719 A | 11/1998 | Berg et al. |
| 5,832,416 A | 11/1998 | Anderson |
| 5,844,591 A | 12/1998 | Takamatsu et al. |
| 5,887,122 A | 3/1999 | Terawaki et al. |
| 5,894,123 A | 4/1999 | Ohtomo et al. |
| 5,898,490 A | 4/1999 | Ohtomo et al. |
| 5,909,939 A | 6/1999 | Fugmann |
| 5,926,782 A | 7/1999 | Raab |
| 5,933,267 A | 8/1999 | Ishizuka |
| 5,936,721 A | 8/1999 | Ohtomo et al. |
| 5,940,170 A | 8/1999 | Berg et al. |
| 5,940,181 A | 8/1999 | Tsubono et al. |
| 5,949,530 A | 9/1999 | Wetteborn |
| 5,956,857 A | 9/1999 | Raab |
| 5,969,321 A | 10/1999 | Danielson et al. |
| 5,973,788 A | 10/1999 | Pettersen et al. |
| 5,978,748 A | 11/1999 | Raab |
| 5,983,936 A | 11/1999 | Schwieterman et al. |
| 5,988,862 A | 11/1999 | Kacyra et al. |
| 5,991,011 A | 11/1999 | Damm |
| 5,996,790 A | 12/1999 | Yamada et al. |
| 5,997,779 A | 12/1999 | Potter |
| 6,040,898 A | 3/2000 | Mrosik et al. |
| D423,534 S | 4/2000 | Raab et al. |
| 6,050,615 A | 4/2000 | Weinhold |
| 6,057,915 A | 5/2000 | Squire et al. |
| 6,060,889 A | 5/2000 | Hocker |
| 6,067,116 A | 5/2000 | Yamano et al. |
| 6,069,700 A | 5/2000 | Rudnick et al. |
| 6,077,306 A | 6/2000 | Metzger et al. |
| 6,115,511 A | 9/2000 | Sakai et al. |
| 6,125,337 A | 9/2000 | Rosenberg et al. |
| 6,131,299 A | 10/2000 | Raab et al. |
| 6,138,915 A | 10/2000 | Danielson et al. |
| 6,149,112 A | 11/2000 | Thieltges |
| 6,151,789 A | 11/2000 | Raab et al. |
| 6,163,294 A | 12/2000 | Talbot |
| 6,166,504 A | 12/2000 | Iida et al. |
| 6,166,809 A | 12/2000 | Pettersen et al. |
| 6,166,811 A | 12/2000 | Long et al. |
| 6,204,651 B1 | 3/2001 | Marcus et al. |
| 6,204,961 B1 | 3/2001 | Anderson et al. |
| 6,219,928 B1 | 4/2001 | Raab et al. |
| D441,632 S | 5/2001 | Raab et al. |
| 6,240,651 B1 | 6/2001 | Schroeder et al. |
| 6,253,458 B1 | 7/2001 | Raab et al. |
| 6,282,195 B1 | 8/2001 | Miller et al. |
| 6,298,569 B1 | 10/2001 | Raab et al. |
| 6,349,249 B1 | 2/2002 | Cunningham |
| 6,366,831 B1 | 4/2002 | Raab |
| 6,408,252 B1 | 6/2002 | De Smet |
| 6,418,774 B1 | 7/2002 | Brogaardh et al. |
| 6,438,507 B1 | 8/2002 | Imai |
| 6,438,856 B1 | 8/2002 | Kaczynski |
| 6,442,419 B1 | 8/2002 | Chu et al. |
| 6,445,446 B1 | 9/2002 | Kumagai et al. |
| 6,470,584 B1 | 10/2002 | Stoodley |
| 6,477,784 B2 | 11/2002 | Schroeder et al. |
| 6,480,270 B1 | 11/2002 | Studnicka et al. |

(56) References Cited

U.S. PATENT DOCUMENTS

| | | |
|---|---|---|
| 6,483,106 B1 | 11/2002 | Ohtomo et al. |
| 6,497,394 B1 | 12/2002 | Dunchock |
| 6,504,602 B1 | 1/2003 | Hinderling |
| 6,512,575 B1 | 1/2003 | Marchi |
| 6,519,860 B1 | 2/2003 | Bieg et al. |
| D472,824 S | 4/2003 | Raab et al. |
| 6,547,397 B1 | 4/2003 | Kaufman et al. |
| 6,598,306 B2 | 7/2003 | Eaton |
| 6,611,346 B2 | 8/2003 | Granger |
| 6,611,617 B1 | 8/2003 | Crampton |
| 6,612,044 B2 | 9/2003 | Raab et al. |
| 6,621,065 B1 | 9/2003 | Fukumoto et al. |
| 6,626,339 B2 | 9/2003 | Gates et al. |
| 6,633,051 B1 | 10/2003 | Holloway et al. |
| 6,649,208 B2 | 11/2003 | Rodgers |
| 6,650,402 B2 | 11/2003 | Sullivan et al. |
| 6,668,466 B1 | 12/2003 | Bieg et al. |
| 6,675,122 B1 | 1/2004 | Markendorf et al. |
| 6,681,495 B2 | 1/2004 | Masayuki et al. |
| 6,710,859 B2 | 3/2004 | Shirai et al. |
| D491,210 S | 6/2004 | Raab et al. |
| 6,750,873 B1 | 6/2004 | Bernardini et al. |
| 6,753,876 B2 | 6/2004 | Brooksby et al. |
| 6,759,649 B2 | 7/2004 | Hipp |
| 6,759,979 B2 | 7/2004 | Vashisth et al. |
| 6,764,185 B1 | 7/2004 | Beardsley et al. |
| 6,789,327 B2 | 9/2004 | Roth et al. |
| 6,820,346 B2 | 11/2004 | Raab et al. |
| 6,822,749 B1 | 11/2004 | Christoph |
| 6,825,923 B2 | 11/2004 | Hamar et al. |
| 6,826,664 B2 | 11/2004 | Hocker, III et al. |
| 6,847,436 B2 | 1/2005 | Bridges |
| 6,856,381 B2 | 2/2005 | Christoph |
| 6,858,836 B1 | 2/2005 | Hartrumpf |
| 6,859,269 B2 | 2/2005 | Ohtomo et al. |
| 6,862,097 B2 | 3/2005 | Yanagisawa et al. |
| 6,868,359 B2 | 3/2005 | Raab |
| 6,879,933 B2 | 4/2005 | Steffey et al. |
| 6,892,465 B2 | 5/2005 | Raab et al. |
| 6,894,767 B2 | 5/2005 | Ishinabe et al. |
| 6,895,347 B2 | 5/2005 | Dorny et al. |
| 6,901,673 B1 | 6/2005 | Cobb et al. |
| 6,904,691 B2 | 6/2005 | Raab et al. |
| 6,917,415 B2 | 7/2005 | Gogolla et al. |
| 6,920,697 B2 | 7/2005 | Raab et al. |
| 6,925,722 B2 | 8/2005 | Raab et al. |
| 6,931,745 B2 | 8/2005 | Granger |
| 6,935,036 B2 | 8/2005 | Raab et al. |
| 6,935,748 B2 | 8/2005 | Kaufman et al. |
| 6,948,255 B2 | 9/2005 | Russell |
| 6,965,843 B2 | 11/2005 | Raab et al. |
| 6,989,890 B2 | 1/2006 | Riegl et al. |
| 7,003,892 B2 | 2/2006 | Eaton et al. |
| 7,006,084 B1 | 2/2006 | Buss et al. |
| 7,024,032 B2 | 4/2006 | Kidd et al. |
| 7,029,126 B2 | 4/2006 | Tang |
| 7,032,321 B2 | 4/2006 | Raab et al. |
| 7,040,136 B2 | 5/2006 | Forss et al. |
| 7,051,447 B2 | 5/2006 | Kikuchi et al. |
| 7,069,124 B1 | 6/2006 | Whittaker et al. |
| 7,076,420 B1 | 7/2006 | Snyder et al. |
| 7,106,421 B2 | 9/2006 | Matsuura et al. |
| 7,117,107 B2 | 10/2006 | Dorny et al. |
| 7,120,092 B2 | 10/2006 | del Prado Pavon et al. |
| 7,127,822 B2 | 10/2006 | Kumagai et al. |
| 7,136,153 B2 | 11/2006 | Mori et al. |
| 7,140,213 B2 | 11/2006 | Feucht et al. |
| 7,142,289 B2 | 11/2006 | Ando et al. |
| 7,145,926 B2 | 12/2006 | Vitruk et al. |
| 7,152,456 B2 | 12/2006 | Eaton |
| 7,174,651 B2 | 2/2007 | Raab et al. |
| 7,180,072 B2 | 2/2007 | Persi et al. |
| 7,184,047 B1 | 2/2007 | Crampton |
| 7,190,465 B2 | 3/2007 | Froehlich et al. |
| 7,191,541 B1 | 3/2007 | Weekers et al. |
| 7,193,690 B2 | 3/2007 | Ossig et al. |
| 7,196,509 B2 | 3/2007 | Teng |
| 7,199,872 B2 | 4/2007 | Van Cranenbroeck |
| 7,200,246 B2 | 4/2007 | Cofer et al. |
| 7,202,941 B2 | 4/2007 | Munro |
| 7,230,689 B2 | 6/2007 | Lau |
| 7,242,590 B1 | 7/2007 | Yeap et al. |
| 7,246,030 B2 | 7/2007 | Raab et al. |
| 7,249,421 B2 | 7/2007 | MacManus et al. |
| 7,256,899 B1 | 8/2007 | Faul et al. |
| 7,269,910 B2 | 9/2007 | Raab et al. |
| 7,285,793 B2 | 10/2007 | Husted |
| 7,296,364 B2 | 11/2007 | Seitz et al. |
| 7,296,955 B2 | 11/2007 | Dreier |
| 7,296,979 B2 | 11/2007 | Raab et al. |
| 7,306,339 B2 | 12/2007 | Kaufman et al. |
| 7,307,701 B2 | 12/2007 | Hoffman, II |
| 7,312,862 B2 | 12/2007 | Zumbrunn et al. |
| 7,313,264 B2 | 12/2007 | Crampton |
| 7,319,512 B2 | 1/2008 | Ohtomo et al. |
| 7,330,242 B2 | 2/2008 | Reichert et al. |
| 7,337,344 B2 | 2/2008 | Barman et al. |
| 7,348,822 B2 | 3/2008 | Baer |
| 7,352,446 B2 | 4/2008 | Bridges et al. |
| 7,360,648 B1 | 4/2008 | Blaschke |
| 7,372,558 B2 | 5/2008 | Kaufman et al. |
| 7,372,581 B2 | 5/2008 | Raab et al. |
| 7,383,638 B2 | 6/2008 | Granger |
| 7,388,654 B2 | 6/2008 | Raab et al. |
| 7,389,870 B2 | 6/2008 | Slappay |
| 7,395,606 B2 | 7/2008 | Crampton |
| 7,400,384 B1 | 7/2008 | Evans et al. |
| 7,403,269 B2 | 7/2008 | Yamashita et al. |
| 7,430,068 B2 | 9/2008 | Becker et al. |
| 7,430,070 B2 | 9/2008 | Soreide et al. |
| 7,441,341 B2 | 10/2008 | Eaton |
| 7,443,555 B2 | 10/2008 | Blug et al. |
| 7,447,931 B1 | 11/2008 | Rischar et al. |
| 7,449,876 B2 | 11/2008 | Pleasant et al. |
| 7,454,265 B2 | 11/2008 | Marsh |
| 7,463,368 B2 | 12/2008 | Morden et al. |
| 7,477,359 B2 | 1/2009 | England et al. |
| 7,480,037 B2 | 1/2009 | Palmateer et al. |
| 7,508,496 B2 | 3/2009 | Mettenleiter et al. |
| 7,508,971 B2 | 3/2009 | Vaccaro et al. |
| 7,515,256 B2 | 4/2009 | Ohtomo et al. |
| 7,525,276 B2 | 4/2009 | Eaton |
| 7,527,205 B2 | 5/2009 | Zhu et al. |
| 7,528,768 B2 | 5/2009 | Wakayama et al. |
| 7,541,830 B2 | 6/2009 | Fahrbach et al. |
| 7,545,517 B2 | 6/2009 | Rueb et al. |
| 7,546,689 B2 | 6/2009 | Ferrari et al. |
| 7,551,771 B2 | 6/2009 | England, III |
| 7,552,644 B2 | 6/2009 | Haase et al. |
| 7,557,824 B2 | 7/2009 | Holliman |
| 7,561,598 B2 | 7/2009 | Stratton et al. |
| 7,564,250 B2 | 7/2009 | Hocker |
| 7,568,293 B2 | 8/2009 | Ferrari |
| 7,578,069 B2 | 8/2009 | Eaton |
| D599,226 S | 9/2009 | Gerent et al. |
| 7,589,595 B2 | 9/2009 | Cutler |
| 7,589,825 B2 | 9/2009 | Orchard et al. |
| 7,591,077 B2 | 9/2009 | Pettersson |
| 7,591,078 B2 | 9/2009 | Crampton |
| 7,599,106 B2 | 10/2009 | Matsumoto et al. |
| 7,600,061 B2 | 10/2009 | Honda |
| 7,602,873 B2 | 10/2009 | Eidson |
| 7,604,207 B2 | 10/2009 | Hasloecher et al. |
| 7,610,175 B2 | 10/2009 | Eidson |
| 7,614,157 B2 | 11/2009 | Granger |
| 7,624,510 B2 | 12/2009 | Ferrari |
| 7,625,335 B2 | 12/2009 | Deichmann et al. |
| 7,626,690 B2 | 12/2009 | Kumagai et al. |
| D607,350 S | 1/2010 | Cooduvalli et al. |
| 7,656,751 B2 | 2/2010 | Rischar et al. |
| 7,659,995 B2 | 2/2010 | Knighton et al. |
| 7,693,325 B2 | 4/2010 | Pulla et al. |
| 7,697,748 B2 | 4/2010 | Dimsdale |
| 7,701,592 B2 | 4/2010 | Saint Clair et al. |

(56) References Cited

U.S. PATENT DOCUMENTS

| | | |
|---|---|---|
| 7,712,224 B2 | 5/2010 | Hicks |
| 7,721,396 B2 | 5/2010 | Fleischman |
| 7,728,833 B2 | 6/2010 | Verma et al. |
| 7,728,963 B2 | 6/2010 | Kirschner |
| 7,733,544 B2 | 6/2010 | Becker et al. |
| 7,735,234 B2 | 6/2010 | Briggs et al. |
| 7,743,524 B2 | 6/2010 | Eaton et al. |
| 7,752,003 B2 | 7/2010 | MacManus |
| 7,756,615 B2 | 7/2010 | Barfoot et al. |
| 7,765,707 B2 | 8/2010 | Tomelleri |
| 7,769,559 B2 | 8/2010 | Reichert |
| 7,774,949 B2 | 8/2010 | Ferrari |
| 7,779,548 B2 | 8/2010 | Ferrari |
| 7,779,553 B2 | 8/2010 | Jordil et al. |
| 7,784,194 B2 | 8/2010 | Raab et al. |
| 7,787,670 B2 | 8/2010 | Urushiya |
| 7,793,425 B2 | 9/2010 | Bailey |
| 7,798,453 B2 | 9/2010 | Maningo et al. |
| 7,800,758 B1 | 9/2010 | Bridges et al. |
| 7,804,602 B2 | 9/2010 | Raab |
| 7,805,851 B2 | 10/2010 | Pettersson |
| 7,805,854 B2 | 10/2010 | Eaton |
| 7,809,518 B2 | 10/2010 | Zhu et al. |
| 7,834,985 B2 | 11/2010 | Morcom |
| 7,847,922 B2 | 12/2010 | Gittinger et al. |
| RE42,055 E | 1/2011 | Raab et al. |
| 7,869,005 B2 | 1/2011 | Ossig et al. |
| RE42,082 E | 2/2011 | Raab et al. |
| 7,881,896 B2 | 2/2011 | Atwell et al. |
| 7,889,324 B2 | 2/2011 | Yamamoto |
| 7,900,714 B2 | 3/2011 | Milbourne et al. |
| 7,903,245 B2 | 3/2011 | Miousset et al. |
| 7,903,261 B2 | 3/2011 | Saint Clair et al. |
| 7,908,757 B2 | 3/2011 | Ferrari |
| 7,933,055 B2 | 4/2011 | Jensen et al. |
| 7,935,928 B2 | 5/2011 | Serger et al. |
| 7,965,747 B2 | 6/2011 | Kumano |
| 7,982,866 B2 | 7/2011 | Vogel |
| 7,990,397 B2 | 8/2011 | Bukowski et al. |
| 7,994,465 B1 | 8/2011 | Bamji et al. |
| 7,995,834 B1 | 8/2011 | Knighton et al. |
| 8,001,697 B2 | 8/2011 | Danielson et al. |
| 8,020,657 B2 | 9/2011 | Allard et al. |
| 8,022,812 B2 | 9/2011 | Beniyama et al. |
| 8,028,432 B2 | 10/2011 | Bailey et al. |
| 8,036,775 B2 | 10/2011 | Matsumoto et al. |
| 8,045,762 B2 | 10/2011 | Otani et al. |
| 8,051,710 B2 | 11/2011 | Van Dam et al. |
| 8,052,857 B2 | 11/2011 | Townsend |
| 8,064,046 B2 | 11/2011 | Ossig et al. |
| 8,065,861 B2 | 11/2011 | Caputo |
| 8,082,673 B2 | 12/2011 | Desforges et al. |
| 8,099,877 B2 | 1/2012 | Champ |
| 8,117,668 B2 | 2/2012 | Crampton et al. |
| 8,123,350 B2 | 2/2012 | Cannell et al. |
| 8,152,071 B2 | 4/2012 | Doherty et al. |
| 8,179,936 B2 | 5/2012 | Bueche et al. |
| 8,218,131 B2 | 7/2012 | Otani et al. |
| 8,224,032 B2 | 7/2012 | Fuchs et al. |
| 8,260,483 B2 | 9/2012 | Barfoot et al. |
| 8,269,984 B2 | 9/2012 | Hinderling et al. |
| 8,310,653 B2 | 11/2012 | Ogawa et al. |
| 8,321,612 B2 | 11/2012 | Hartwich et al. |
| 8,346,480 B2 | 1/2013 | Trepagnier et al. |
| 8,352,212 B2 | 1/2013 | Fetter et al. |
| 8,353,059 B2 | 1/2013 | Crampton et al. |
| 8,379,191 B2 | 2/2013 | Braunecker et al. |
| 8,381,704 B2 | 2/2013 | Debelak et al. |
| 8,384,914 B2 | 2/2013 | Becker et al. |
| 8,391,565 B2 | 3/2013 | Purcell et al. |
| 8,422,035 B2 | 4/2013 | Hinderling et al. |
| 8,533,967 B2 | 9/2013 | Bailey et al. |
| 8,645,022 B2 | 2/2014 | Yoshimura et al. |
| 8,659,748 B2 | 2/2014 | Dakin et al. |
| 8,659,752 B2 | 2/2014 | Cramer et al. |
| 8,699,007 B2 | 4/2014 | Becker et al. |
| 8,705,012 B2 | 4/2014 | Greiner et al. |
| 8,705,016 B2 | 4/2014 | Schumann et al. |
| 8,718,837 B2 | 5/2014 | Wang et al. |
| 8,784,425 B2 | 7/2014 | Ritchey et al. |
| 8,830,485 B2 | 9/2014 | Woloschyn |
| 2001/0004269 A1 | 6/2001 | Shibata et al. |
| 2002/0032541 A1 | 3/2002 | Raab et al. |
| 2002/0059042 A1 | 5/2002 | Kacyra et al. |
| 2002/0087233 A1 | 7/2002 | Raab |
| 2002/0128790 A1 | 9/2002 | Woodmansee |
| 2002/0143506 A1 | 10/2002 | D'Aligny et al. |
| 2002/0149694 A1 | 10/2002 | Seo |
| 2002/0170192 A1 | 11/2002 | Steffey et al. |
| 2002/0176097 A1 | 11/2002 | Rodgers |
| 2003/0033104 A1 | 2/2003 | Gooche |
| 2003/0043386 A1 | 3/2003 | Froehlich et al. |
| 2003/0053037 A1 | 3/2003 | Blaesing-Bangert et al. |
| 2003/0066954 A1 | 4/2003 | Hipp |
| 2003/0090646 A1 | 5/2003 | Riegl et al. |
| 2003/0125901 A1 | 7/2003 | Steffey et al. |
| 2003/0137449 A1 | 7/2003 | Vashisth et al. |
| 2003/0142631 A1 | 7/2003 | Silvester |
| 2003/0167647 A1 | 9/2003 | Raab et al. |
| 2003/0172536 A1 | 9/2003 | Raab et al. |
| 2003/0172537 A1 | 9/2003 | Raab et al. |
| 2003/0179361 A1 | 9/2003 | Ohtomo et al. |
| 2003/0208919 A1 | 11/2003 | Raab et al. |
| 2003/0221326 A1 | 12/2003 | Raab et al. |
| 2004/0022416 A1 | 2/2004 | Lemelson et al. |
| 2004/0027554 A1 | 2/2004 | Ishinabe et al. |
| 2004/0040166 A1 | 3/2004 | Raab et al. |
| 2004/0103547 A1 | 6/2004 | Raab et al. |
| 2004/0111908 A1 | 6/2004 | Raab et al. |
| 2004/0135990 A1 | 7/2004 | Ohtomo et al. |
| 2004/0139265 A1 | 7/2004 | Hocker et al. |
| 2004/0158355 A1 | 8/2004 | Holmqvist et al. |
| 2004/0162700 A1 | 8/2004 | Rosenberg et al. |
| 2004/0179570 A1 | 9/2004 | Vitruk et al. |
| 2004/0221790 A1 | 11/2004 | Sinclair et al. |
| 2004/0246462 A1 | 12/2004 | Kaneko et al. |
| 2004/0259533 A1 | 12/2004 | Nixon et al. |
| 2005/0016008 A1 | 1/2005 | Raab et al. |
| 2005/0024625 A1 | 2/2005 | Mori et al. |
| 2005/0028393 A1 | 2/2005 | Raab et al. |
| 2005/0046823 A1 | 3/2005 | Ando et al. |
| 2005/0058332 A1 | 3/2005 | Kaufman et al. |
| 2005/0085940 A1 | 4/2005 | Griggs et al. |
| 2005/0111514 A1 | 5/2005 | Matsumoto et al. |
| 2005/0115092 A1 | 6/2005 | Raab et al. |
| 2005/0141052 A1 | 6/2005 | Becker et al. |
| 2005/0144799 A1 | 7/2005 | Raab et al. |
| 2005/0151963 A1 | 7/2005 | Pulla et al. |
| 2005/0166413 A1 | 8/2005 | Crampton |
| 2005/0172503 A1 | 8/2005 | Kumagai et al. |
| 2005/0188557 A1 | 9/2005 | Raab et al. |
| 2005/0190384 A1 | 9/2005 | Persi et al. |
| 2005/0259271 A1 | 11/2005 | Christoph |
| 2005/0276466 A1 | 12/2005 | Vaccaro et al. |
| 2005/0283989 A1 | 12/2005 | Pettersson |
| 2006/0016086 A1 | 1/2006 | Raab et al. |
| 2006/0017720 A1 | 1/2006 | Li |
| 2006/0026851 A1 | 2/2006 | Raab et al. |
| 2006/0028203 A1 | 2/2006 | Kawashima et al. |
| 2006/0053647 A1 | 3/2006 | Raab et al. |
| 2006/0056459 A1 | 3/2006 | Stratton et al. |
| 2006/0056559 A1 | 3/2006 | Pleasant et al. |
| 2006/0059270 A1 | 3/2006 | Pleasant et al. |
| 2006/0061566 A1 | 3/2006 | Verma et al. |
| 2006/0088044 A1 | 4/2006 | Hammerl et al. |
| 2006/0096108 A1 | 5/2006 | Raab et al. |
| 2006/0103853 A1 | 5/2006 | Palmateer |
| 2006/0109536 A1 | 5/2006 | Mettenleiter et al. |
| 2006/0123649 A1 | 6/2006 | Muller |
| 2006/0129349 A1 | 6/2006 | Raab et al. |
| 2006/0132803 A1 | 6/2006 | Clair et al. |
| 2006/0145703 A1 | 7/2006 | Steinbichler et al. |
| 2006/0169050 A1 | 8/2006 | Kobayashi et al. |
| 2006/0169608 A1 | 8/2006 | Carnevali |

(56) References Cited

U.S. PATENT DOCUMENTS

| | | |
|---|---|---|
| 2006/0170870 A1 | 8/2006 | Kaufman et al. |
| 2006/0186301 A1 | 8/2006 | Dozier et al. |
| 2006/0193521 A1 | 8/2006 | England III, et al. |
| 2006/0241791 A1 | 10/2006 | Pokorny et al. |
| 2006/0279246 A1 | 12/2006 | Hashimoto et al. |
| 2006/0287769 A1 | 12/2006 | Yanagita et al. |
| 2006/0291970 A1 | 12/2006 | Granger |
| 2007/0019212 A1 | 1/2007 | Gatsios et al. |
| 2007/0030841 A1 | 2/2007 | Lee et al. |
| 2007/0043526 A1 | 2/2007 | De Jonge et al. |
| 2007/0050774 A1 | 3/2007 | Eldson et al. |
| 2007/0055806 A1 | 3/2007 | Stratton et al. |
| 2007/0058154 A1 | 3/2007 | Reichert et al. |
| 2007/0058162 A1 | 3/2007 | Granger |
| 2007/0064976 A1 | 3/2007 | England, III |
| 2007/0097382 A1 | 5/2007 | Granger |
| 2007/0100498 A1 | 5/2007 | Matsumoto et al. |
| 2007/0105238 A1 | 5/2007 | Mandl et al. |
| 2007/0118269 A1 | 5/2007 | Gibson et al. |
| 2007/0122250 A1 | 5/2007 | Mullner |
| 2007/0142970 A1 | 6/2007 | Burbank et al. |
| 2007/0147265 A1 | 6/2007 | Eidson |
| 2007/0147435 A1 | 6/2007 | Hamilton et al. |
| 2007/0147562 A1 | 6/2007 | Eidson |
| 2007/0150111 A1 | 6/2007 | Wu et al. |
| 2007/0151390 A1 | 7/2007 | Blumenkranz et al. |
| 2007/0153297 A1 | 7/2007 | Lau |
| 2007/0163134 A1 | 7/2007 | Eaton |
| 2007/0163136 A1 | 7/2007 | Eaton |
| 2007/0171394 A1 | 7/2007 | Steiner et al. |
| 2007/0176648 A1 | 8/2007 | Baer |
| 2007/0177016 A1 | 8/2007 | Wu |
| 2007/0181685 A1 | 8/2007 | Zhu et al. |
| 2007/0183459 A1 | 8/2007 | Eidson |
| 2007/0185682 A1 | 8/2007 | Eidson |
| 2007/0217169 A1 | 9/2007 | Yeap et al. |
| 2007/0217170 A1 | 9/2007 | Yeap et al. |
| 2007/0221522 A1 | 9/2007 | Yamada et al. |
| 2007/0223477 A1 | 9/2007 | Eidson |
| 2007/0229929 A1 | 10/2007 | Soreide et al. |
| 2007/0247615 A1 | 10/2007 | Bridges et al. |
| 2007/0248122 A1 | 10/2007 | Hamilton |
| 2007/0256311 A1 | 11/2007 | Ferrari |
| 2007/0257660 A1 | 11/2007 | Pleasant et al. |
| 2007/0258378 A1 | 11/2007 | Hamilton |
| 2007/0282564 A1 | 12/2007 | Sprague et al. |
| 2008/0046221 A1 | 2/2008 | Stathis |
| 2008/0052808 A1 | 3/2008 | Leick et al. |
| 2008/0052936 A1 | 3/2008 | Briggs et al. |
| 2008/0066583 A1 | 3/2008 | Lott |
| 2008/0068103 A1 | 3/2008 | Cutler |
| 2008/0075325 A1 | 3/2008 | Otani et al. |
| 2008/0075326 A1 | 3/2008 | Otani et al. |
| 2008/0080562 A1 | 4/2008 | Burch et al. |
| 2008/0096108 A1 | 4/2008 | Sumiyama et al. |
| 2008/0098272 A1 | 4/2008 | Fairbanks et al. |
| 2008/0148585 A1 | 6/2008 | Raab et al. |
| 2008/0154538 A1 | 6/2008 | Stathis |
| 2008/0179206 A1 | 7/2008 | Feinstein et al. |
| 2008/0183065 A1 | 7/2008 | Goldbach |
| 2008/0196260 A1 | 8/2008 | Pettersson |
| 2008/0204699 A1 | 8/2008 | Benz et al. |
| 2008/0216552 A1 | 9/2008 | Ibach et al. |
| 2008/0228331 A1 | 9/2008 | McNerney et al. |
| 2008/0232269 A1 | 9/2008 | Tatman et al. |
| 2008/0235969 A1 | 10/2008 | Jordil et al. |
| 2008/0235970 A1 | 10/2008 | Crampton |
| 2008/0240321 A1 | 10/2008 | Narus et al. |
| 2008/0245452 A1 | 10/2008 | Law et al. |
| 2008/0246943 A1 | 10/2008 | Kaufman et al. |
| 2008/0252671 A1 | 10/2008 | Cannell et al. |
| 2008/0256814 A1 | 10/2008 | Pettersson |
| 2008/0257023 A1 | 10/2008 | Jordil et al. |
| 2008/0263411 A1 | 10/2008 | Baney et al. |
| 2008/0271332 A1 | 11/2008 | Jordil et al. |
| 2008/0273758 A1 | 11/2008 | Fuchs et al. |
| 2008/0282564 A1 | 11/2008 | Pettersson |
| 2008/0295349 A1 | 12/2008 | Uhl et al. |
| 2008/0298254 A1 | 12/2008 | Eidson |
| 2008/0302200 A1 | 12/2008 | Tobey |
| 2008/0309460 A1 | 12/2008 | Jefferson et al. |
| 2008/0309546 A1 | 12/2008 | Wakayama et al. |
| 2009/0000136 A1 | 1/2009 | Crampton |
| 2009/0013548 A1 | 1/2009 | Ferrari |
| 2009/0016475 A1 | 1/2009 | Rischar et al. |
| 2009/0021351 A1 | 1/2009 | Beniyama et al. |
| 2009/0031575 A1 | 2/2009 | Tomelleri |
| 2009/0046140 A1 | 2/2009 | Lashmet et al. |
| 2009/0046752 A1 | 2/2009 | Bueche et al. |
| 2009/0046895 A1 | 2/2009 | Pettersson et al. |
| 2009/0049704 A1 | 2/2009 | Styles et al. |
| 2009/0051938 A1 | 2/2009 | Miousset et al. |
| 2009/0083985 A1 | 4/2009 | Ferrari |
| 2009/0089004 A1 | 4/2009 | Vook et al. |
| 2009/0089078 A1 | 4/2009 | Bursey |
| 2009/0089233 A1 | 4/2009 | Gach et al. |
| 2009/0089623 A1 | 4/2009 | Neering et al. |
| 2009/0095047 A1 | 4/2009 | Patel et al. |
| 2009/0100949 A1 | 4/2009 | Shirai et al. |
| 2009/0109797 A1 | 4/2009 | Eidson |
| 2009/0113183 A1 | 4/2009 | Barford et al. |
| 2009/0113229 A1 | 4/2009 | Cataldo et al. |
| 2009/0122805 A1 | 5/2009 | Epps et al. |
| 2009/0125196 A1 | 5/2009 | Velazquez et al. |
| 2009/0133276 A1 | 5/2009 | Bailey et al. |
| 2009/0133494 A1 | 5/2009 | Van Dam et al. |
| 2009/0139105 A1 | 6/2009 | Granger |
| 2009/0157419 A1 | 6/2009 | Bursey |
| 2009/0161091 A1 | 6/2009 | Yamamoto |
| 2009/0165317 A1 | 7/2009 | Little |
| 2009/0177435 A1 | 7/2009 | Heininen |
| 2009/0177438 A1 | 7/2009 | Raab |
| 2009/0185741 A1 | 7/2009 | Nahari et al. |
| 2009/0187373 A1 | 7/2009 | Atwell et al. |
| 2009/0241360 A1 | 10/2009 | Tait et al. |
| 2009/0249634 A1 | 10/2009 | Pettersson |
| 2009/0265946 A1 | 10/2009 | Jordil et al. |
| 2009/0323742 A1 | 12/2009 | Kumano |
| 2010/0030421 A1 | 2/2010 | Yoshimura et al. |
| 2010/0040742 A1 | 2/2010 | Dijkhuis et al. |
| 2010/0049891 A1 | 2/2010 | Hartwich et al. |
| 2010/0057392 A1 | 3/2010 | York |
| 2010/0078866 A1 | 4/2010 | Pettersson |
| 2010/0095542 A1 | 4/2010 | Ferrari |
| 2010/0122920 A1 | 5/2010 | Butter et al. |
| 2010/0123892 A1 | 5/2010 | Miller et al. |
| 2010/0128259 A1 | 5/2010 | Bridges et al. |
| 2010/0134596 A1 | 6/2010 | Becker |
| 2010/0135534 A1 | 6/2010 | Weston et al. |
| 2010/0148013 A1 | 6/2010 | Bhotika et al. |
| 2010/0188504 A1 | 7/2010 | Dimsdale et al. |
| 2010/0195086 A1 | 8/2010 | Ossig et al. |
| 2010/0207938 A1 | 8/2010 | Yau et al. |
| 2010/0208062 A1 | 8/2010 | Pettersson |
| 2010/0245851 A1 | 9/2010 | Teodorescu |
| 2010/0277472 A1 | 11/2010 | Kaltenbach et al. |
| 2010/0277747 A1 | 11/2010 | Rueb et al. |
| 2010/0281705 A1 | 11/2010 | Verdi et al. |
| 2010/0286941 A1 | 11/2010 | Merlot |
| 2010/0312524 A1 | 12/2010 | Siercks et al. |
| 2010/0318319 A1 | 12/2010 | Maierhofer |
| 2010/0325907 A1 | 12/2010 | Tait |
| 2011/0000095 A1 | 1/2011 | Carlson |
| 2011/0007305 A1 | 1/2011 | Bridges et al. |
| 2011/0007326 A1 | 1/2011 | Daxauer et al. |
| 2011/0013199 A1 | 1/2011 | Siercks et al. |
| 2011/0019155 A1 | 1/2011 | Daniel et al. |
| 2011/0023578 A1 | 2/2011 | Grasser |
| 2011/0025905 A1 | 2/2011 | Tanaka |
| 2011/0043515 A1 | 2/2011 | Stathis |
| 2011/0066781 A1 | 3/2011 | Debelak et al. |
| 2011/0094908 A1 | 4/2011 | Trieu |
| 2011/0107611 A1 | 5/2011 | Desforges et al. |
| 2011/0107612 A1 | 5/2011 | Ferrari et al. |

(56) References Cited

U.S. PATENT DOCUMENTS

| | | | |
|---|---|---|---|
| 2011/0107613 A1 | 5/2011 | Tait | |
| 2011/0107614 A1 | 5/2011 | Champ | |
| 2011/0111849 A1 | 5/2011 | Sprague et al. | |
| 2011/0112786 A1 | 5/2011 | Desforges et al. | |
| 2011/0119025 A1 | 5/2011 | Fetter et al. | |
| 2011/0164114 A1 | 7/2011 | Kobayashi et al. | |
| 2011/0166824 A1 | 7/2011 | Haisty et al. | |
| 2011/0169924 A1 | 7/2011 | Haisty et al. | |
| 2011/0173827 A1 | 7/2011 | Bailey et al. | |
| 2011/0173828 A1 | 7/2011 | York | |
| 2011/0178755 A1 | 7/2011 | York | |
| 2011/0178762 A1 | 7/2011 | York | |
| 2011/0178764 A1 | 7/2011 | York | |
| 2011/0178765 A1 | 7/2011 | Atwell et al. | |
| 2011/0192043 A1 | 8/2011 | Ferrari | |
| 2011/0273568 A1 | 11/2011 | Lagassey | |
| 2011/0282622 A1 | 11/2011 | Canter et al. | |
| 2011/0288684 A1 | 11/2011 | Farlow et al. | |
| 2012/0019806 A1 | 1/2012 | Becker et al. | |
| 2012/0035788 A1 | 2/2012 | Trepagnier et al. | |
| 2012/0035798 A1 | 2/2012 | Barfoot et al. | |
| 2012/0044476 A1 | 2/2012 | Earhart et al. | |
| 2012/0046820 A1 | 2/2012 | Allard et al. | |
| 2012/0069325 A1 | 3/2012 | Schumann et al. | |
| 2012/0069352 A1 | 3/2012 | Ossig et al. | |
| 2012/0113913 A1 | 5/2012 | Tiirola et al. | |
| 2012/0140244 A1 | 6/2012 | Gittinger et al. | |
| 2012/0154786 A1 | 6/2012 | Gosch et al. | |
| 2012/0155744 A1 | 6/2012 | Kennedy et al. | |
| 2012/0169876 A1 | 7/2012 | Reichert et al. | |
| 2012/0181194 A1 | 7/2012 | McEwan et al. | |
| 2012/0197439 A1 | 8/2012 | Wang et al. | |
| 2012/0210678 A1 | 8/2012 | Alcouloumre et al. | |
| 2012/0217357 A1 | 8/2012 | Franke | |
| 2012/0229788 A1 | 9/2012 | Schumann et al. | |
| 2012/0260512 A1 | 10/2012 | Kretschmer et al. | |
| 2012/0260611 A1 | 10/2012 | Jones | |
| 2012/0262700 A1 | 10/2012 | Schumann et al. | |
| 2012/0287265 A1 | 11/2012 | Schumann et al. | |
| 2013/0010307 A1 | 1/2013 | Greiner et al. | |
| 2013/0025143 A1 | 1/2013 | Bailey et al. | |
| 2013/0025144 A1 | 1/2013 | Briggs et al. | |
| 2013/0027515 A1 | 1/2013 | Vinther et al. | |
| 2013/0062243 A1 | 3/2013 | Chang et al. | |
| 2013/0070250 A1 | 3/2013 | Ditte et al. | |
| 2013/0094024 A1 | 4/2013 | Ruhland et al. | |
| 2013/0162472 A1 | 6/2013 | Najim et al. | |
| 2013/0176453 A1 | 7/2013 | Mate et al. | |
| 2013/0201487 A1 | 8/2013 | Ossig et al. | |
| 2013/0205606 A1 | 8/2013 | Briggs et al. | |
| 2013/0212889 A9 | 8/2013 | Bridges et al. | |
| 2013/0300740 A1 | 11/2013 | Snyder et al. | |
| 2014/0049784 A1 | 2/2014 | Woloschyn et al. | |

FOREIGN PATENT DOCUMENTS

| | | |
|---|---|---|
| CN | 2508896 | 9/2002 |
| CN | 2665668 | 12/2004 |
| CN | 1630805 A | 6/2005 |
| CN | 1818537 | 8/2006 |
| CN | 1839293 A | 9/2006 |
| CN | 1853084 A | 10/2006 |
| CN | 201266071 | 7/2009 |
| DE | 3245060 A1 | 7/1983 |
| DE | 4410775 A1 | 10/1995 |
| DE | 29622033 | 2/1997 |
| DE | 19543763 A1 | 5/1997 |
| DE | 19601875 A1 | 7/1997 |
| DE | 19811550 A1 | 9/1999 |
| DE | 19820307 A1 | 11/1999 |
| DE | 19850118 A1 | 5/2000 |
| DE | 19928958 A1 | 11/2000 |
| DE | 10026357 | 1/2002 |
| DE | 10137241 A1 | 9/2002 |
| DE | 10155488 A1 | 5/2003 |
| DE | 10232028 | 2/2004 |
| DE | 10244643 A1 | 4/2004 |
| DE | 10304188 A1 | 8/2004 |
| DE | 10326848 A1 | 1/2005 |
| DE | 202005000983 U1 | 4/2005 |
| DE | 102004015668 B3 | 9/2005 |
| DE | 102004015111 A1 | 10/2005 |
| DE | 102004028090 A1 | 12/2005 |
| DE | 19720049 B4 | 1/2006 |
| DE | 10114126 B4 | 8/2006 |
| DE | 102004010083 B4 | 11/2006 |
| DE | 102005060967 A1 | 6/2007 |
| DE | 102006023902 | 11/2007 |
| DE | 102006024534 A1 | 11/2007 |
| DE | 102006035292 | 1/2008 |
| DE | 202006020299 U1 | 5/2008 |
| DE | 102007037162 A1 | 2/2009 |
| DE | 102008039838 | 3/2010 |
| DE | 102005036929 B4 | 6/2010 |
| DE | 102008062763 B3 | 7/2010 |
| DE | 102009001894 | 9/2010 |
| DE | 1020100327725 A1 | 1/2012 |
| EP | 0546784 A2 | 6/1993 |
| EP | 0667549 A2 | 8/1995 |
| EP | 0727642 A1 | 8/1996 |
| EP | 0730210 | 9/1996 |
| EP | 0730210 A1 | 9/1996 |
| EP | 0614517 | 3/1997 |
| EP | 1160539 | 12/2001 |
| EP | 1189124 | 3/2002 |
| EP | 1189124 A1 | 3/2002 |
| EP | 0767357 B1 | 5/2002 |
| EP | 1342989 A2 | 9/2003 |
| EP | 1361414 A1 | 11/2003 |
| EP | 1452279 | 9/2004 |
| EP | 1468791 A1 | 10/2004 |
| EP | 1734425 | 6/2005 |
| EP | 1669713 A1 | 6/2006 |
| EP | 1734425 A2 | 12/2006 |
| EP | 1429109 | 4/2007 |
| EP | 1764579 | 12/2007 |
| EP | 1878543 | 1/2008 |
| EP | 1967930 A2 | 9/2008 |
| EP | 2003419 A1 | 12/2008 |
| EP | 2023077 A1 | 2/2009 |
| EP | 2060530 A1 | 5/2009 |
| EP | 2068067 A1 | 6/2009 |
| EP | 2108917 A1 | 10/2009 |
| EP | 2177868 A2 | 10/2009 |
| EP | 2259013 A1 | 12/2010 |
| EP | 2400261 | 12/2011 |
| FR | 2935043 A1 | 2/2010 |
| GB | 894320 | 4/1962 |
| GB | 1112941 | 5/1968 |
| GB | 2255648 A | 11/1992 |
| GB | 2341203 A | 3/2000 |
| GB | 2420241 A | 5/2006 |
| GB | 2452033 A | 2/2009 |
| GB | 2452033 A | 2/2009 |
| JP | 5581525 | 6/1955 |
| JP | S575584 | 1/1982 |
| JP | S58171291 | 1/1983 |
| JP | 5827264 | 2/1983 |
| JP | 559133890 | 8/1984 |
| JP | S63135814 A | 6/1988 |
| JP | 0357911 A | 3/1991 |
| JP | 04115108 A | 4/1992 |
| JP | 04225188 | 8/1992 |
| JP | 04267214 A | 9/1992 |
| JP | 05072477 A | 3/1993 |
| JP | 6313710 A | 11/1994 |
| JP | 1994313710 A | 11/1994 |
| JP | 06341838 | 12/1994 |
| JP | H074950 A | 1/1995 |
| JP | 7210586 A | 8/1995 |
| JP | 07229963 A | 8/1995 |
| JP | 08129145 A | 5/1996 |
| JP | 08136849 A | 5/1996 |

(56) References Cited

FOREIGN PATENT DOCUMENTS

| | | |
|---|---|---|
| JP | 08262140 A | 10/1996 |
| JP | 09021868 | 1/1997 |
| JP | 10213661 A | 8/1998 |
| JP | 11231047 | 8/1999 |
| JP | 2000121724 A | 4/2000 |
| JP | 2000249546 A | 9/2000 |
| JP | 2001013001 A | 1/2001 |
| JP | 2001021303 A | 1/2001 |
| JP | 2001337278 A | 12/2001 |
| JP | 2003050128 A | 2/2003 |
| JP | 2003156330 A | 5/2003 |
| JP | 2003156562 A | 5/2003 |
| JP | 2003194526 | 7/2003 |
| JP | 2003308205 A | 10/2003 |
| JP | 2004109106 A | 4/2004 |
| JP | 2004245832 A | 9/2004 |
| JP | 2004257927 A | 9/2004 |
| JP | 2004333398 A | 11/2004 |
| JP | 2004348575 A | 12/2004 |
| JP | 2005030937 A | 2/2005 |
| JP | 2005069700 A | 3/2005 |
| JP | 2005174887 A | 6/2005 |
| JP | 2005517908 | 6/2005 |
| JP | 2005215917 A | 8/2005 |
| JP | 2005221336 A | 8/2005 |
| JP | 2005257510 A | 9/2005 |
| JP | 2006038683 A | 2/2006 |
| JP | 2006203404 A | 8/2006 |
| JP | 2006226948 A | 8/2006 |
| JP | 2006241833 | 9/2006 |
| JP | 2006301991 A | 11/2006 |
| JP | 2009524057 | 6/2009 |
| WO | 9208568 | 5/1992 |
| WO | WO9208568 A1 | 5/1992 |
| WO | 9808050 | 2/1998 |
| WO | 9910706 A1 | 3/1999 |
| WO | WO9910706 A1 | 3/1999 |
| WO | 0014474 | 3/2000 |
| WO | WO0014474 A1 | 3/2000 |
| WO | 0026612 A1 | 5/2000 |
| WO | 0033149 | 6/2000 |
| WO | 0034733 | 6/2000 |
| WO | 0063681 A2 | 10/2000 |
| WO | 0177613 A1 | 10/2001 |
| WO | 02088855 A1 | 11/2002 |
| WO | 02101323 A2 | 12/2002 |
| WO | WO02101323 A2 | 12/2002 |
| WO | 2004096502 A1 | 11/2004 |
| WO | WO2004096502 A1 | 11/2004 |
| WO | 2005072917 A1 | 8/2005 |
| WO | 2005075875 | 8/2005 |
| WO | 2005100908 A1 | 10/2005 |
| WO | WO2005100908 A1 | 10/2005 |
| WO | 2006051264 A1 | 5/2006 |
| WO | WO2006051264 A1 | 5/2006 |
| WO | 2007002319 A1 | 1/2007 |
| WO | 2007028941 A1 | 3/2007 |
| WO | 2007051972 A1 | 5/2007 |
| WO | 20070125081 A1 | 11/2007 |
| WO | 2007144906 A1 | 12/2007 |
| WO | WO2007144906 A1 | 12/2007 |
| WO | 2008027588 A2 | 3/2008 |
| WO | WO2008027588 A2 | 3/2008 |
| WO | 2008047171 | 4/2008 |
| WO | 2008047171 A1 | 4/2008 |
| WO | 2008052348 A1 | 5/2008 |
| WO | 2008064276 A3 | 5/2008 |
| WO | 2008066896 | 6/2008 |
| WO | 2008066896 A2 | 6/2008 |
| WO | 2008068791 A1 | 6/2008 |
| WO | 2008075170 A1 | 6/2008 |
| WO | WO2008075170 A1 | 6/2008 |
| WO | 2008157061 A1 | 12/2008 |
| WO | 2009001165 A1 | 12/2008 |
| WO | WO2009001165 A1 | 12/2008 |
| WO | 2009016185 A1 | 2/2009 |
| WO | WO2009016185 A1 | 2/2009 |
| WO | 2009083452 A1 | 7/2009 |
| WO | 2009127526 A1 | 10/2009 |
| WO | 2009130169 A1 | 10/2009 |
| WO | WO2009127526 A1 | 10/2009 |
| WO | 2009149740 A1 | 12/2009 |
| WO | 2010040742 A1 | 4/2010 |
| WO | WO2010040742 A1 | 4/2010 |
| WO | 2010092131 A1 | 8/2010 |
| WO | WO2010092131 A1 | 8/2010 |
| WO | 2010108089 A2 | 9/2010 |
| WO | WO2010108089 A2 | 9/2010 |
| WO | 2010148525 A1 | 12/2010 |
| WO | WO2010148525 A1 | 12/2010 |
| WO | 2011000435 A1 | 1/2011 |
| WO | 2011000955 A1 | 1/2011 |
| WO | WO2011000435 A1 | 1/2011 |
| WO | WO2011000955 A1 | 1/2011 |
| WO | 2011057130 A2 | 5/2011 |
| WO | 2011090895 A1 | 7/2011 |
| WO | WO2011090829 A2 | 7/2011 |
| WO | 2012038446 A1 | 3/2012 |
| WO | 2013188026 A1 | 12/2013 |
| WO | 2013190031 A1 | 12/2013 |

OTHER PUBLICATIONS

A. Hart; "Kinematic Coupling Interchangibility" Precision Engineering; vol. 28, No. 1; Jan. 1, 2004 pp. 1-15.
ABB Flexibile Automation AB: "Product Manual IRB 6400R M99, On-line Manual"; Sep. 13, 2006; XP00002657684; Retrieved from the Internet: URL: http://pergatory.mit.edu/kinematiccouplings/case_studies/ABB_Robotics/general/6400R%20Product%20Manual.pdf (retrieved Aug. 26, 2011).
Anonymous : So wird's gemacht: Mit T-DSL and Windows XP Home Edition gemeinsam ins Internet (Teil 3) Internet Citation, Jul. 2003, XP002364586, Retrieved from Internet: URL:http://support.microsfot.com/kb/814538/DE/ [retrieved on Jan. 26, 2006]eh whole document.
GoMeasure3D—Your source for all things measurement, Baces 3D 100 Series Portable CMM from GoMeasure3D, [online], [retrieved Nov. 29, 2011], http://www.gomeasure3d.com/baces100.html.
Cho, et al., Implementation of a Precision Time Protocol over Low Rate Wireless Personal Area Networks, IEEE, 2008.
Cooklev, et al., An Implementation of IEEE 1588 Over IEEE 802.11b for Syncrhonization of Wireless Local Area Network Nodes, IEEE Transactions on Instrumentation and Measurement, vol. 56, No. 5, Oct. 2007.
Information on Electro-Optical Information Systems; EOIS 3D Mini-Moire C.M.M. Sensor for Non-Contact Measuring & Surface Mapping; Direct Dimensions, Jun. 1995.
Dylan, Craig R., High Precision Makes the Massive Bay Bridge Project Work. Suspended in MidAir—Cover Story—Point of Beginning, Jan. 1, 2010, [online] http://www.pobonline.com/Articles/Cover_Story/BNP_GUID_9-5-2006_A_10000000000 . . . [Retreived Jan. 25, 2010].
Examination Report under Section 18(3); Report dated Oct. 31, 2012; Application No. GB1210309.9.
Examination Report under Section 18(3); Report dated Nov. 1, 2012; Application No. GB1210311.5.
Examination Report under Section 18(3); Report dated Nov. 6, 2012; Application No. GB1210306.5.
Examination Report for German Application No. 11 2011 100 193.2 Report dated Dec. 20, 2012; based on PCT/US2011/021249.
FARO Product Catalog; Faro Arm; 68 pages; Faro Technologies Inc. 2009; printed Aug. 3, 2009.
Franklin, Paul F., What IEEE 1588 Means for Your Next T&M System Design, Keithley Instruments, Inc., [on-line] Oct. 19, 2010, http://www.eetimes.com/General/DisplayPrintViewContent?contentItemId=4209746, [Retreived Oct. 21, 2010].
It is Alive in the Lab, Autodesk University, Fun with the Immersion MicroScribe Laser Scanner, [online], [retrieved Nov. 29, 2011], http://labs.blogs.com/its_alive_in_the_lab/2007/11/fun-with-the-im.html.

(56) References Cited

OTHER PUBLICATIONS

GHOST 3D Systems, Authorized MicroScribe Solutions, FAQs—MicroScribe 3D Laser, MicroScan Tools, & related info, [online], [retrieved Nov. 29, 2011], http://microscribe.ghost3d.com/gt_microscan-3d_faqs.htm.
Electro-Optical Information Systems, "The Handy Handheld Digitizer" [online], [retrieved on Nov. 29, 2011], http://vidibotics.com/htm/handy.htm.
HYDROpro Navigation, Hydropgraphic Survey Software, Trimble, www.trimble.com, Copyright 1997-2003.
International Preliminary Report on Patentability mailed May 9, 2012 for International Application Serial No. PCT/US2011/021253 International Filing date Jan. 14, 2011. Date of Completion May 9, 2012.
International Preliminary Report on Patentability for International Application Serial No. PCT/US2011/021246 International filed Jan. 14, 2011. Date of Issuance Jul. 24, 2012.
International Preliminary Report on Patentability for International Application Serial No. PCT/US2011/021249 International filed Jan. 14, 2011. Date of Issuance Jul. 24, 2012.
International Preliminary Report on Patentability for International Application Serial No. PCT/US2011/021250 International filed Jan. 14, 2011. Date of Issuance Jul. 24, 2012.
International Preliminary Report on Patentability for International Application Serial No. PCT/US2011/021252 International filed Jan. 14, 2011. Date of Issuance Jul. 24, 2012.
International Preliminary Report on Patentability for International Application Serial No. PCT/US2011/021247 International filed Jan. 14, 2011. Date of Issuance Jul. 24, 2012.
International Preliminary Report on Patentability for International Application Serial No. PCT/US2011/021259. International filed Jan. 14, 2011. Date of Issuance Jul. 24, 2012.
International Preliminary Report on Patentability for International Application Serial No. PCT/US2011/021262. International filed Jan. 14, 2011. Date of Issuance Jul. 24, 2012.
International Preliminary Report on Patentability for International Application Serial No. PCT/US2011/021263. International filed Jan. 14, 2011. Date of Issuance Jul. 24, 2012.
International Preliminary Report on Patentability for International Application Serial No. PCT/US2011/021264. International filed Jan. 14, 2011. Date of Issuance Jul. 24, 2012.
International Preliminary Report on Patentability for International Application Serial No. PCT/US2011/021270. International filing date Jan. 14, 2011. Date of Issuance Jul. 24, 2012.
International Preliminary Report on Patentability for International Application Serial No. PCT/US2011/021273. International filing date Jan. 14, 2011. Date of Issuance Jul. 24, 2012.
International Preliminary Report on Patentability for International Application Serial No. PCT/US2011/021276. International filed Jan. 14, 2011. Date of Issuance Jul. 24, 2012.
International Preliminary Report on Patentability for International Application Serial No. PCT/US2011/021278. International filed Jan. 14, 2011. Date of Issuance Jul. 24, 2012.
International Preliminary Report on Patentability for International Application Serial No. PCT/US2011/021794. International filed Jan. 20, 2011. Date of Issuance Jul. 24, 2012.
International Preliminary Report on Patentability for PCT/US2011/020625; Date of Issuance Jul. 17, 2012.
International Preliminary Report on Patentability for PCT/US2011/021274; Date of Completion Apr. 12, 2012.
Jasperneite, et al., Enhancements to the Time Synchronization Standard IEEE-1588 for a System of Cascaded Bridges, IEEE, 2004.
Kreon Laser Scanners, Getting the Best in Cutting Edge 3D Digitizing Technology, B3-D MCAD Consulting/Sales [online], [retrieved Nov. 29, 2011], http://www.b3-d.com/Kreon.html.
MicroScan 3D User Guide, RSI GmbH, 3D Systems & Software, Oberursel, Germany, email: info@rsi-gmbh.de, Copyright RSI Roland Seifert Imaging GmbH 2008.
Patrick Willoughby; "Elastically Averaged Precision Alignment"; in: "Doctoral Thesis"; Jun. 1, 2005; Massachusetts Institute of Technology; XP55005620; Abstract 1.1 Motivation; Chapter 3, Chapter 6.
Romer Absolute Arm Maximum Performance Portable Measurement, (2010).
Romer Romer Absolute Arm Product Brochure: (2010); Hexagon Metrology; www.hexagonmetrology.com; Hexagon AB, 2010.
Romer Measuring Arms; Portable CMMs for the shop floor; 20 pages; Hexagon Metrology, Inc. (2009) http//us.ROMER.com.
Sauter, et al., Towards New Hybrid Networks for Industrial Automation, IEEE, 2009.
Spada, et al., IEEE 1588 Lowers Integration Costs in Continuous Flow Automated Production Lines, XP-002498255, ARC Insights, Insight # 2003-33MD&H, Aug. 20, 2003.
Trimble—Trimble SPS630, SPS730 and SPS930 Universal Total Stations, [on-line] http://www.trimble.com/sps630_730_930.shtml (1 of 4), [Retreived Jan. 26, 2010 8:50:29AM].
GB Office Action dated Jan. 15, 2014 for SJB/PX210785GB; UK Patent Application No. 1214426.7.
MOOG Components Group; "Fiber Optic Rotary Joints; Product Guide" (4 pages) Dec. 2010; MOOG, Inc. 2010.
Moog Components Group "Technical Brief; Fiber Optic Rotary Joints" Document No. 303 (6 pages) Mar. 2008; MOOG, Inc. 2008 Canada; Focal Technologies.
International Search Report dated Nov. 28, 2013 for International Application No. PCT/13/049562 filed Jul. 8, 2013 (7 pages).
Written Opinion of the International Search Authority dated Nov. 28, 2013 for International Application No. PCT/13/049562 filed Jul. 8, 2013 (10 pages).
International Search Report of the International Searching Authority for Application No. PCT/US2013/022186; Date of Mailing: May 29, 2013.
Written Opinion of the International Searching Authority for Application No. PCT/US2013/022186; Date of Mailing: May 29, 2013.
International Search Report for International Application No. PCT/US2013/040309 mailed Jul. 15, 2013.
Written Opinion for International Application No. PCT/US2013/040309 mailed Jul. 15, 2013.
MG Lee; "Compact 3D LIDAR based on optically coupled horizontal and vertical Scanning mechanism for the autonomous navigation of robots" (13 pages) vol. 8037; downloaded from http://proceedings.spiedigitallibrary.org/ on Jul. 2, 2013.
P. Ben-Tzvi, et al "Extraction of 3D Images Using Pitch-Actuated 2D Laser Range Finder for Robotic Vision" (6 pages) BNSDOCID <XP 31840390A_1_>, (2010).
International Search Report for International Application No. PCT/US2013/040321 mailed Jul. 15, 2013.
YK Cho, et al. "Light-weight 3D Ladar System for Construction Robotic Operations" (pp. 237-244); 26th International Symposium on Automation and Robotics in Construction (ISARC 2009).
Written Opinion for International Application No. PCT/US2013/040321 mailed Jul. 15, 2013.
Romer "Romer Measuring Arms Portable CMMs for R&D and shop floor" (Mar. 2009) Hexagon Metrology (16 pages).
Examination Report for German Application No. 11 2011 100 290.4 Report dated Jul. 16, 2013; based on PCT/US2011/021247.
International Preliminary Report on Patentability for International Application Serial No. PCT/US2011/021272. International filing date Jan. 14, 2011. Date of Issuance Jul. 24, 2012.
JGENG "DLP-Based Structured Light 3D Imaging Technologies and Applications" (15 pages) Emerging Digital Micromirror Device Based Systems and Application III; edited by Michael R. Douglass, Patrick I. Oden, Proc. of SPIE, vol. 7932, 79320B; (2011) SPIE.
International Search Report for International Application No. PCT/US/2013/041826 filed May 20, 2013; mailed Jul. 29, 2013.
Written Opinion for International Application No. PCT/US/2013/041826 filed May 20, 2013; mailed Jul. 29, 2013.
German Office Action and English Language summary for DE 112011100292.0 filed Jul. 3, 2012, based on PCT Application US2011/021252 filed Jan. 14, 2011.
International Search Report for International Application No. PCT/2011/020625 mailed Feb. 25, 2011.

(56) References Cited

OTHER PUBLICATIONS

International Search Report for International Application No. PCT/US2011/021270 mailed May 2, 2011.
International Search Report for International Application No. PCT/US2011/021274 mailed May 6, 2011.
International Search Report for International Application No. PCT/US2011/021276 mailed May 17, 2011.
International Search Report for International Application No. PCT/US2011/021246 mailed Apr. 12, 2011.
International Search Report for International Application No. PCT/US2011/021247 mailed Aug. 26, 2011.
International Search Report for International Application No. PCT/US2011/021248 mailed Sep. 19, 2011.
International Search Report for International Application No. PCT/US2011/021249 mailed Apr. 21, 2011.
Internation Search Report for International Application No. PCT/US2011/021250 mailed Apr. 18, 2011.
International Search Report for International Application No. PCT/US2011/021252 mailed Apr. 27, 2011.
International Search Report for International Application No. PCT/US2011/021253 mailed Sep. 26, 2011.
International Search Report for International Application No. PCT/US2011/021259 mailed May 25, 2011.
International Search Report for International Application No. PCT/US2011/021262 mailed May 11, 2011.
International Search Report for International Application No. PCT/US2011/021263 mailed May 4, 2011.
International Search Report for International Application No. PCT/US2011/021264 mailed May 31, 2011.
International Search Report for International Application No. PCT/US2011/021272 mailed Apr. 7, 2011.
International Search Report for International Application No. PCT/US2011/021273 mailed Apr. 20, 2011.
International Search Report for International Application No. PCT/US2011/021278 mailed May 25, 2011.
International Search Report for International Application No. PCT/US2011/021794 mailed Sep. 23, 2011.
International Serach Report for International Application No. PCT/US2011/050787; Mailing date Mar. 11, 2011.
Japanese Office Action and English Language summary for JP2012-550042 filed Jul. 20, 2012; based on International Application No. PCT/US2011/021249 filed Jan. 14, 2011.
Japanese Office Action and English Language summary for JP2012-550044 filed Jul. 20, 2012; based on International Application No. PCT/US2011/021252 filed Jan. 14, 2011.
Japanese Office Action and English Language summary for JP2012-550043 filed Jul. 20, 2012; based on International Application No. PCT/US2011/021250 filed Jan. 14, 2011.
Written Opinion of the International Searching Authority for International Application No. PCT/US2011/021246 mailed Apr. 12, 2011.
Written Opinion of the International Searching Authority for International Application No. PCT/US2011/021247 mailed Aug. 26, 2011.
Written Opinion of the International Searching Authority for International Application No. PCT/US2011/021248 mailed Sep. 19, 2011.
Written Opinion of the International Searching Authority for International Application No. PCT/US2011/021249 mailed Apr. 21, 2011.
Written Opinion of the International Searching Authority for International Application No. PCT/US2011/021250 mailed Apr. 18, 2011.
Written Opinion of the International Searching Authority for International Application No. PCT/US2011/021252 mailed Apr. 27, 2011.
Written Opinion of the International Searching Authority for International Application No. PCT/US2011/021253 mailed Sep. 26, 2011.
Written Opinion of the International Searching Authority for International Application No. PCT/US2011/021259 mailed May 25, 2011.
Written Opinion of the International Searching Authority for International Application No. PCT/US2011/021262 mailed May 11, 2011.
Written Opinion of the International Searching Authority for International Application No. PCT/US2011/021263 mailed May 4, 2011.
Written Opinion of the International Searching Authority for International Application No. PCT/US2011/021264 mailed May 31, 2011.
Written Opinion of the International Searching Authority for International Application No. PCT/US2011/021272 mailed Apr. 7, 2011.
Written Opinion of the International Searching Authority for International Application No. PCT/US2011/021273 mailed Apr. 20, 2011.
Written Opinion of the International Searching Authority for International Application No. PCT/US2011/021278 mailed May 25, 2011.
Written Opinion of the International Searching Authority for International Application No. PCT/US2011/021794 mailed Sep. 23, 2011.
Written Opinion of the International Searching Authority for International Application No. PCT/US2011/050787 mailed Mar. 11, 2011.
Written Opinion of the International Searching Authority for International Application No. PCT/US2011/021253 mailed Mar. 22, 2012.
Written Opinion of the International Searching Authority for International Application No. PCT/US2011/020625 mailed Feb. 25, 2011.
Written Opinion of the International Searching Authority for International Application No. PCT/US2011/021270 mailed May 2, 2011.
Written Opinion of the International Searching Authority for International Application No. PCT/US2011/021274 mailed May 6, 2011.
Written Opinion of the International Searching Authority for International Application No. PCT/US2011/021276 mailed May 17, 2011.
Laser Reverse Engineering with Microscribe, [online], [retrieved Nov. 29, 2011], http://www.youtube.com/watch?v=8VRz_2aEJ4E&feature=PlayList&p=F63ABF74F30DC81B&playnext=1&playnext_from=PL&index=1.
International Search report of the International Application No. PCT/US2013/049562 mailed Nov. 28, 2013.
Written Opinion of the International Searching Authority for International Application No. PCT/US2013/049562 mailed Nov. 28, 2013.
AKCA, Devrim, Full Automatic Registration of Laser Scanner Point Clouds, Optical 3D Measurement Techniques, vol. VI, 2003, XP002590305, ETH, Swiss Federal Institute of Technology, Zurich, Institute of Geodesy and Photogrammetry.
Bornaz, L., et al., Multiple Scan Registration in Lidar Close-Range Applications, The International Archives of the Photogrammetry, Remote Sensing and Spatial Information Sciences, vol. XXXIV, Part 5/W12, Jul. 2003, pp. 72-77, XP002590306.
Brenneke, C., et al., "Using 3D Laser Range Data for Slam In Outdoor Environments", Proceedings of the 2003 IEEE/RSJ International Conference on Intelligent Robots and Systems. (IROS 2003); Las Vegas, NV, Oct. 27-31, 2003.
Elstrom, M.D., Stereo-Based Registration of LADAR and Color Imagery, Part of SPIE Conference on Intelligent Robots and Computer Vision XVII: Algorithms, Techniques, and Active Vision, Boston, MA, Nov. 1998, SPIE vol. 3522, 0277-786X/98.
Godin, G., et al., A Method for the Registration of Attributed Range Images, Copyright 2001, [Retrieved on Jan. 18, 2010 at 03:29 from IEEE Xplore].
Horn, B.K.P., Closed-Form Solution of Absolute Orientation Using Unit Quaternions, J. Opt. Soc. Am. A., vol. 4., No. 4, Apr. 1987, pp. 629-642, ISSN 0740-3232.
Jasiobedzki, Piotr, "Laser Eye—A New 3D Sensor for Active Vision", SPIE—Sensor Fusion VI, vol. 2059, Sep. 7, 1993, pp. 316-321, XP00262856, Boston, U.S.A., Retrieved from the Internet.
Umeda, K., et al., Registration of Range and Color Images Using Gradient Constraints and Ran Intensity Images, Proceedings of the 17th International Conference on Patern Recognition (ICPR'04), Copyright 2010 IEEE.
Williams, J.A., et al., Evaluation of a Novel Multiple Point Set Registration Algorithm, Copyright 2000, [Retrieved on Jan. 18, 2010 at 04:10 from IEEE Xplore].

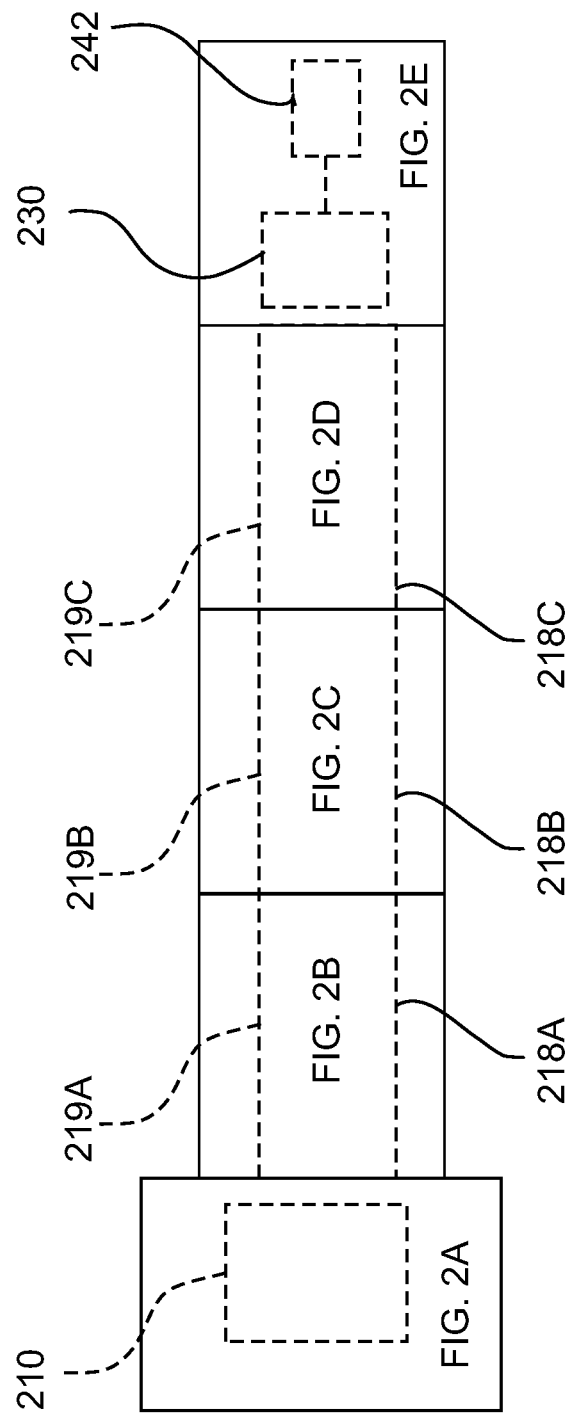

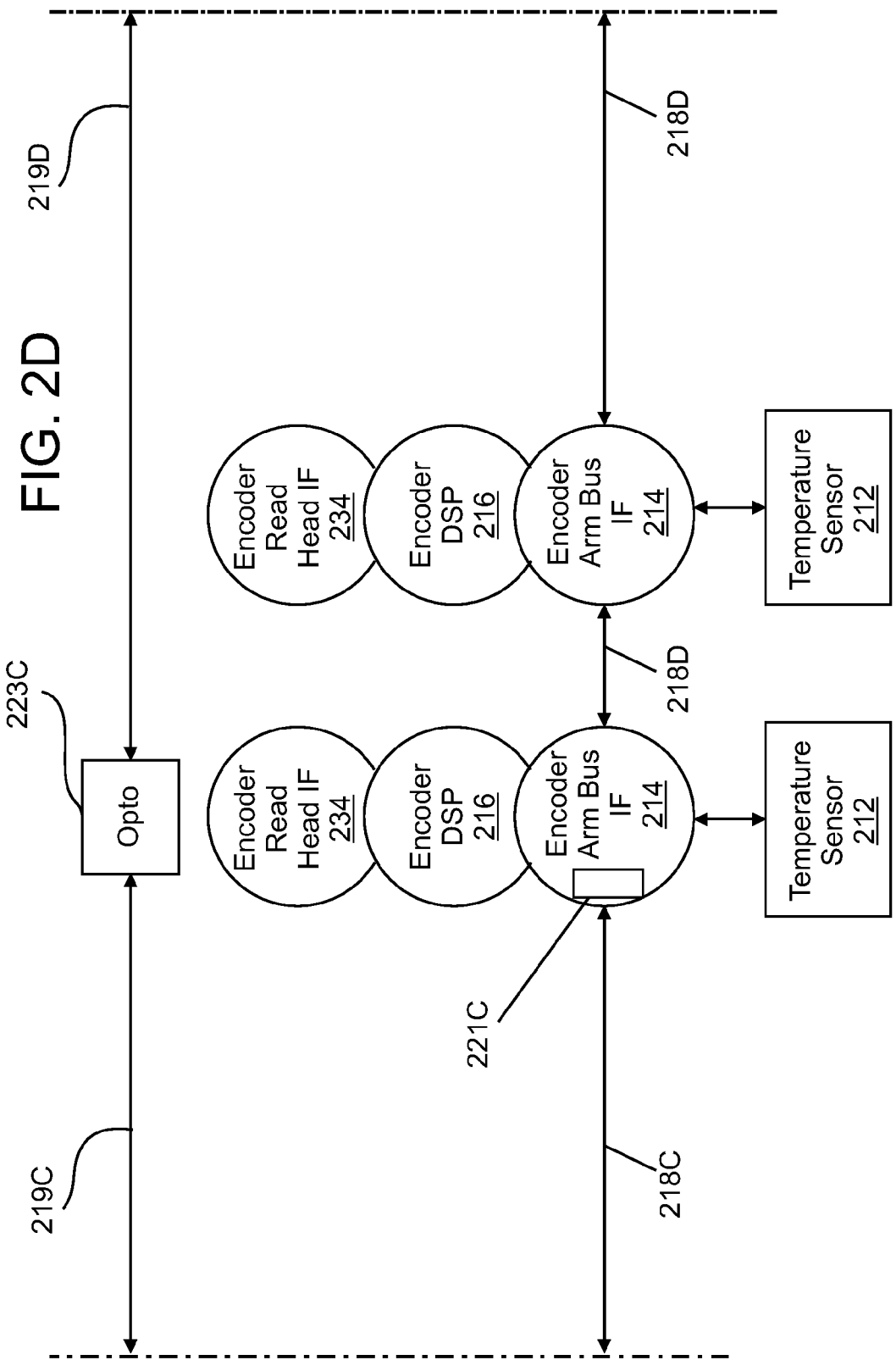

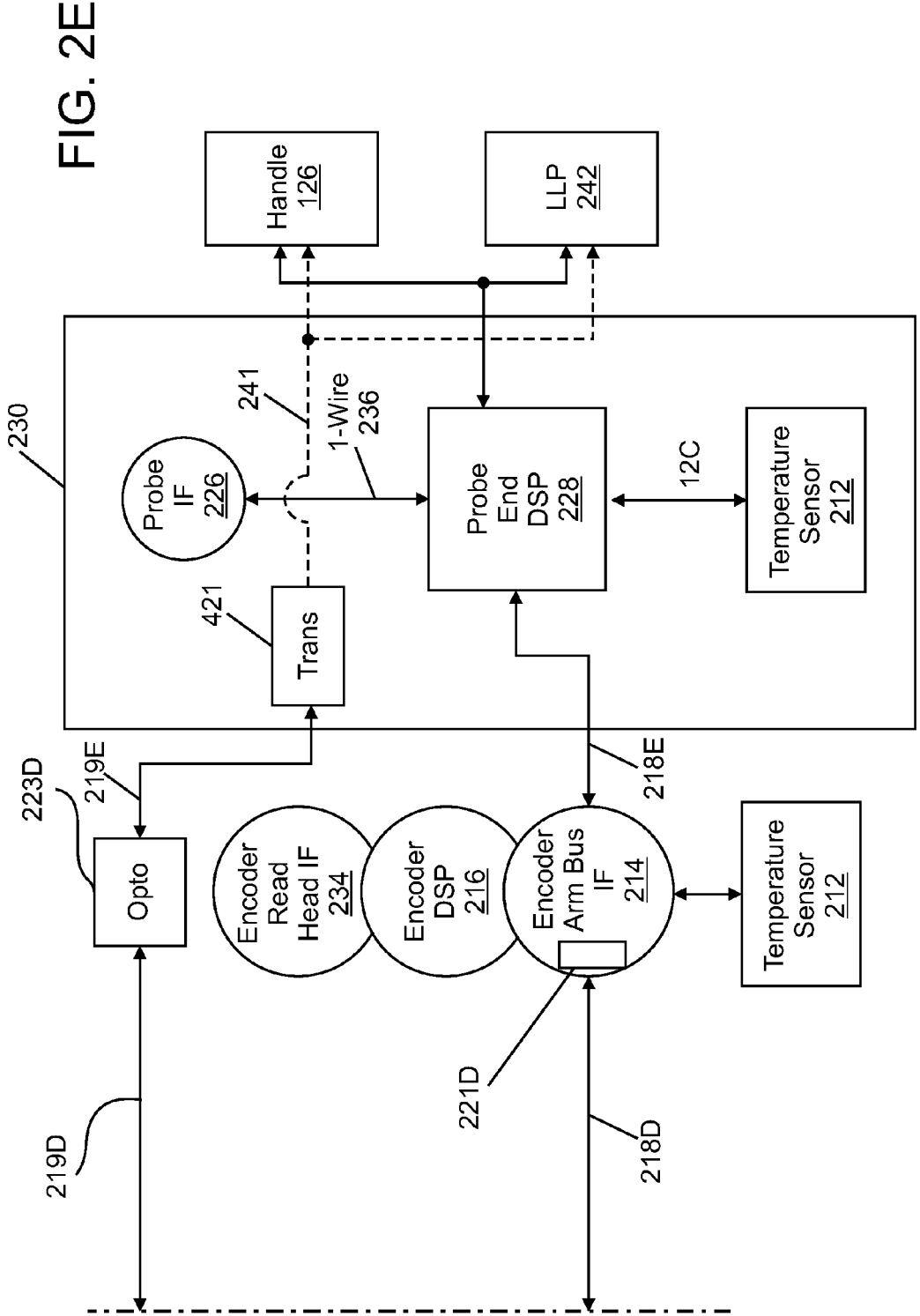

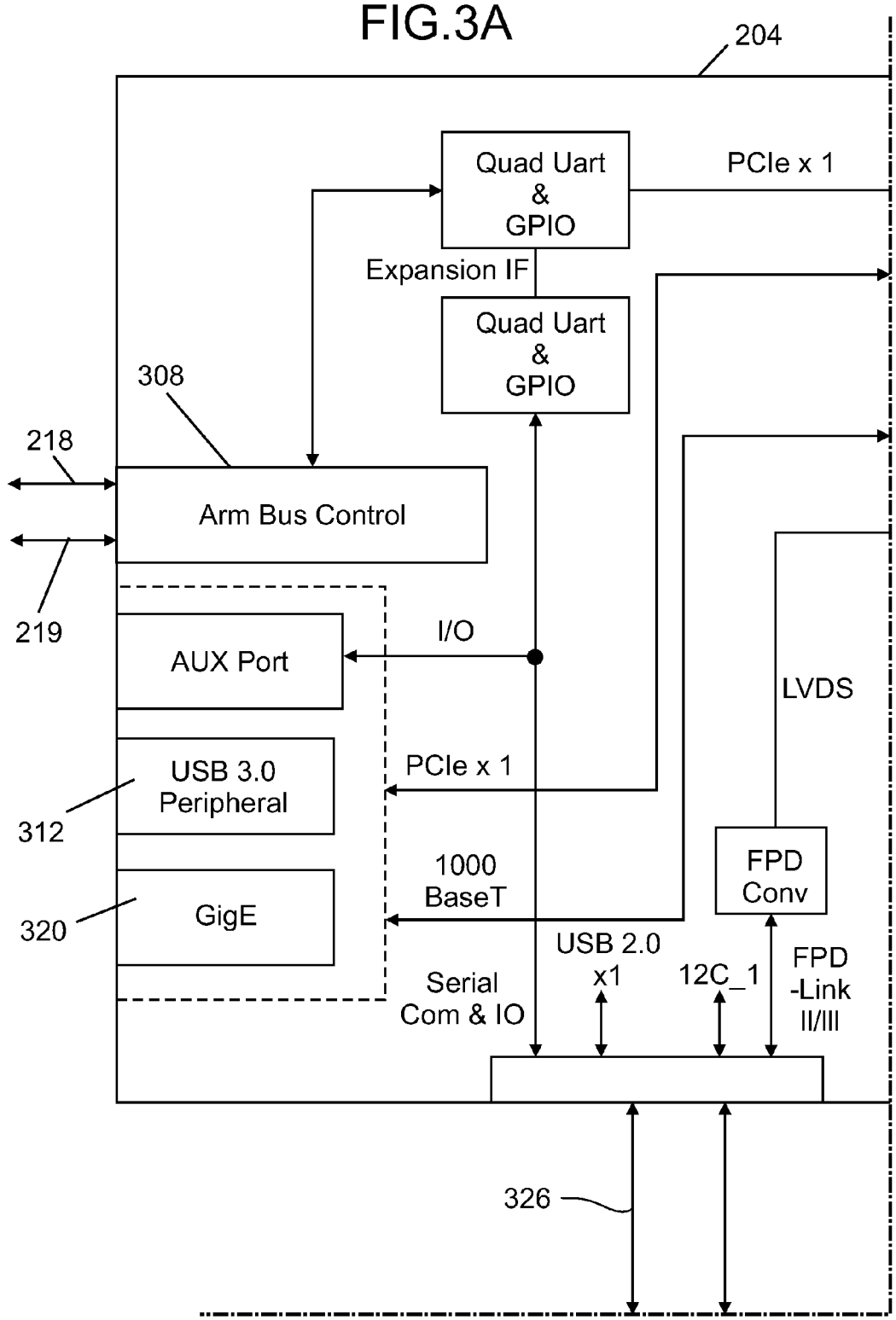

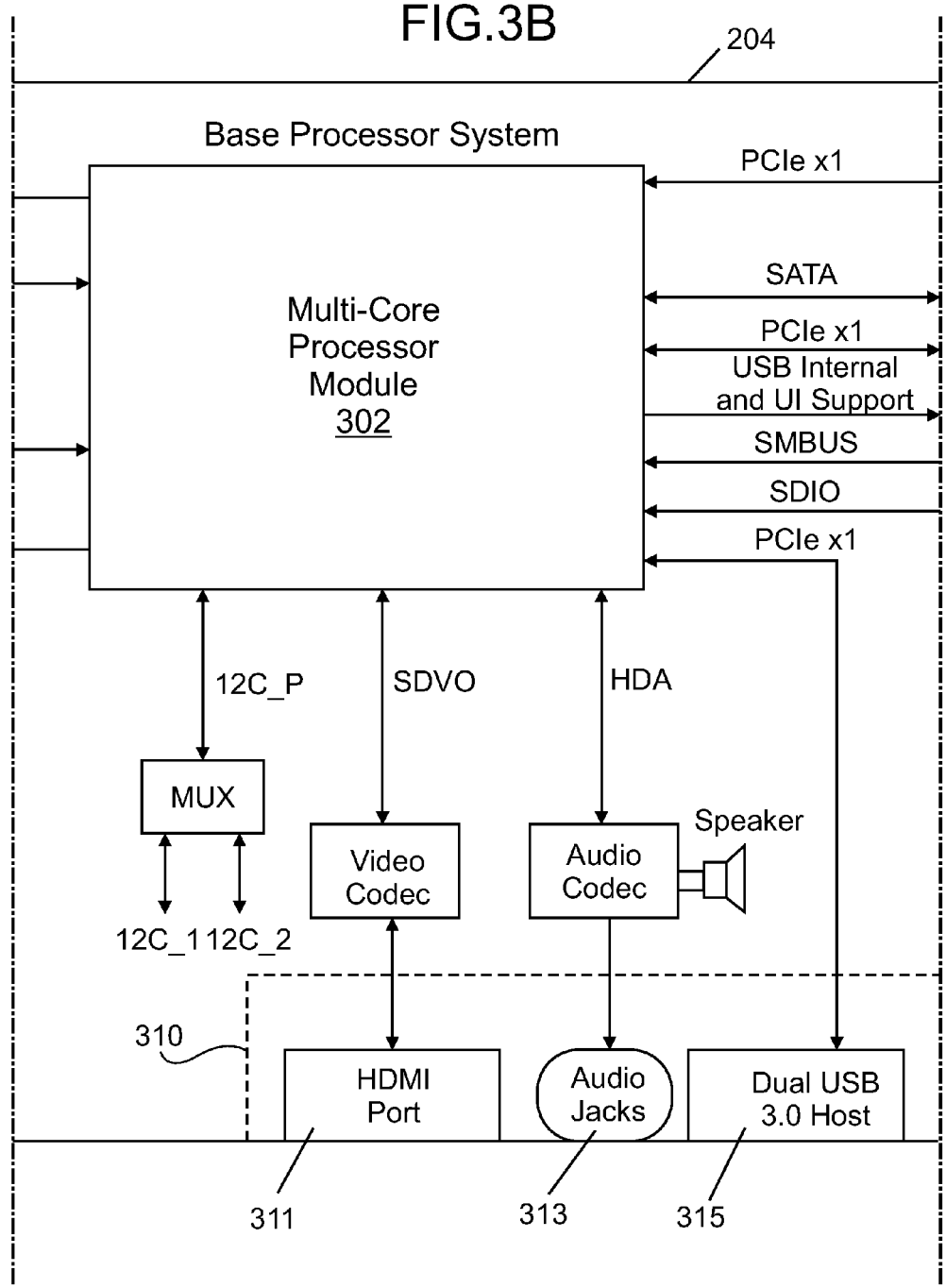

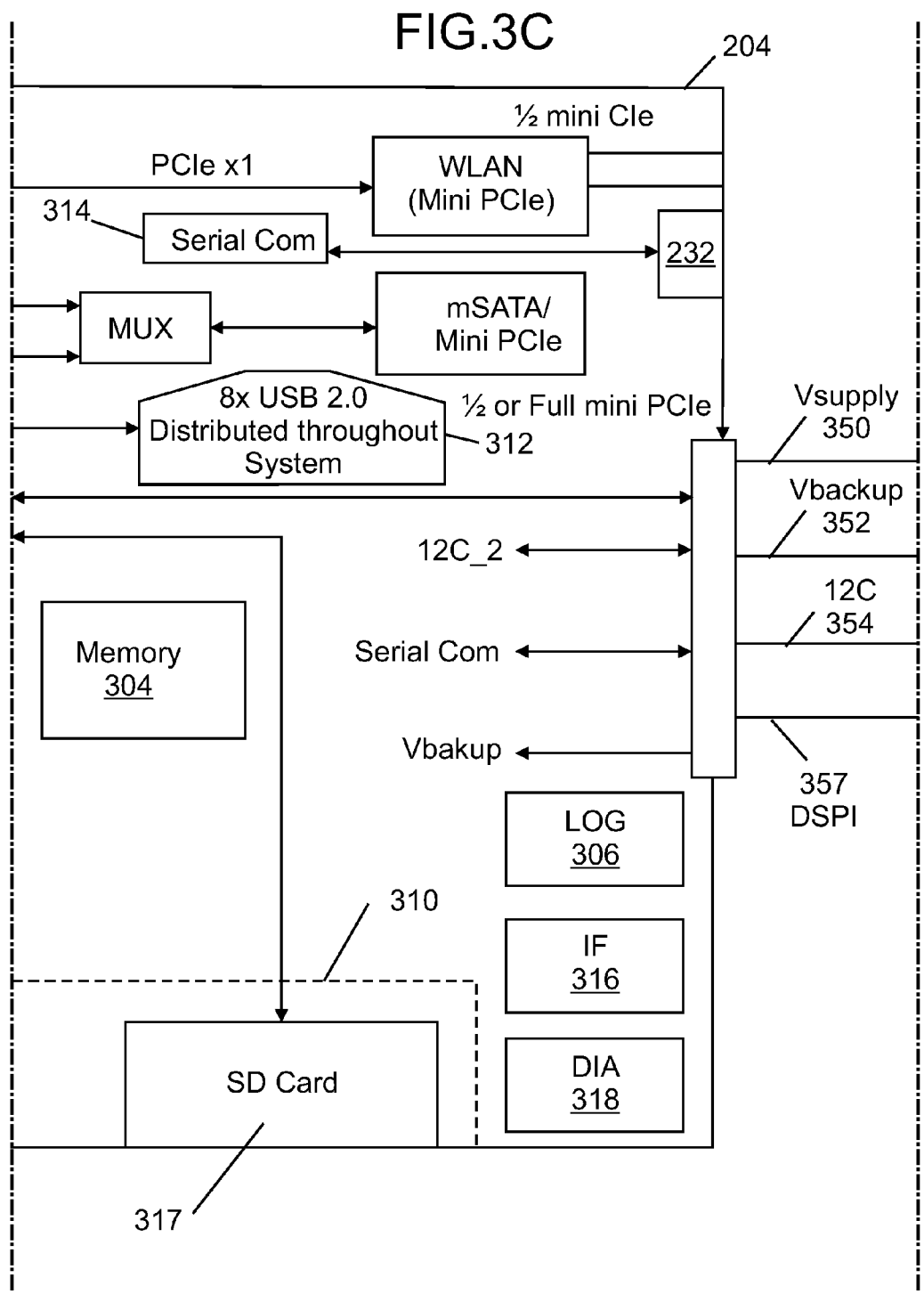

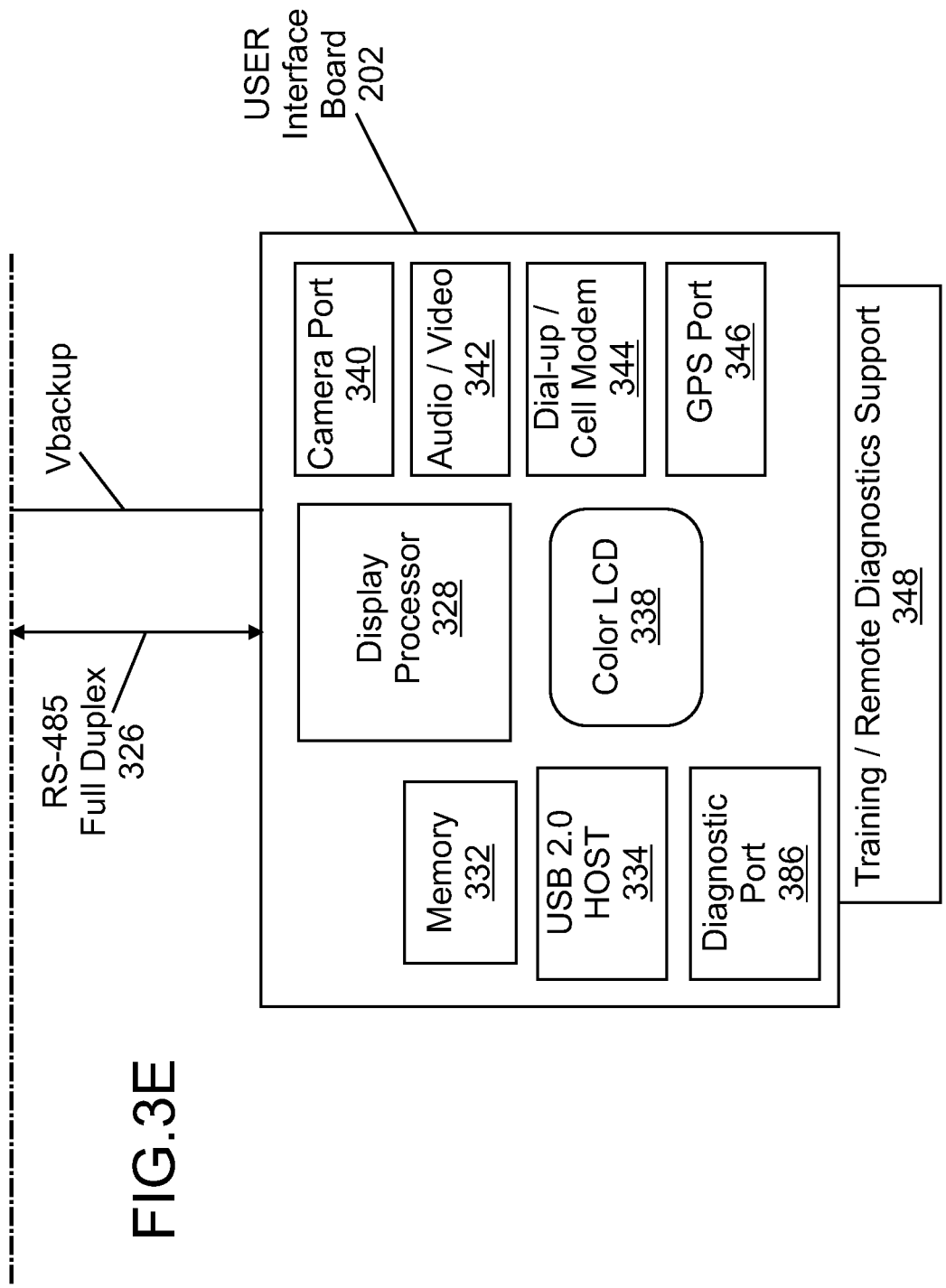

PORTABLE ARTICULATED ARM COORDINATE MEASURING MACHINE WITH OPTICAL COMMUNICATIONS BUS

BACKGROUND

The present disclosure relates to a coordinate measuring machine, and more particularly to a portable articulated arm coordinate measuring machine having one or more high speed communications data busses connected to a probe end of the coordinate measuring machine.

Portable articulated arm coordinate measuring machines (AACMMs) have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3-D) form on a computer screen. In other cases, the data are provided to the user in numeric form, for example when measuring the diameter of a hole, the text "Diameter=1.0034" is displayed on a computer screen.

An example of a prior art portable articulated arm CMM is disclosed in commonly assigned U.S. Pat. No. 5,402,582 ('582), which is incorporated herein by reference in its entirety. The '582 patent discloses a 3-D measuring system comprised of a manually-operated articulated arm CMM having a support base on one end and a measurement probe at the other end. Commonly assigned U.S. Pat. No. 5,611,147 ('147), which is incorporated herein by reference in its entirety, discloses a similar articulated arm CMM. In the '147 patent, the articulated arm CMM includes a number of features including an additional rotational axis at the probe end, thereby providing for an arm with either a two-two-two or a two-two-three axis configuration (the latter case being a seven axis arm).

In contemporary AACMMs, measurement data, including data from accessory devices, may be collected and transmitted in one of three ways: by analog electrical signals transmitted along wires, by digital electrical data transmitted along wires (the collection of wires often referred to as a bus), or by a combination of analog and digital signals transmitted along wires. A limitation of these methods of transmitting data is that the data is transmitted at a relatively slow rate. Part of the reason for the limitation in data rate is the use in many contemporary AACMMs of electrical slip rings, which allow data to be transmitted over a rotating joint. Accessories (if present), in particular, may benefit from the transfer of a relatively large amount of data at a high rate. In fact, a continuing trend in the use of measurement instruments is an increased data transfer rate, which data transfer methods and apparatuses in contemporary AACMMs may not be capable of handling. While existing AACMMs are suitable for their intended purposes, what is needed is a portable AACMM that has certain features of embodiments of the present invention to provide an enhanced electrical bus.

SUMMARY OF THE INVENTION

An embodiment is a portable articulated arm coordinate measurement machine (AACMM). The portable articulated arm coordinate measurement machine (AACMM), includes a manually positionable articulated arm portion having opposed first end and second end, the arm portion including a plurality of connected arm segments, each of the arm segments including at least one position transducer for producing a position signal, wherein the plurality of arm segments includes a first arm segment; a measurement device coupled to the first end; an electronic circuit configured to receive the position signal from the at least one position transducer and to provide data corresponding to a position of the measurement device; a probe end disposed between the measurement device and the first end; a first bus for communication with the electronic circuit, wherein at least a portion of the first bus is an optical communication bus configured to transmit light; and a rotary coupler having a first portion and a second portion, the second portion configured to rotate relative to the first portion, the first portion affixed to the first arm segment, the rotary coupler configured to transfer signals on the optical communication bus between the first portion and the second portion.

In accordance with another embodiment, a rotary coupler transducer cartridge comprises a mechanical assembly including a first portion and a second portion, wherein the first portion is configured to rotate relative to the second portion; a first bearing having a first part and a second part, the first part affixed to the first portion and the second part affixed to the second portion; a second bearing having a third part and a fourth part, the third part affixed to the first portion and the fourth part affixed to the second portion; a transducer configured to measure an angle of rotation of the first portion relative to the second portion, the transducer including a first element and a second element, the first element affixed to the first portion and the second element affixed to the second portion; and a rotary coupler having a first component and a second component, the first component attached to the first portion and the second component attached to the second portion, the first component attached to a first end of a first optical fiber and the second component attached to a second end of a second optical fiber, wherein the rotary coupler is configured to transmit light between the first fiber and the second fiber.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 1, including

DETAILED DESCRIPTION

An embodiment of the present invention provides an enhanced AACMM that includes multiple buses operating independently of each other for transmitting data within the AACMM.

Figure 1A:
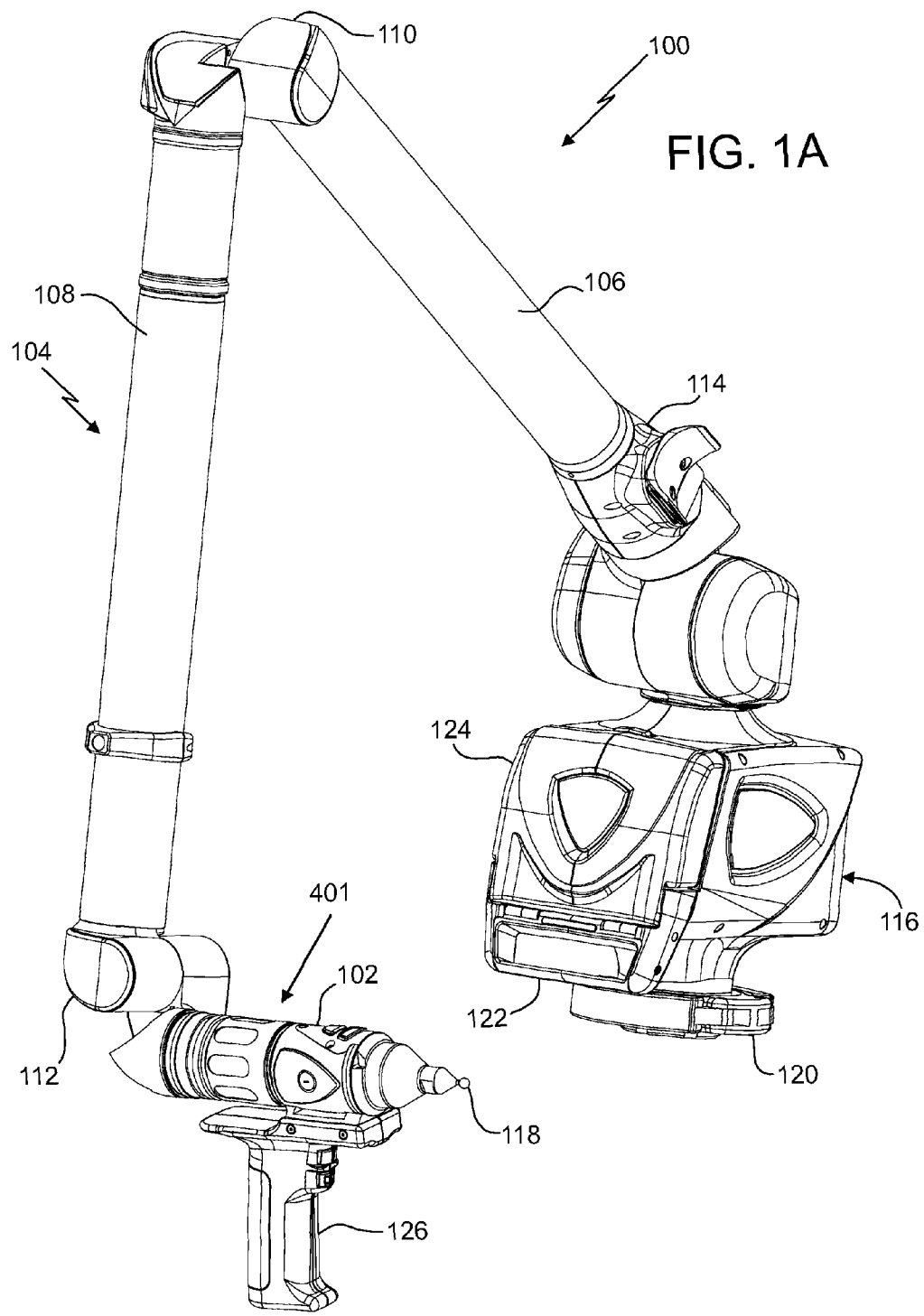
FIGS. 1A and 1B, are perspective views of a portable articulated arm coordinate measuring machine (AACMM) having embodiments of various aspects of the present invention therewithin.
Figure 1B:
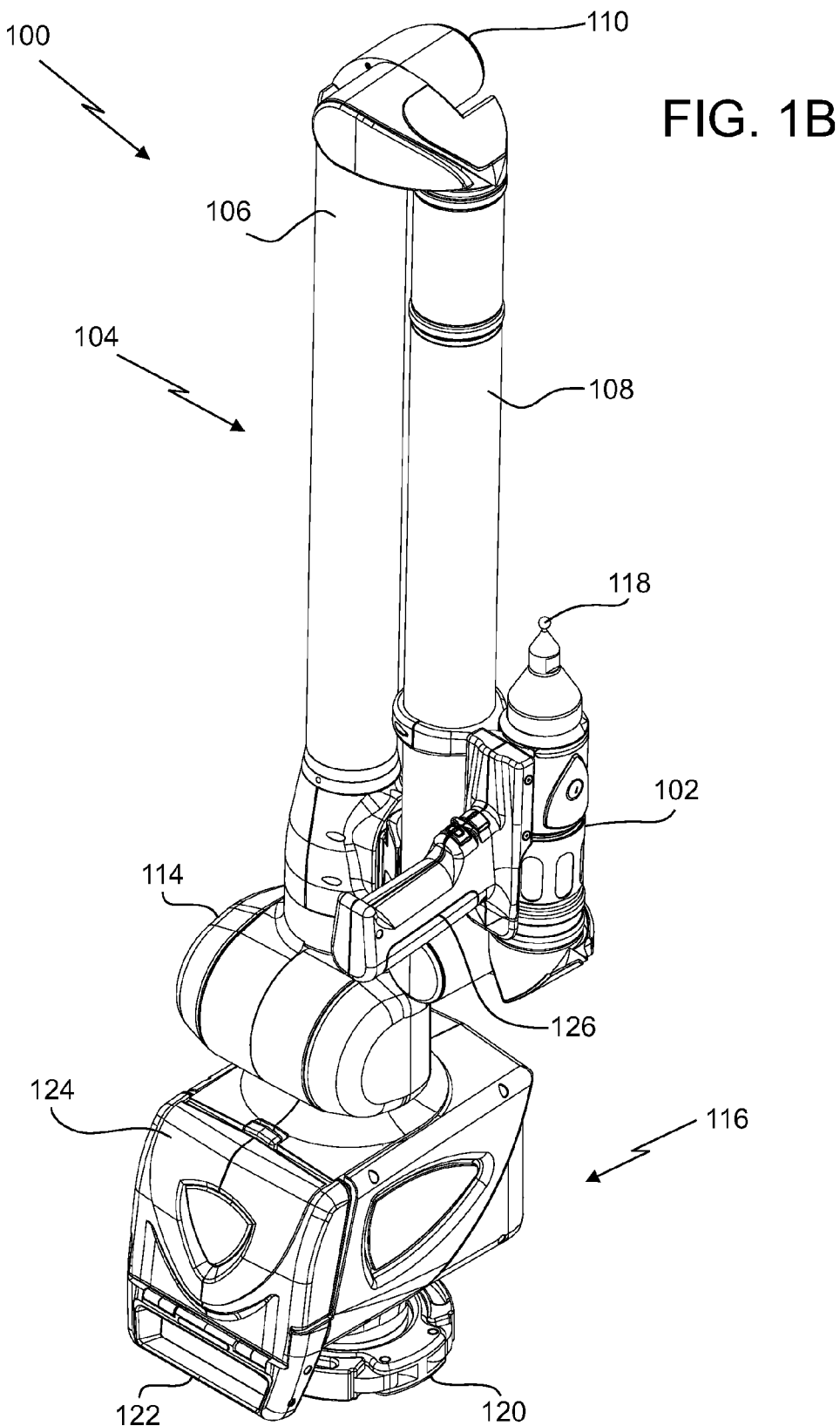

FIGS. 1A and 1B illustrate, in perspective, an AACMM 100 according to various embodiments of the present invention, an articulated arm being one type of coordinate measuring machine. As shown in FIGS. 1A and 1B, the exemplary AACMM 100 may comprise a six or seven axis articulated measurement device having a probe end 401 that includes a measurement probe housing 102 coupled to an arm portion 104 of the AACMM 100 at one end. The arm portion 104 comprises a first arm segment 106 coupled to a second arm segment 108 by a rotational connection having a first grouping of bearing cartridges 110 (e.g., two bearing cartridges). A second grouping of bearing cartridges 112 (e.g., two bearing cartridges) couples the second arm segment 108 to the measurement probe housing 102. A third grouping of bearing cartridges 114 (e.g., three bearing cartridges) couples the first arm segment 106 to a base 116 located at the other end of the arm portion 104 of the AACMM 100. Each grouping of bearing cartridges 110, 112, 114 provides for multiple axes of articulated movement. Also, the probe end 401 may include a measurement probe housing 102 that comprises the shaft of the seventh axis portion of the AACMM 100 (e.g., a cartridge containing an encoder system that determines movement of the measurement device, for example a contact probe 118, in the seventh axis of the AACMM 100). In this embodiment, the probe end 401 may rotate about an axis extending through the center of measurement probe housing 102. In use of the AACMM 100, the base 116 is typically affixed to a work surface.

Each bearing cartridge within each bearing cartridge grouping 110, 112, 114 typically contains an encoder system (e.g., an optical angular encoder system). The encoder system (i.e., transducer) provides an indication of the position of the respective arm segments 106, 108 and corresponding bearing cartridge groupings 110, 112, 114 that all together provide an indication of the position of the probe 118 with respect to the base 116 (and, thus, the position of the object being measured by the AACMM 100 in a certain frame of reference—for example a local or global frame of reference). The arm segments 106, 108 may be made from a suitably rigid material such as but not limited to a carbon composite material for example. A portable AACMM 100 with six or seven axes of articulated movement (i.e., degrees of freedom) provides advantages in allowing the operator to position the probe 118 in a desired location within a 360° area about the base 116 while providing an arm portion 104 that may be easily handled by the operator. However, it should be appreciated that the illustration of an arm portion 104 having two arm segments 106, 108 is for exemplary purposes, and the claimed invention should not be so limited. An AACMM 100 may have any number of arm segments coupled together by bearing cartridges (and, thus, more or less than six or seven axes of articulated movement or degrees of freedom).

Figure 10:
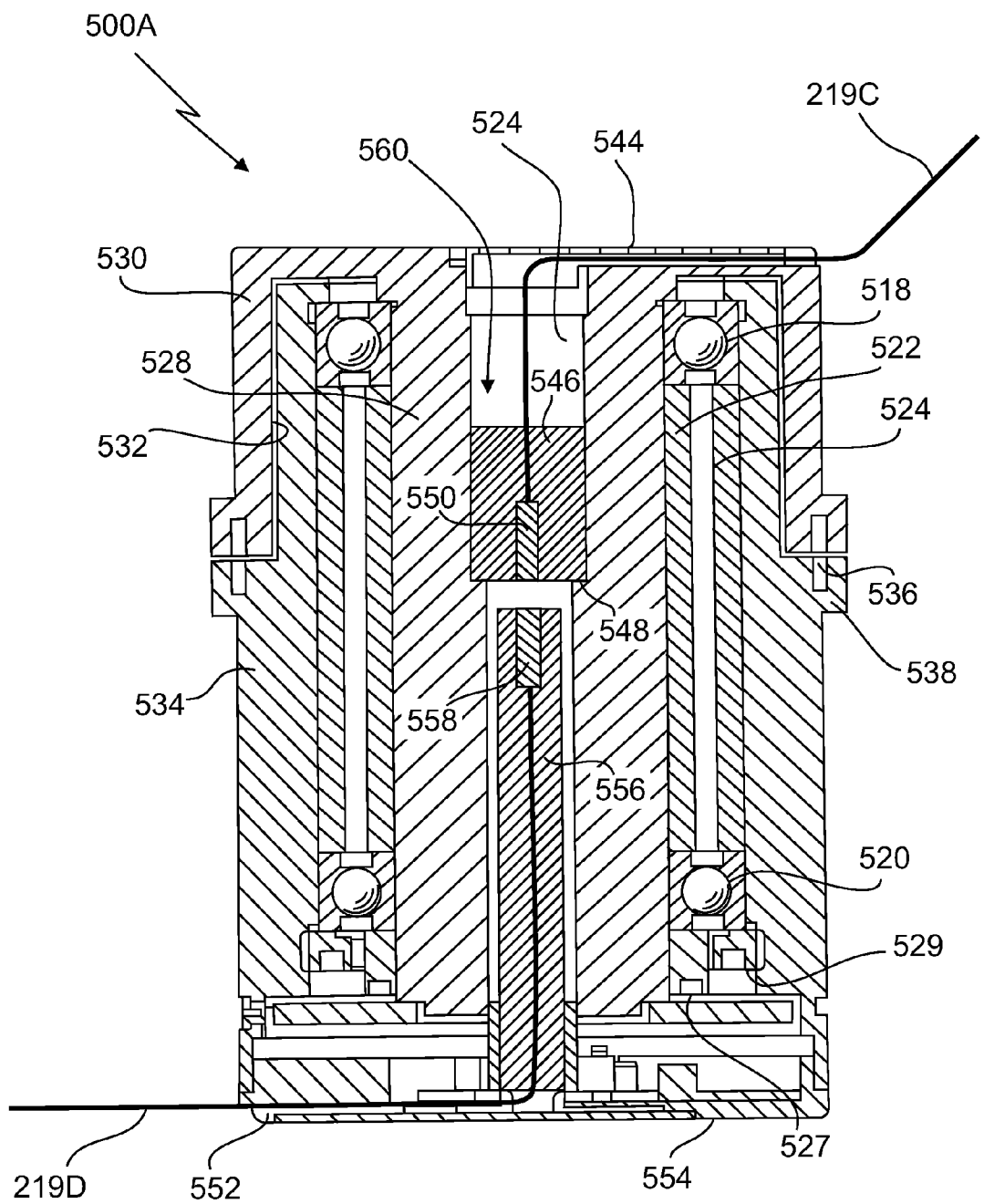
FIG. 10 is a sectional view of a cartridge of FIG. 9 with an optical rotary joint in accordance with an embodiment.
Figure 11:
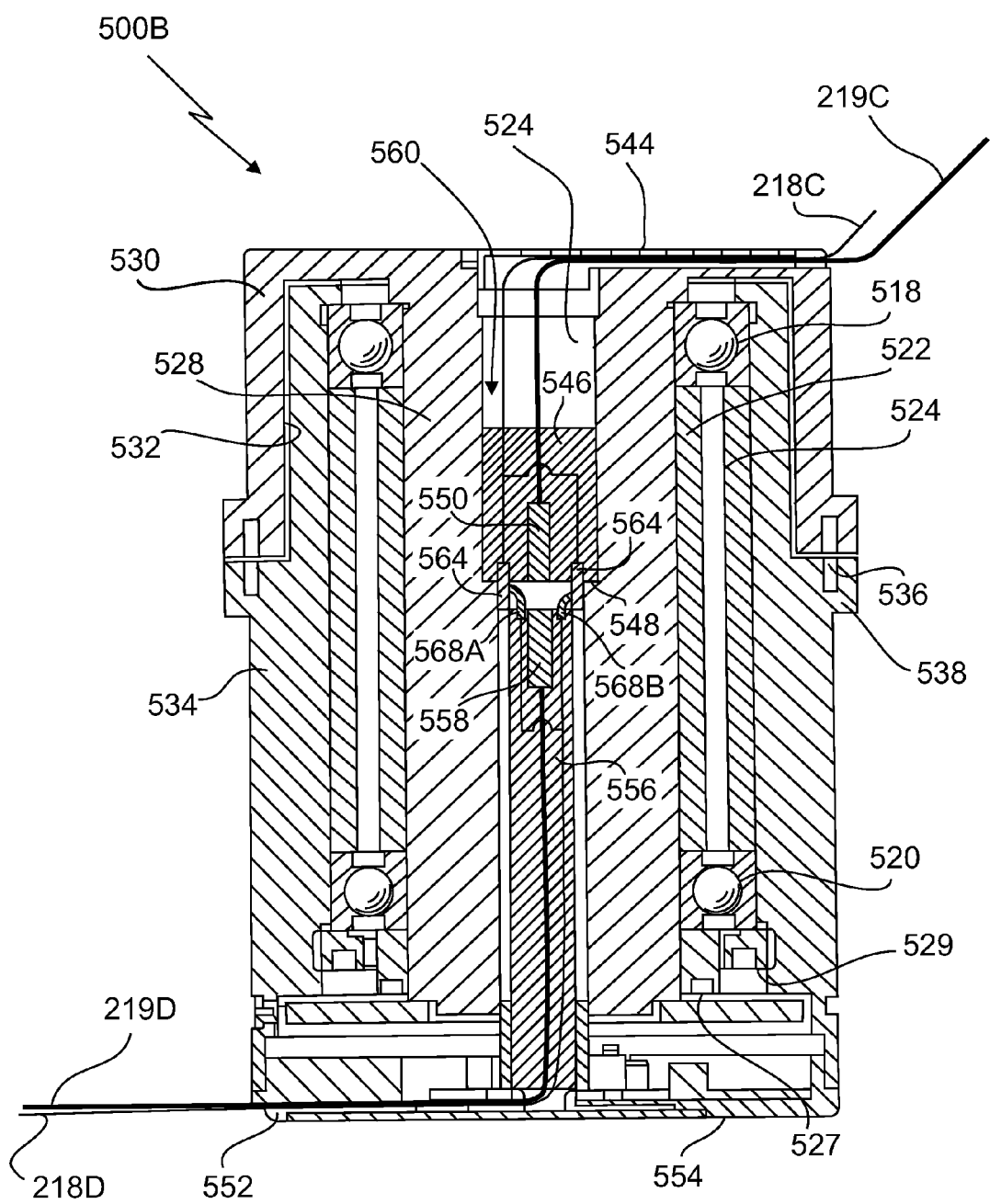
FIG. 11 is a sectional view of a cartridge of FIG. 9 with an integrated fiber-optic and electrical slip ring in accordance with another embodiment.

As will be discussed in more detail below, each of the groupings of bearing cartridges 110, 112, 114 may include one or more optical rotary joint 540 or slip ring 560 (FIG. 10 and FIG. 11). The optical rotary joint 540 or slip ring 560 allows for the transfer of electrical and optical signals along the length of the arm portion 104 while still allowing each of the groupings of bearing cartridges 110, 112, 114 to rotate substantially unencumbered.

The probe 118 is detachably mounted to the measurement probe housing 102, which is connected to bearing cartridge grouping 112. A handle accessory 126 is removable with respect to the measurement probe housing 102 by way of, for example, a quick-connect interface. In the exemplary embodiment, the quick-connect interface may include both mechanical fastening members that secure the accessory to the housing 102 and electrical connections that allow the user to control the probe 118 through the accessory (e.g. actuation buttons) and also provide for high speed data communication between the accessory and the base 116. The handle 126 may be replaced with another device (e.g., a laser line probe, a bar code reader), thereby providing advantages in allowing the operator to use different measurement devices with the same AACMM 100. In exemplary embodiments, the probe housing 102 houses a removable probe 118, which is a contacting measurement device and may have different tips 118 that physically contact the object to be measured, including, but not limited to: ball, touch-sensitive, curved and extension type probes. In other embodiments, the measurement is performed, for example, by a non-contacting device such as a laser line probe (LLP). In an embodiment, the handle 126 is replaced with the LLP using the quick-connect interface. Other types of accessory devices may replace the removable handle 126 to provide additional functionality. Examples of such accessory devices include, but are not limited to, one or more illumination lights, a temperature sensor, a thermal scanner, a bar code scanner, a projector, a paint sprayer, a camera, a video camera, an audio recording system or the like, for example.

As shown in FIGS. 1A and 1B, the AACMM 100 includes the removable handle 126 that provides advantages in allowing accessories or functionality to be changed without removing the measurement probe housing 102 from the bearing cartridge grouping 112. As discussed in more detail below with respect to FIG. 2, the removable handle 126 may also include one or more electrical connectors that allow electrical power and data to be exchanged with the handle 126 and the corresponding electronics located in the probe end 401 and the base 116.

In various embodiments, and as will be discussed in more detail below, each rotational connection includes a grouping of bearing cartridges 110, 112, 114 that allow the arm portion 104 of the AACMM 100 to move about multiple axes of rotation. As mentioned, each bearing cartridge grouping 110, 112, 114 includes corresponding encoder systems, such as optical angular encoders for example, that are each arranged coaxially with the corresponding axis of rotation of, e.g., the arm segments 106, 108. The optical encoder system detects rotational (swivel) or transverse (hinge) movement of, e.g., each one of the arm segments 106, 108 about the corresponding axis and transmits a signal to an electronic data processing system within the AACMM 100 as described in more detail herein below. Each individual raw encoder count is sent separately to the electronic data processing system as a signal where it is further processed into measurement data. No position calculator separate from the AACMM 100 itself (e.g., a serial box) is required, as disclosed in commonly assigned U.S. Pat. No. 5,402,582 ('582).

The base 116 may include an attachment device or mounting device 120. The mounting device 120 allows the AACMM 100 to be removably mounted to a desired location, such as an inspection table, a machining center, a wall or the floor for example. In one embodiment, the base 116 includes a handle portion 122 that provides a convenient location for the operator to hold the base 116 as the AACMM 100 is being moved. In one embodiment, the base 116 further includes a movable cover portion 124 that folds down to reveal a user interface, such as a display screen.

In accordance with an embodiment, the base 116 of the portable AACMM 100 contains or houses an electronic data processing system that includes two primary components: a base processing system that processes the data from the various encoder systems within the AACMM 100 as well as data representing other arm parameters to support three-dimensional (3-D) positional calculations; and a user interface processing system that includes an on-board operating system, a touch screen display, and resident application software that allows for relatively complete metrology functions to be implemented within the AACMM 100 without the need for connection to an external computer.

The electronic data processing system in the base 116 may communicate with the encoder systems, sensors, and other peripheral hardware located away from the base 116 (e.g., a LLP that can be mounted to or within the removable handle 126 on the AACMM 100). The electronics that support these peripheral hardware devices or features may be located in each of the bearing cartridge groupings 110, 112, 114 located within the portable AACMM 100.

Figure 2A:
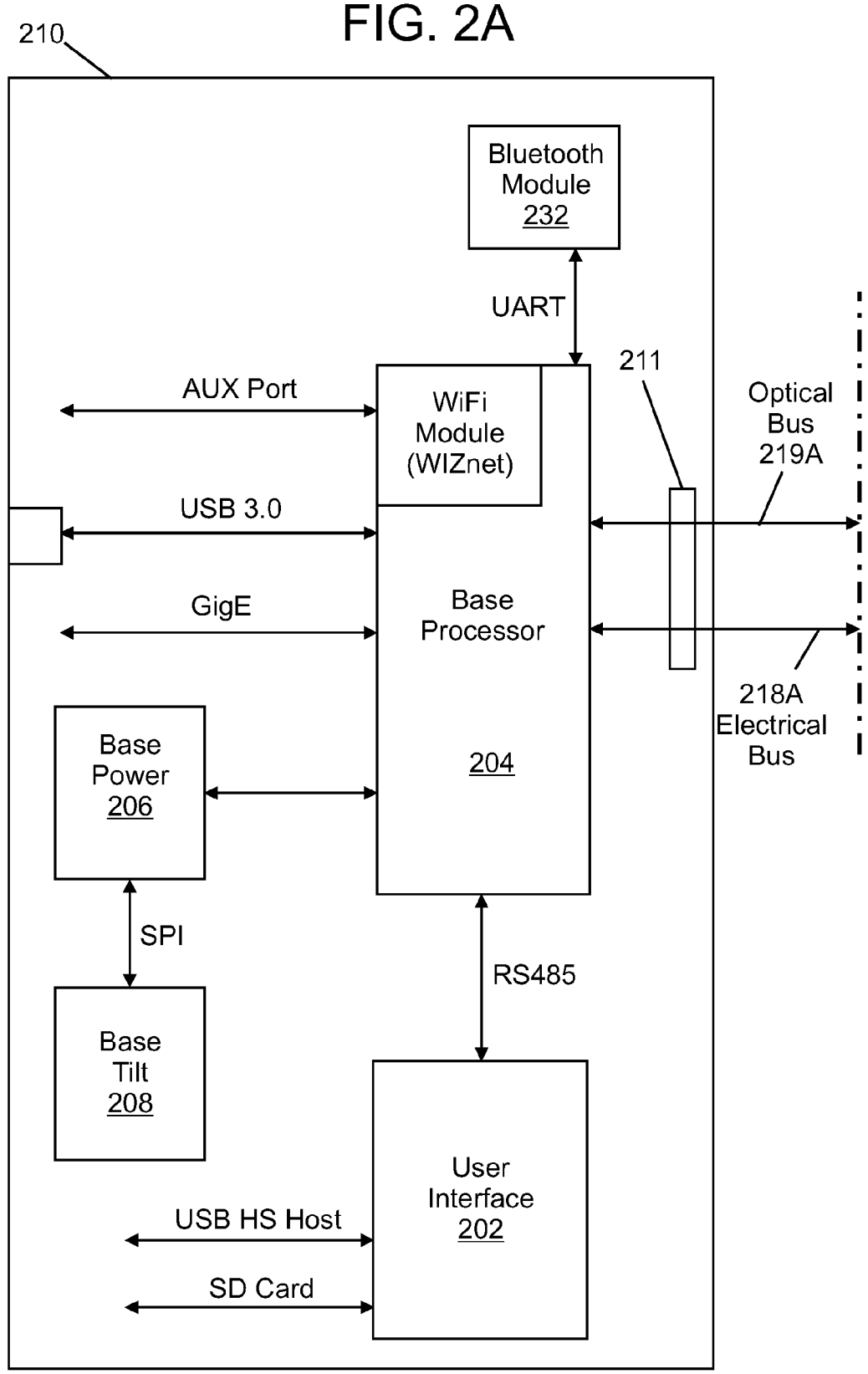
FIG. 2, including FIGS. 2A-2E taken together, is a block diagram of electronics utilized as part of the AACMM of FIG. 1 in accordance with an embodiment.
Figure 2B:
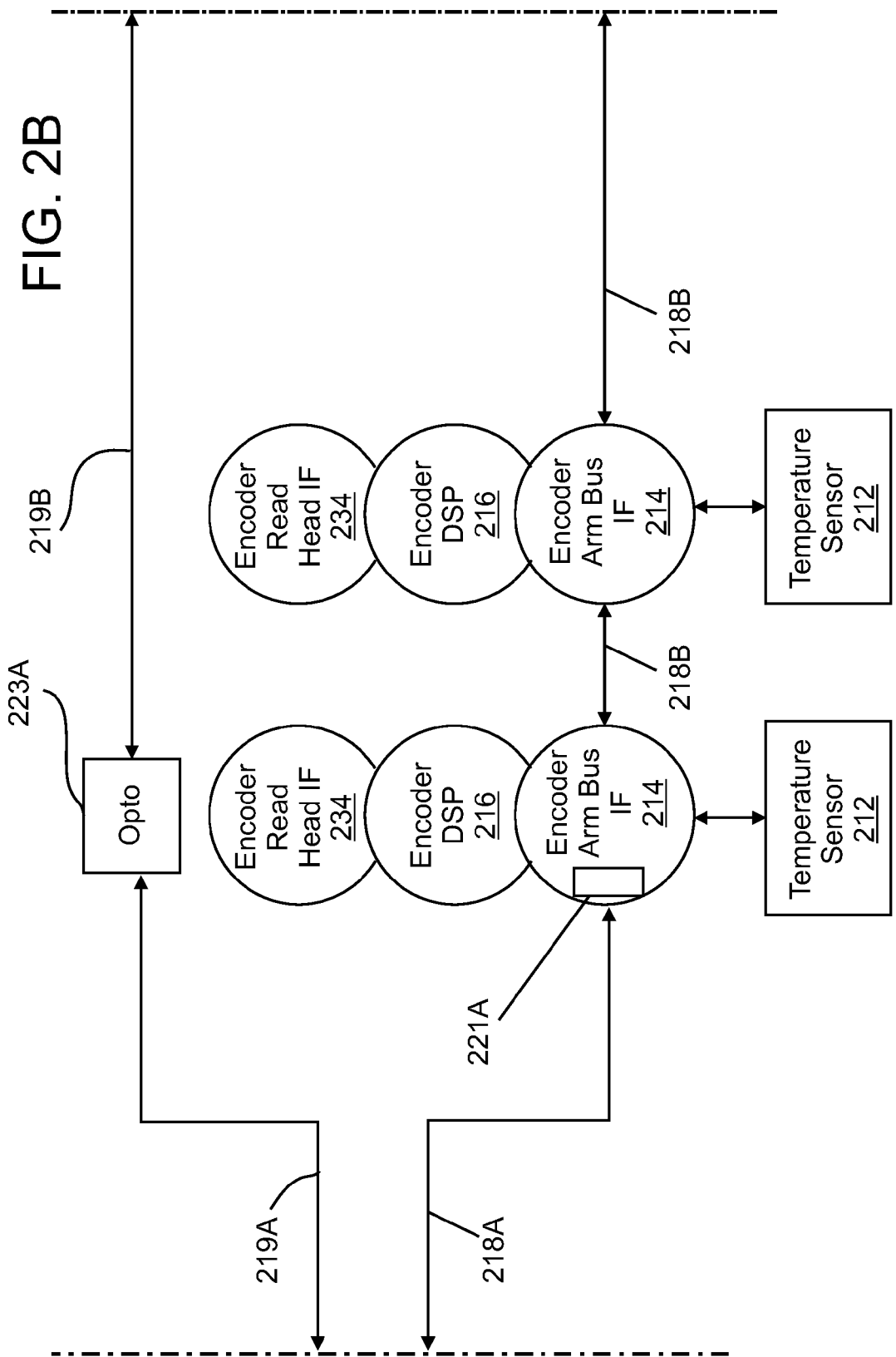
Figure 2C:
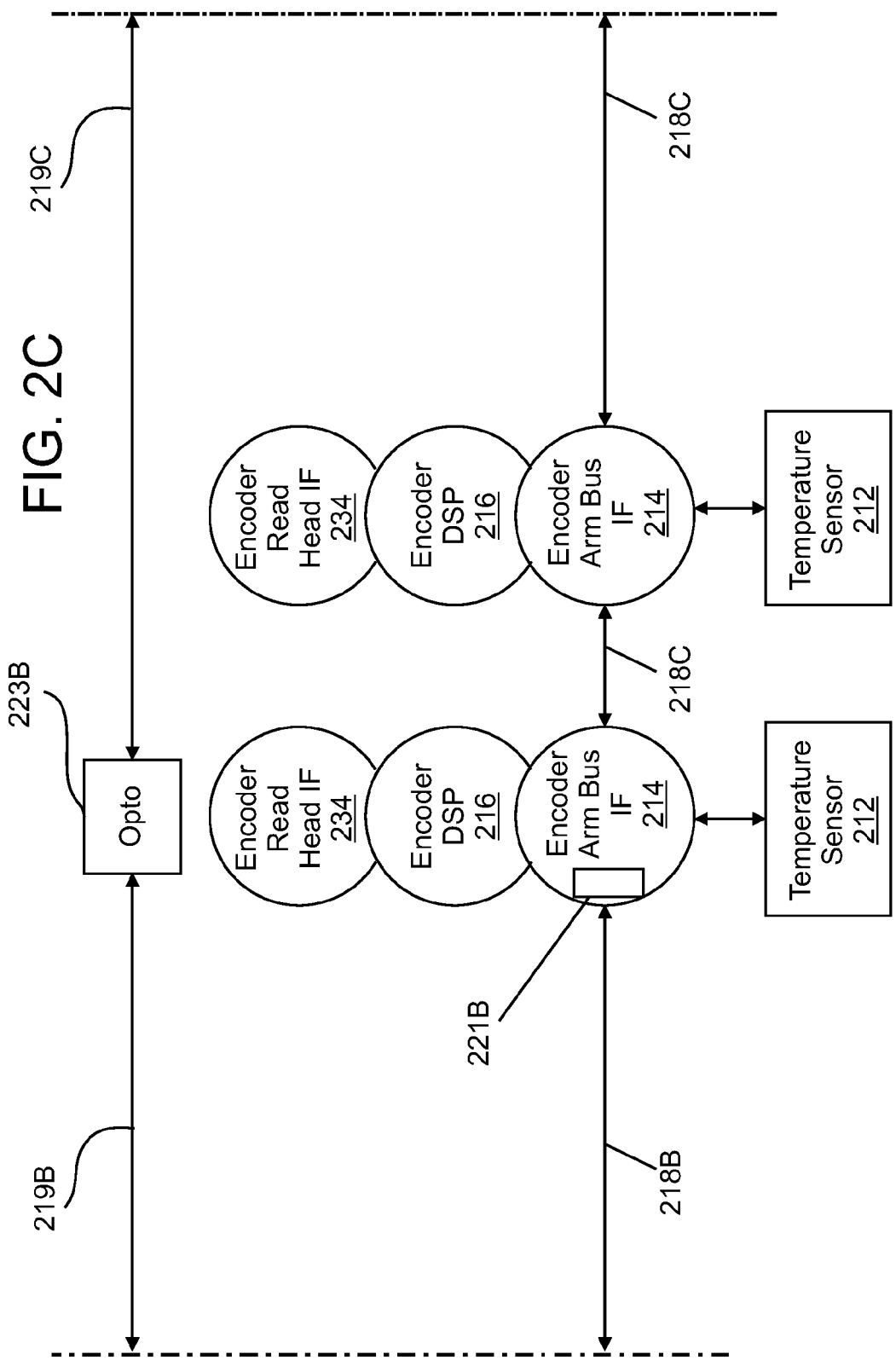

FIG. 2 is a block diagram of electronics utilized in an AACMM 100 in accordance with an embodiment. The embodiment shown in FIG. 2A includes an electronic data processing system 210 including a base processor board 204 for implementing the base processing system, a user interface board 202, a base power board 206 for providing power, a Bluetooth module 232, and a base tilt board 208. The user interface board 202 includes a computer processor for executing application software to perform user interface, display, and other functions described herein.

As shown in FIG. 2A-2D, the electronic data processing system 210 is in communication with the aforementioned plurality of encoder systems via one or more electrical buses 218A, 218B, 218C, 218D. It should be appreciated that the data processing system 210 may include additional components, such as connector 211, for example, that are configured to adapt the incoming and outgoing signals to an optical bus 219A-219D and an electrical bus 218A-218D. The conversion between optical and electrical signals may be carried out by a component configured to convert between electrical and optical signals, for example, on a circuit board associated with FIG. 2A. For the clarity purposes, not all of these components are shown in FIG. 2. In the embodiment depicted in FIG. 2, each encoder system generates encoder data and includes: an encoder bus interface 214, an encoder digital signal processor (DSP) 216, an encoder read head interface 234, and a temperature sensor 212. Other devices, such as strain sensors, may be attached to the electrical bus 218 or to optical bus 219.

Also shown in FIG. 2E are probe end electronics 230 that are in communication with the electrical bus 218E and optical bus 219E. The probe end electronics 230 include a probe end DSP 228, a temperature sensor 212, a handle/LLP electrical bus 240 and a bus 241 that connects with the handle 126 or the LLP 242 via the quick-connect interface in an embodiment, and a probe interface 226. The bus 241 may be an electrical bus, an optical bus, or a bus that includes both optical and electrical signals. The quick-connect interface allows access by the handle 126 to the electrical bus 240 and bus 241 for the LLP and other accessories. The electrical bus may contain data lines, control lines, and power lines. The optical bus may contain data lines and control lines. In an embodiment, the probe end electronics 230 are located in the measurement probe housing 102 on the AACMM 100. In an embodiment, the handle 126 may be removed from the quick-connect interface and measurement may be performed by the laser line probe (LLP) 242 communicating with the probe end electronics 230 of the AACMM 100 via the handle/LLP electrical bus 240 or optical bus 241. It should be appreciated that while the electrical bus 218 and optical bus 219 are discussed as individual components, each of the busses 218, 219 may be formed from a plurality of individual bus segments (e.g. bus 218A-218E, bus 219A-219E) that are serially connected to transfer signals within the AACMM 100. As is discussed in more detail herein, each segment may be separated by a rotary coupler (FIG. 10 and FIG. 11) having an electrical slip ring 221A-221D and an optical coupler 223A-223D.

In an embodiment, the electronic data processing system 210 is located in the base 116 of the AACMM 100, the probe end electronics 230 are located in the measurement probe housing 102 of the AACMM 100, and the encoder systems are located in the bearing cartridge groupings 110, 112, 114. The probe interface 226 may connect with the probe end DSP 228 by any suitable communications protocol, including commercially-available products from Maxim Integrated Products, Inc. that embody the 1-wire(r) communications protocol 236. The optical bus 219 may be selected to be compatible with a standard communications protocol such as Universal the Serial Bus (USB) 1.0, USB 2.0, USB 3.0, Gigabit Ethernet (IEEE 802.3-2008 standard), Peripheral Component Interconnect (PCI) Express, FireWire, Camera Link or any other defined protocols.

FIGS. 3A-3C are block diagrams describing detailed features of the electronic data processing system 210 (FIG. 2A) of the AACMM 100 in accordance with an embodiment. In an embodiment, the electronic data processing system 210 is located in the base 116 of the AACMM 100 and includes the base processor board 204, the user interface board 202, a base power board 206, a Bluetooth module 232, and a base tilt module 208.

Figure 3:
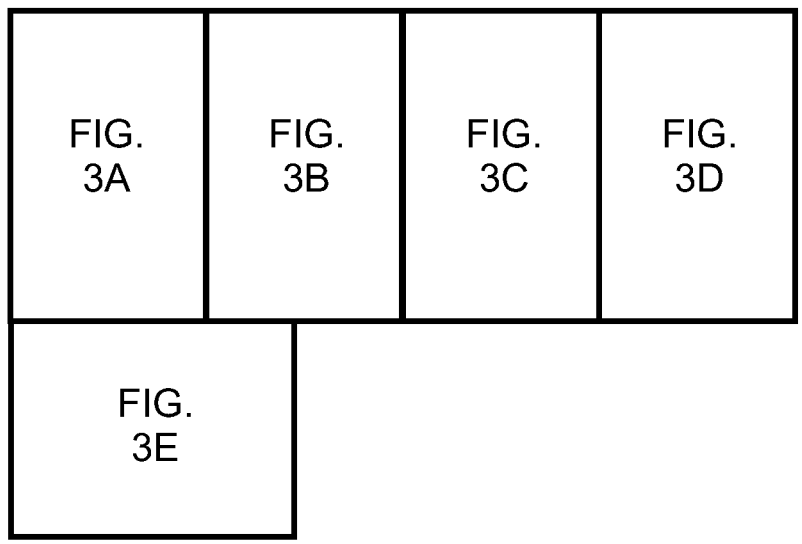
FIG. 3, including FIGS. 3A-3E taken together, is a block diagram describing detailed features of the electronic data processing system of FIG. 2 in accordance with an embodiment.
Figure 3D:
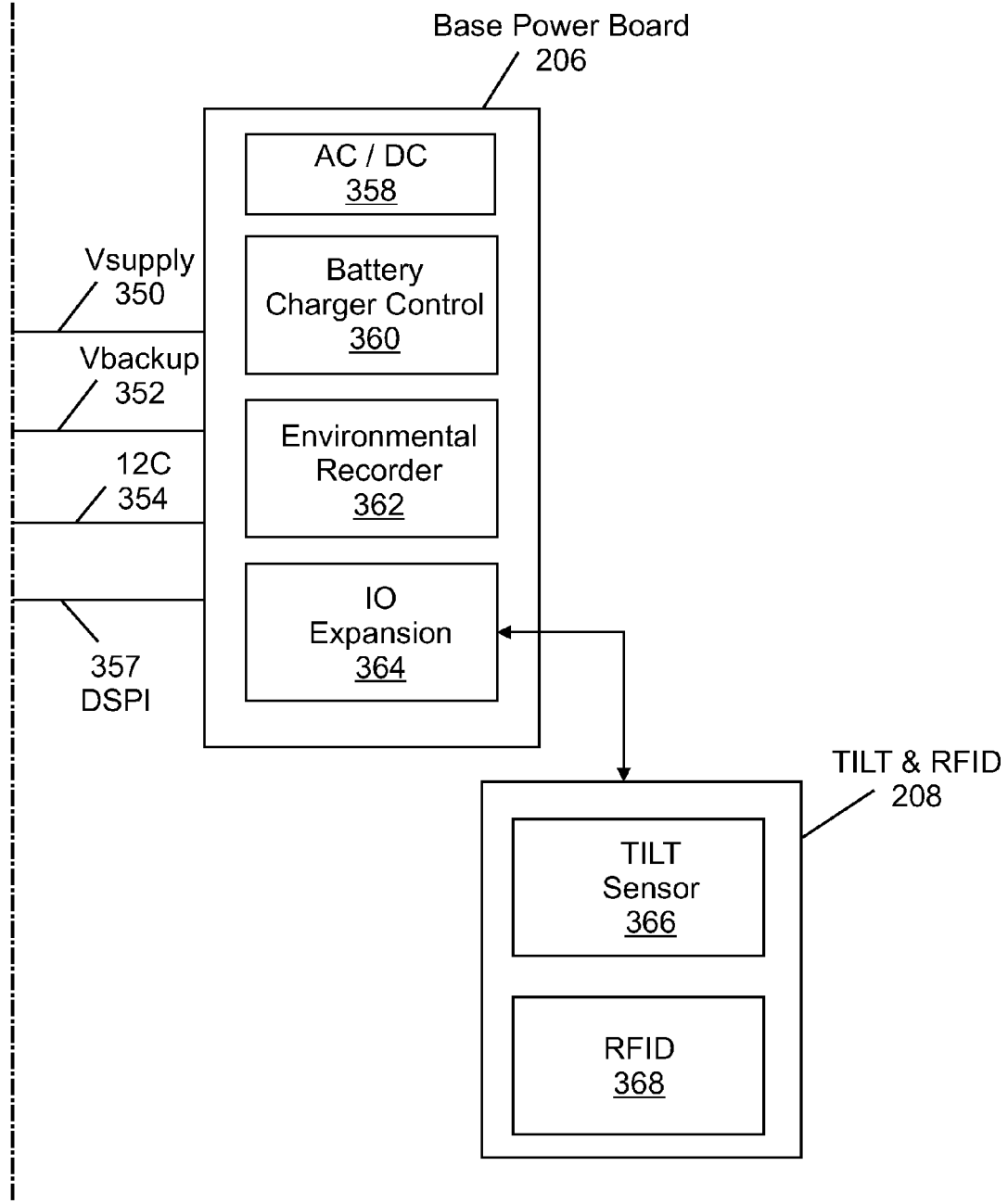

In an embodiment shown in FIGS. 3A-3C, the base processor board 204 includes the various functional blocks illustrated therein. For example, a base processor function 302 is utilized to support the collection of measurement data from the AACMM 100 and receives raw arm data (e.g., encoder system data) via the electrical bus 218, optical bus 219 and a bus control module function 308. The memory function 304 stores programs and static AACMM configuration data. The base processor board 204 also includes an external hardware option port function 310 for communicating with any external hardware devices or accessories such as but not limited to a graphical monitor or television via HDMI port 311, an audio device via port 313, a USB 3.0 port 315 and a flash memory (SD) card via port 317 for example. A real time clock (RTC) and log 306, a battery pack interface (IF) 316, and a diagnostic port 318 are also included in the functionality in an embodiment of the base processor board 204 depicted in FIG. 3.

The base processor board 204 also manages all the wired and wireless data communication with external (host computer) and internal (display processor 328) devices. The base processor board 204 has the capability of communicating with an Ethernet network via a gigabit Ethernet function 320 (e.g., using a clock synchronization standard such as Institute of Electrical and Electronics Engineers (IEEE) 1588), with a wireless local area network (WLAN) via a LAN function 322, and with Bluetooth module 232 via a parallel to serial communications (PSC) function 314. The base processor board 204 also includes a connection to a universal serial bus (USB 3.0) device 312.

The base processor board 204 transmits and collects raw measurement data (e.g., encoder system counts, temperature readings) for processing into measurement data without the need for any preprocessing, such as in the serial box disclosed in the aforementioned '582 patent. The base processor 204 sends the processed data to the display processor 328 on the user interface board 202 via an RS485 interface (IF) 326. In an embodiment, the base processor 204 also sends the raw measurement data to an external computer.

Turning now to the user interface board 202 in FIG. 3, the angle and positional data received by the base processor is utilized by applications executing on the display processor 328 to provide an autonomous metrology system within the AACMM 100. Applications may be executed on the display processor 328 to support functions such as, but not limited to: measurement of features, guidance and training graphics, remote diagnostics, temperature corrections, control of various operational features, connection to various networks, and display of measured objects. Along with the display processor 328 and a liquid crystal display (LCD) 338 (e.g., a touch screen LCD) user interface, the user interface board 202 includes several interface options including a memory 332, a USB Host interface 334, a diagnostic port 336, a camera port 340, an audio/video interface 342, a dial-up/cell modem 344 and a global positioning system (GPS) port 346.

The electronic data processing system 210 shown in FIG. 3 also includes a base power board 206 with an environmental recorder 362 for recording environmental data. The base power board 206 also provides power to the electronic data processing system 210 using an AC/DC converter 358 and a battery charger control 360. The base power board 206 communicates with the base processor board 204 using inter-integrated circuit (I2C) serial single ended bus 354 as well as via a DMA serial peripheral interface (DSPI) 356. The base power board 206 is connected to a tilt sensor and radio frequency identification (RFID) module 208 via an input/output (I/O) expansion function 364 implemented in the base power board 206.

Though shown as separate components, in other embodiments all or a subset of the components may be physically located in different locations and/or functions combined in different manners than that shown in FIG. 3. For example, in one embodiment, the base processor board 204 and the user interface board 202 are combined into one physical board.

Figure 4:
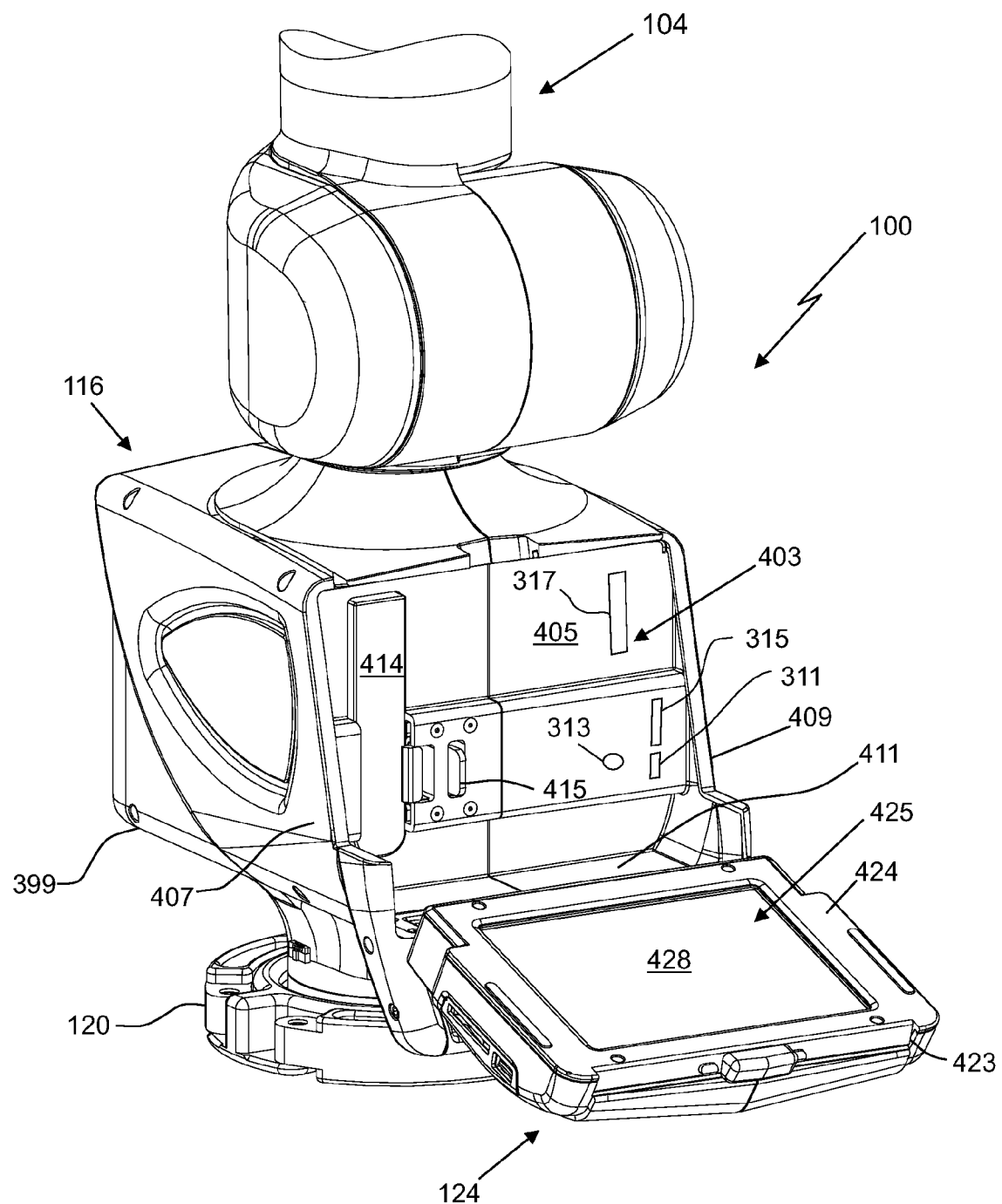
FIG. 4 is a perspective view of the AACMM of FIG. 1.

Referring now to FIGS. 1 and 4, an embodiment is shown of the AACMM 100 having an integrated display. The AACMM 100 includes a base 116 that includes the electronic data processing system 210 that is arranged to communicate with the optical bus 219 and via one or more electrical busses 218. Data carried by the optical bus 219 or electrical bus 218 may come from encoders associated with the bearing cartridge groups 110, 112, 114 or from arm accessories. The base 116 includes a housing 399 with the mounting device 120 on one end and the bearing cartridge grouping 114 and arm portion 104 on an opposite end. On one side, the housing 399 includes a recess 403. The recess is defined by an interior wall 405, a first side wall 407, a second side wall 409 and an end wall 411. The side walls 407, 409 are arranged on an angle relative to the mounting plane of the AACMM 100 such that the recess 403 tapers from the end adjacent the mounting device 120 to the end adjacent the arm portion 104. Adjacent the end wall 411, the housing 399 includes a handle portion 122 that is sized to facilitate the carrying of the AACMM 100 by the operator.

In one embodiment, the recess 403 includes an opening sized to receive a battery 414. The battery 414 is removably disposed in the housing 399 and is secured by a latch 415 that is movably disposed in wall 405. The latch 415 may include a tab portion that engages a surface of the battery 414 and prevents inadvertent removal. The battery 414 may be coupled to a battery pack interface and provide electrical power to the AACMM 100 when the AACMM 100 is not connected to an external power source (e.g. a wall outlet). In the exemplary embodiment, the battery 414 includes circuitry that communicates with the electronic data processing system 210 and transmits signals that may include, but are not limited to: battery charge level; battery type; model number; manufacturer; characteristics; discharge rate; predicted remaining capacity; temperature; voltage; and an almost-discharged alarm so that the AACMM can shut down in a controlled manner.

Also disposed on wall 405 may be one or more external ports that are coupled to electronic data processing system 210, such as flash memory card port 317, USB 3.0 port 315, HDMI port 311 and audio port 313 for example. The external ports are arranged to be accessible to the user when the movable cover portion 124 is moved from a closed position (FIG. 1) to an open position (FIG. 4).

The movable cover portion 124 includes a housing member 423 that is mounted to hinges that couple the movable cover portion 124 to the end wall 411. In the exemplary embodiment, when in the open position, the movable cover portion 124 is arranged at an obtuse angle relative to the interior wall 404. It should be appreciated that the movable cover portion 124 is continuously rotatable and that the open position may be any position at which the operator can access and utilize the display screen.

The movable cover portion 124 further includes a face member 424 disposed on one side and coupled to the housing member 423. The face member 424 includes an opening 425 sized to allow the viewing of a display 428. The housing member 423 and face member 424 are generally thin wall structures, formed from an injection molded plastic material for example, that define a hollow interior portion. In one embodiment, the housing member 423 or face member 424 may be formed from other materials, including but not limited to steel or aluminum sheet metal for example.

Arranged within the movable cover portion 124 is a display 428 having a display 428. The display 428 is mounted to the face member 424. The display 428 provides a user interface that allows the operator to interact and operate the AACMM 100 without utilizing or connecting an external host computer. The display 428 may include a touch sensitive screen having elements for detecting the touch that include, but are not limited to: resistive elements; surface acoustic wave elements; capacitive elements; surface capacitance elements; projected capacitance elements; infrared photodetector elements; strain gauge elements; optical imaging elements; dispersive signal elements; or acoustic pulse recognition elements. The display 428 is arranged in bidirectional communication with the user interface board 202 and the base processor board 204 such that actuation of the display 428 by the operator may result in one or more signals being transmitted to or from the display 428. In one embodiment, the display 428 is configured to display data, such as high definition video images transmitted via optical bus 219.

Figure 5:
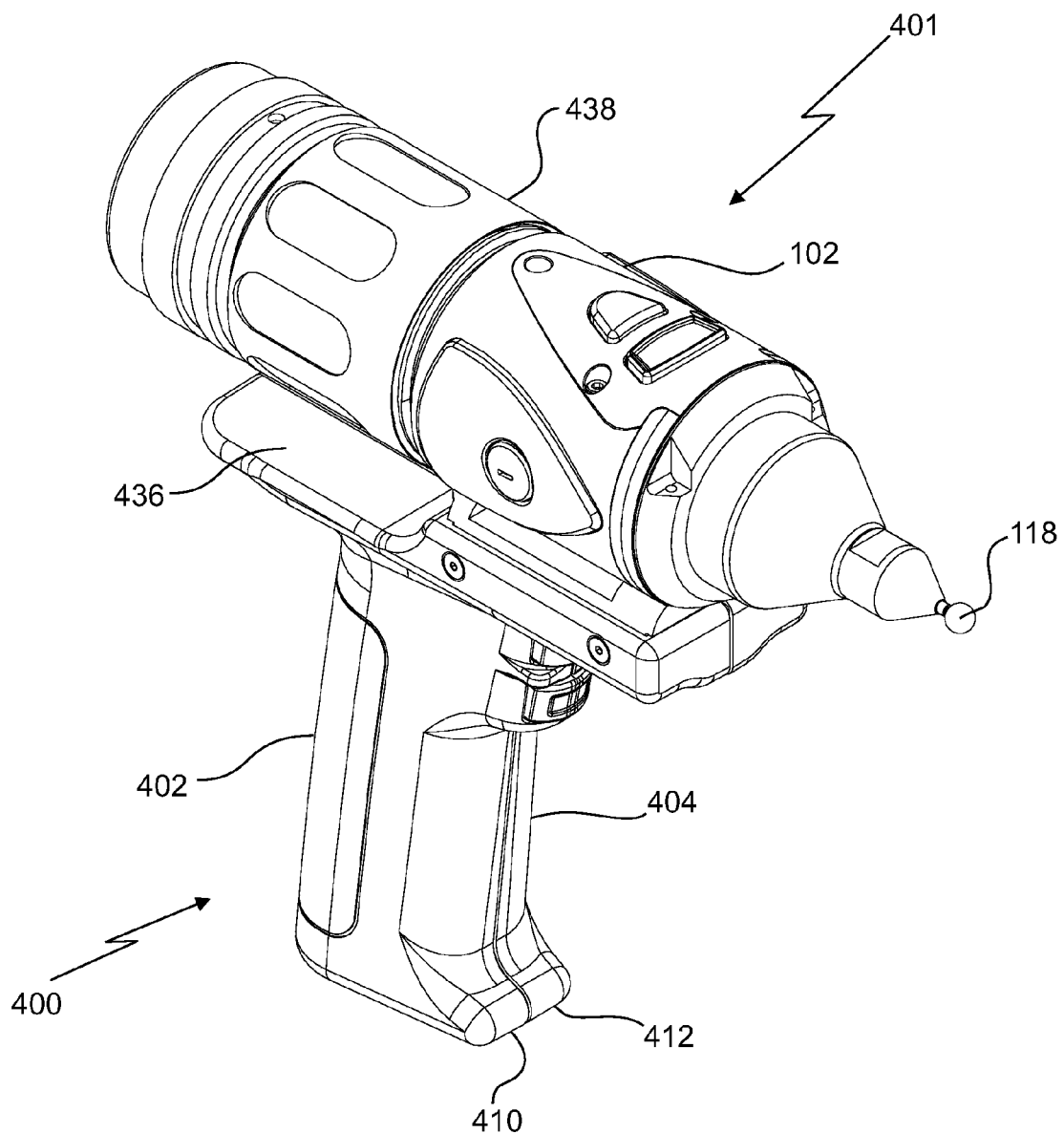
FIG. 5 is a perspective view of the probe end of the AACMM of FIG. 1 with a handle accessory being coupled thereto.
Figure 6:
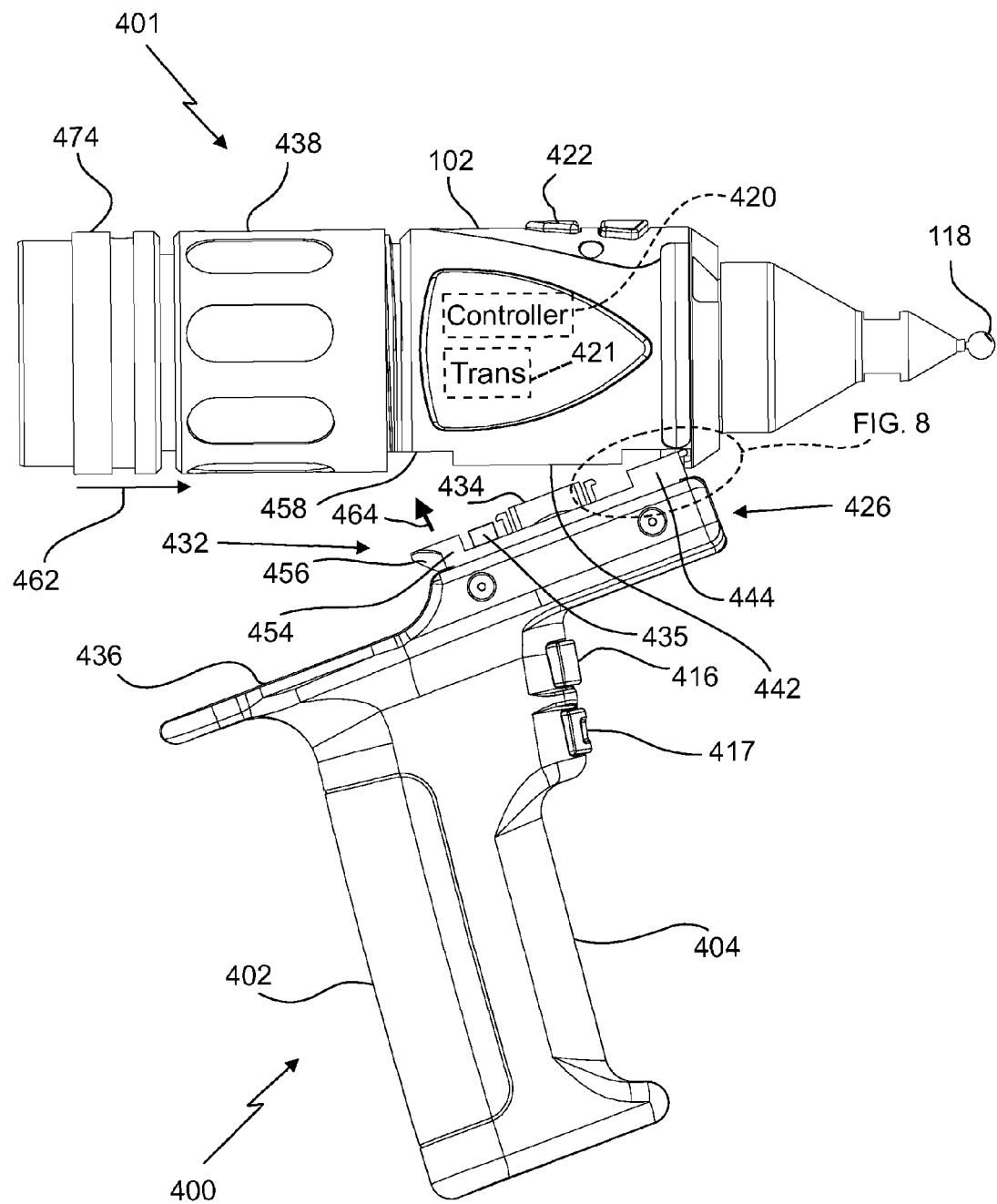
FIG. 6 is a side view of the probe end of FIG. 4 with the handle accessory being partially attached.
Figure 7:
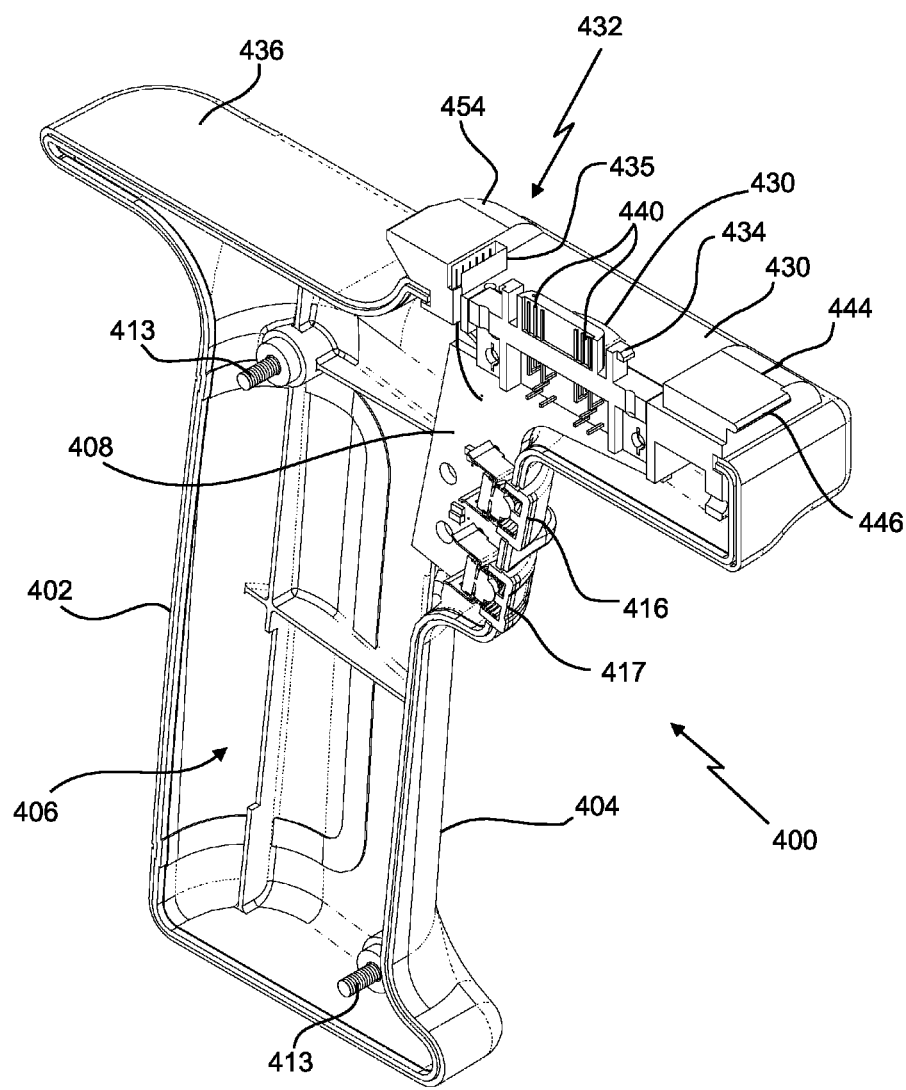
FIG. 7 is a perspective view partially in section of the handle accessory of FIG. 4.

Referring now to FIGS. 5-8, an exemplary embodiment of a probe end 401 is illustrated having a measurement probe housing 102 with a quick-connect mechanical and electrical interface that allows removable and interchangeable device 400 to couple with AACMM 100. In the exemplary embodiment, the device 400 includes an enclosure 402 that includes a handle portion 404 that is sized and shaped to be held in an operator's hand, such as in a pistol grip for example. The enclosure 402 is a thin wall structure having a cavity 406 (FIG. 7). The cavity 406 is sized and configured to receive a controller 408. The controller 408 may be a digital circuit, having a microprocessor for example, or an analog circuit. In one embodiment, the controller 408 is in asynchronous bidirectional communication with the electronic data processing system 210 (FIGS. 2 and 3). The communication connection between the controller 408 and the electronic data processing system 210 may be a wireless, a wired (e.g. via bus 218) or an optical (e.g. via bus 219) connection. The communication connection may also include a direct or indirect wireless connection (e.g. Bluetooth or IEEE 802.11) or a combination of wired, optical and wireless connections. In the exemplary embodiment, the enclosure 402 is formed in two halves 410, 412, such as from an injection molded plastic material for example. The halves 410, 412 may be secured together by fasteners, such as screws 413 for example. In other embodiments, the enclosure halves 410, 412 may be secured together by adhesives or ultrasonic welding for example.

The handle portion 404 also includes buttons or actuators 416, 417 that may be manually activated by the operator. The actuators 416, 417 are coupled to the controller 408 that transmits a signal to a controller 420 within the probe housing 102. In the exemplary embodiments, the actuators 416, 417 perform the functions of actuators 422 located on the probe housing 102 opposite the device 400. It should be appreciated that the device 400 may have additional switches, buttons or other actuators that may also be used to control the device 400, the AACMM 100 or vice versa. Also, the device 400 may include indicators, such as light emitting diodes (LEDs), sound generators, meters, displays or gauges for example. In one embodiment, the device 400 may include a digital voice recorder that allows for synchronization of verbal comments with a measured point. In yet another embodiment, the device 400 includes a microphone that allows the operator to transmit voice activated commands to the electronic data processing system 210.

In one embodiment, the handle portion 404 may be configured to be used with either operator hand or for a particular hand (e.g. left handed or right handed). The handle portion 404 may also be configured to facilitate operators with disabilities (e.g. operators with missing finders or operators with prosthetic arms). Further, the handle portion 404 may be removed and the probe housing 102 used by itself when clearance space is limited. As discussed above, the probe end 401 may also comprise the shaft of the seventh axis of AACMM 100. In this embodiment the device 400 may be arranged to rotate about the AACMM seventh axis.

In one embodiment, the probe end 401 includes a mechanical and electrical interface that cooperates with a second connector on the probe housing 102. The connectors may include electrical and mechanical features that allow for coupling of the device 400 to the probe housing 102. In one embodiment, the interface 426 includes a first surface 430 having a mechanical coupler 432, a first electrical connector 434 and a second electrical connector 435 thereon. The enclosure 402 also includes a second surface 436 positioned adjacent to and offset from the first surface 430. In the exemplary embodiment, the second surface 436 is a planar surface offset a distance of approximately 0.5 inches from the first surface 430. As will be discussed in more detail below, this offset provides a clearance for the operator's fingers when tightening or loosening a fastener such as collar 438. The interface 426 provides for a relatively quick and secure electronic connection between the device 400 and the probe housing 102 without the need to align connector pins, and without the need for separate cables or connectors.

The first electrical connector 434 extends from the first surface 430 and includes one or more connector pins 440 that are electrically coupled in asynchronous bidirectional communication with the electronic data processing system 210 (FIGS. 2 and 3), such as via one or more buses 218 for example. The bidirectional communication connection may be wired (e.g. via bus 218), wireless (e.g. Bluetooth or IEEE 802.11), or a combination of wired and wireless connections. In one embodiment, the first electrical connector 434 is electrically coupled to the controller 420. The controller 420 may be in asynchronous bidirectional communication with the electronic data processing system 210 such as via one or more electrical buses 218 for example.

Similarly, the second electrical connector 435 extends from the first surface 430 adjacent the electrical connector 434. The second electrical connector 435 may include one or more connector pins that are electrically coupled in asynchronous and bidirectional communication with the electronic data processing system 210 via optical bus 219. In the exemplary embodiment, the second electrical connector 435 allows for high speed data transmission. In one embodiment, the data transmission via second electrical connector is greater than 12 megabytes per second and is compliant with the Universal Serial Bus standard. In another embodiment, the data transmission via second electrical connector 435 is up to 625 megabytes per second and is compliant with the USB 3.0 standard. In still another embodiment, the data transmission via second electrical connector 435 is up to 125 megabytes per second and is compliant with the gigabit Ethernet (IEEE 802.3-2008) standard.

As will be discussed in more detail below, the second electrical connector 435 is coupled to the electronic data processing system 210 via a transceiver 421 within the probe housing 102. The transceiver 421 is configured to transform the electrical signal from the connector 435 to an optical signal. The transceiver provides bi-directional communication between an optical communications media and a electrical communications media. In the exemplary embodiment, the transceiver 421 receives and transmits electrical signals to the device 400 via second electrical connector 435 and receives and transmits optical signals via optical bus 219. In one embodiment, the transceiver 421 is integral with the controller 420. In yet another embodiment, the second electrical connector 435 is an optical connector and the transceiver 421 may be omitted. In one embodiment, the bus 241 may also include both electrical and optical signal lines, in which case the transceiver 421 is used just for converting the electrical signals into optical signals while allowing the optical signals to pass through. It should be appreciated that in embodiments where the bus 241 is solely an optical bus, the transceiver 421 may be omitted.

The electrical connectors 434, 435 are positioned to provide a relatively quick and secure electronic connection with corresponding electrical connectors on probe housing 102. The electrical connectors connect with each other when the device 400 is attached to the probe housing 102. The electrical connectors may each comprise a metal encased connector housing that provides shielding from electromagnetic interference as well as protecting the connector pins and assisting with pin alignment during the process of attaching the device 400 to the probe housing 102.

The mechanical coupler 432 provides relatively rigid mechanical coupling between the device 400 and the probe housing 102 to support relatively precise applications in which the location of the device 400 on the end of the arm portion 104 of the AACMM 100 preferably does not shift or move. Any such movement may typically cause an undesirable degradation in the accuracy of the measurement result. These desired results are achieved using various structural features of the mechanical attachment configuration portion of the quick connect mechanical and electronic interface of an embodiment of the present invention.

Figure 8:
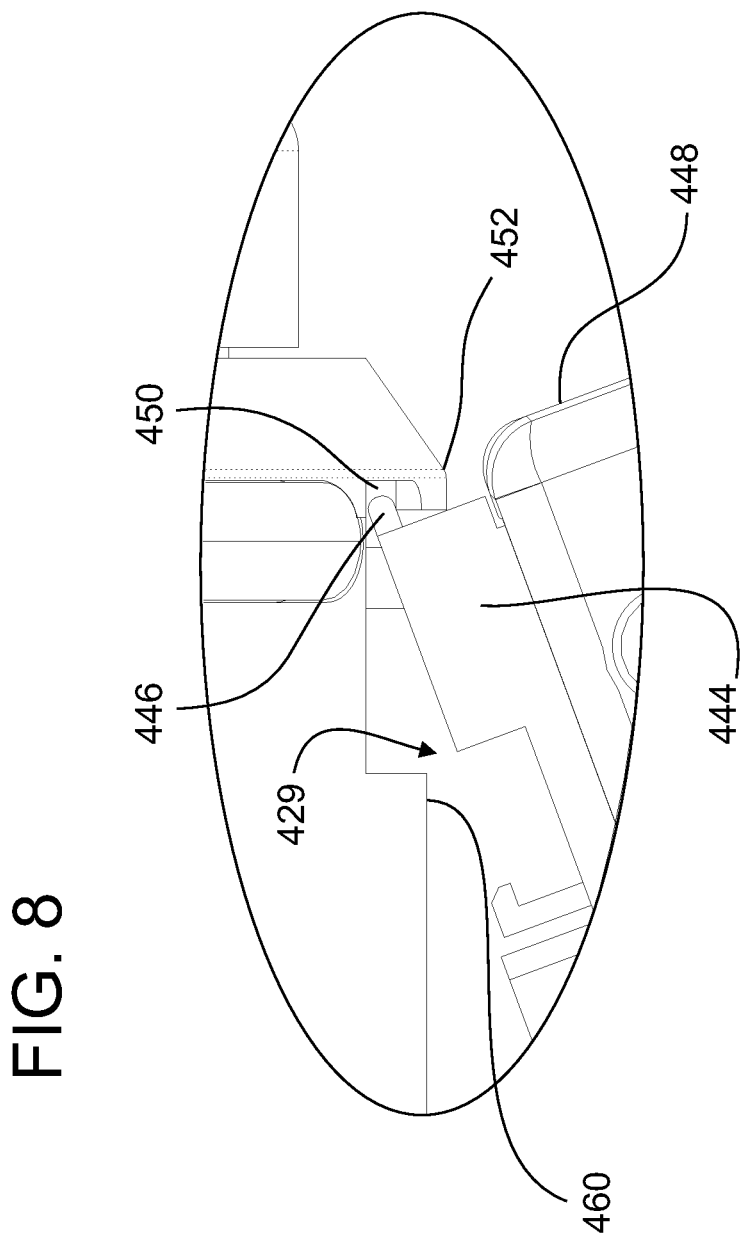
FIG. 8 is an enlarged view of a portion of the probe end of FIG. 6.

In one embodiment, the mechanical coupler 432 includes a first projection 444 positioned on one end 448 (the leading edge or "front" of the device 400). The first projection 444 may include a keyed, notched or ramped interface that forms a lip 446 that extends from the first projection 444. The lip 446 is sized to be received in a slot 450 defined by a projection 452 extending from the probe housing 102 (FIG. 8). It should be appreciated that the first projection 444 and the slot 450 along with the collar 438 form a coupler arrangement such that when the lip 446 is positioned within the slot 450, the slot 450 may be used to restrict both the longitudinal and lateral movement of the device 400 when attached to the probe housing 102. As will be discussed in more detail below, the rotation of the collar 438 may be used to secure the lip 446 within the slot 450.

Opposite the first projection 444, the mechanical coupler 432 may include a second projection 454. The second projection 454 may have a keyed, notched-lip or ramped interface surface 456 (FIG. 6). The second projection 454 is positioned to engage a fastener associated with the probe housing 102, such as collar 438 for example. The mechanical coupler 432 includes a raised surface projecting from surface 430 that adjacent to or disposed about the electrical connector 434 which provides a pivot point for the interface 426. This serves as the third of three points of mechanical contact between the device 400 and the probe housing 102 when the device 400 is attached thereto.

The probe housing 102 includes a collar 438 arranged co-axially on one end. The collar 438 includes a threaded portion that is movable between a first position (FIG. 5) and a second position (FIG. 7). By rotating the collar 438, the collar 438 may be used to secure or remove the device 400 without the need for external tools. Rotation of the collar 438 moves the collar 438 along a relatively coarse, square-threaded cylinder 474. The use of such relatively large size, square-thread and contoured surfaces allows for significant clamping force with minimal rotational torque. The coarse pitch of the threads of the cylinder 474 further allows the collar 438 to be tightened or loosened with minimal rotation.

To couple the device 400 to the probe housing 102, the lip 446 is inserted into the slot 450 and the device is pivoted to rotate the second projection 454 toward surface 458 as indicated by arrow 464 (FIG. 5). The collar 438 is rotated causing the collar 438 to move or translate in the direction indicated by arrow 462 into engagement with surface 456. The movement of the collar 438 against the angled surface 456 drives the mechanical coupler 432 against the raised surface 460. This assists in overcoming potential issues with distortion of the interface or foreign objects on the surface of the interface that could interfere with the rigid seating of the device 400 to the probe housing 102. The application of force by the collar 438 on the second projection 454 causes the mechanical coupler 432 to move forward pressing the lip 446 into a seat on the probe housing 102. As the collar 438 continues to be tightened, the second projection 454 is pressed upward toward the probe housing 102 applying pressure on a pivot point. This provides a see-saw type arrangement, applying pressure to the second projection 454, the lip 446 and the center pivot point to reduce or eliminate shifting or rocking of the device 400. The pivot point presses directly against the bottom on the probe housing 102 while the lip 446 is applies a downward force on the end of probe housing 102. FIG. 6 includes arrows 462, 464 to show the direction of movement of the device 400 and the collar 438. It should be appreciated that the offset distance of the surface 436 of device 400 provides a gap between the collar 438 and the surface 436 (FIG. 7). The gap allows the operator to obtain a firmer grip on the collar 438 while reducing the risk of pinching fingers as the collar 438 is rotated. In one embodiment, the probe housing 102 is of sufficient stiffness to reduce or prevent the distortion when the collar 438 is tightened.

The coupling of the probe end 401 to the end of the arm portion 104 creates a communication connection between the optical bus 219 and the transceiver 421. This coupling further creates a communication connection between the bus 218 and the controller 420. In this manner, signals may be transmitted and received over both busses 218, 219. It should be appreciated that it is desirable for the segments 106, 108 of the arm portion 104 and the probe end 401 to be rotatable on several axis of rotation to allow the probe end 401 to be positioned to make a desired measurement without inhibiting the user. As a result, one or more electrical and optical connections are made at each of the bearing cartridge groupings 110, 112, 114 for each rotational joint. These connections allow the arm portion 104 to be moved and rotated without interference from electrical conductors or optical conductors.

Figure 9:
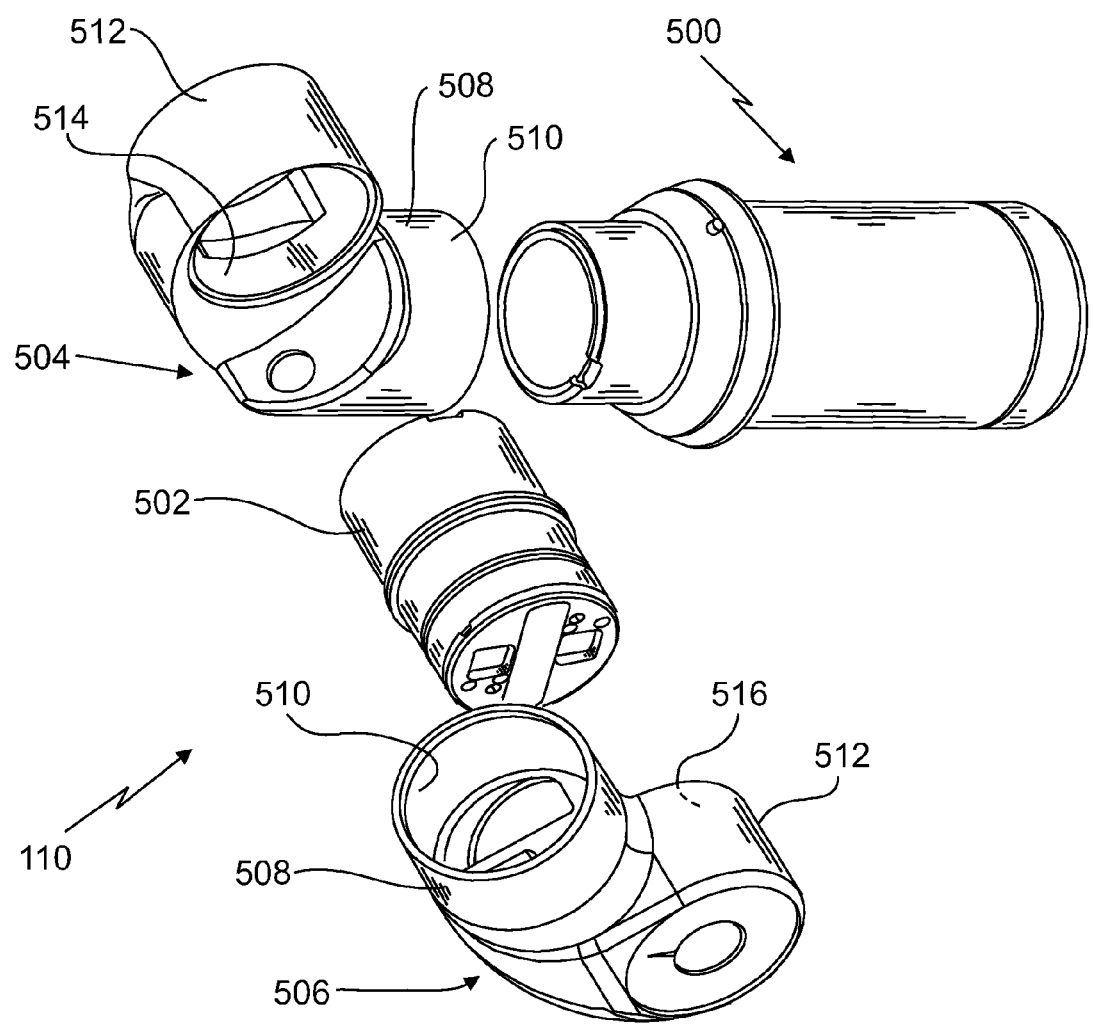
FIG. 9 is a partial exploded view illustrating a pair of encoder/bearing cartridges being assembled between two dual socket joints in accordance with an embodiment.

Referring now to FIGS. 9-11, an exemplary embodiment is shown of an arm rotational connection using groupings of bearing cartridges, such as bearing cartridge grouping 110 for example, that include a slip ring assembly that allows for rotation of the arm segments while allowing fiber optic or electrical conductors to pass through the arm. As discussed above, each of the rotational connections of the articulated arm utilizes a modular bearing/encoder cartridge such as cartridge 500 or cartridge 502 for example. These cartridges 500, 502 are mounted in the openings of dual socket joints 504, 506. Each socket joint 504, 506 includes a first cylindrical extension 508 having a first recess or socket 510 and a second cylindrical extension 512 having a second recess or socket 514. Generally sockets 510, 514 are positioned 90° to one another although other relative, angular configurations may be employed. Cartridge 502 is positioned in each socket 516 of dual socket joints 504, 506 to define a hinge joint, while cartridge 500 is positioned in socket 510 of joint 506 to each define longitudinal swivel joint. Modular bearing/encoder cartridges 500, 502 provide advantages in permitting separate manufacturer of a pre-stressed or preloaded dual bearing cartridge on which is mounted the modular encoder components. This bearing encoder cartridge can then be fixedly attached to the external skeletal components, such as dual socket joints 504, 506 for example, of the articulated arm portion 104. The use of such cartridges is advantageous in permitting high-quality, high-speed production of these sophisticated subcomponents of articulated arm portion 104.

In some embodiments, there may be as many as four different cartridge types, two "long" axial cartridges that allow for swivel rotation, and to "short" cartridges that provide a hinge joint. Each cartridge includes a pre-loaded bearing arrangement and a transducer which may comprise a digital encoder. While the length of the cartridge may change, for exemplary purposes, we will describe all types of cartridges with respect to cartridge 500.

As shown in FIG. 10, the cartridge 500A includes a pair of bearings 518, 520 separated by an inner sleeve 522 and outer sleeve 524. It is desirable that the bearings 518, 520 are preloaded. In this embodiment, such preload is provided by sleeves 522, 524 being of different lengths so that upon tightening, a preselected preload force is generated on the bearings 518, 520. Bearings 518, 520 are sealed using seals 526 with this assembly being rotatably mounted on a shaft 528. At its upper surface, the shaft 528 terminates at a shaft upper housing 530. An annulus 532 is defined between shaft 528 and shaft upper housing 530. This entire assembly is positioned within outer cartridge housing 534 with the shaft 528 and its bearing assembly being securely attached to the housing 534 using a combination of an inner nut 527 and an outer nut 529. Note that upon assembly, the upper portion of the outer housing 534 will be received within the annulus 532. It will be appreciated that the preload is provided to bearings 518, 520 upon the tightening of the inner and outer nuts which provide compression forces to the bearings and, because of the difference in length between the inner and outer spacers 522, 524, the desired level of pre-load will be achieved.

In one embodiment, the bearings 518, 520 are duplex ball bearings. In order to obtain the desired preloading, it is important that the bearing faces be parallel. The parallelism affects the evenness other preloading about the circumference of the bearing. Uneven loading will give the bearing a rough uneven running torque feel, and may result in an undesirable radial runout and or reduced encoder performance. The spacers 522, 524 are used to enhance the separation of the bearings. In the exemplary embodiment the cartridge housing 534 and spacers 522, 524 are made from aluminum, and may be machined in a desired length and parallelism. Because a common material is used for the inner and outer spacers, changes in temperature will not result in differential expansion which could compromise the preload. The use of seals 526 provide sealed bearings since any contamination thereof may affect all rotational movement and potential encoder accuracy.

While in the exemplary embodiment the cartridge 500A includes a pair of bearings, cartridge 500A could also include a single bearing or three or more bearings. Thus, each cartridge includes at least one bearing. In one embodiment, an optical encoder system may be arranged in end 554. The encoder system includes a disk 562 and one or more read heads 563. The encoder system includes a pattern of measurable characteristics. A light source in the read head sends light onto the disk pattern, and reflected or transmitted light from the read head is received by optical detector on the read head. This information is used to determine the angle of rotation.

The cartridges may either have unlimited rotation, or may allow for only limited rotation. For limited rotation, in an embodiment, a groove 536 on a flange 538 on the outer surface of the housing 534 provides a cylindrical track which receives a shuttle (not shown). The shuttle rides within the track 536 until it abuts a removable shuttle stop, such as a rotation stops set screw for example, whereupon further rotation will be precluded.

In an exemplary embodiment, the cartridge 500 is a cartridge 500A, shown in FIG. 10. The cartridge is allowed to move freely for unlimited rotation. In this embodiment, a rotary coupler, such as optical rotary joint 540, for example, is used to allow signals traveling on fiber-optic cables 219C, 219D to traverse the joint. The shaft 528 has an opening 542 therethrough. Positioned within the opening 542 is the optical rotary joint 540. The fiber-optic cable 219C enters the cartridge 500A via a passageway 544 in the upper housing 530. The fiber-optic cable 219 enters a bushing 546 that is secured against a shoulder 548 within an upper portion of the opening 542. Flushly mounted adjacent the end of the bushing 546 is a graded index rod lens 550 that is coupled to the end of the fiber optic cable 219C.

Similarly, the fiber-optic cable 219D enters the cartridge 500A via a passage 552 in end 554 of housing 534. The fiber-optic cable 219D enters a bushing 556 that is secured to the lower portion 554. Flushly mounted adjacent the end of bushing 556 is another graded index rod lens 558. The graded index rod lens 558 is coupled to the end of the fiber optic cable 219D.

The lenses 550, 558 form an optocoupler that allows signals from the fiber-optic cables 219C, 219D to traverse the gap between the lenses. The focal lengths of the lenses 550, 558 are selected so that each lens collimates a light signal from the fiber into a parallel beam or column of light axially directed at the other lens. The receiving lens will pick up the collimated beam and focus it into the end of the respective optical fiber 219C, 219D. The opposing faces of the lenses 550, 558 have diameters that are substantially greater than the comparable diameter of the fiber-optic cables 219C, 219D. Thus an axial misalignment of the lenses 550, 558 results in significantly less cut off than would occur with the same axial misalignment of the bare fiber ends. Further, the collimation of the optical signal within the rotary coupler permits the lens gap to be significantly larger than the gap between fibers in a direct fiber to fiber rotary joint for sustaining comparable optical coupling transmission. In one embodiment, the lens gap is less than $\frac{1}{10}$ of an inch. In one embodiment, the optical rotary joint 540 is a model F0228 fiber-optic rotary joint produced by MOOG, Inc.

It should be appreciated that the cartridge 500A with the optical rotary joint 540, forms a rotary interface that allows the shaft 528 to rotate independently of the housing 534 while still allowing signals to be transferred across the rotational connection. In the exemplary embodiment, the shaft 528 and housing 534 may move with unlimited rotation. The optical rotary joint 540 performs a signal transfer function only and is nonstructural, meaning that it provides no mechanical function for the rotational connection. It should be appreciated that this provides advantages in allowing the transfer of signals along the length of the arm portion 104 while still allowing the individual sections or segments of the arm portion 104 to rotate freely.

Referring now to FIG. 11, another embodiment of the cartridge 500 is a cartridge 500B shown having a hybrid rotary coupler, such as slip ring 560 for example. The hybrid slip ring 560 includes a bushing 546 mounted within opening 542 against the shoulder 548. The fiber-optic cable 219C enters the cartridge through passage 544 and extends into the bushing 546. A graded index rod lens 550 is flushly mounted on the end of the bushing 546. In this embodiment, an electrical cable 218 C that includes at least one electrical conductor also enters through the passage 544 and enters the bushing 546. At least one contact ring 564 is coupled to a conductor within the electrical cable 218C and is mounted to the end of the bushing 546 within the opening 542.

The hybrid slip ring 560 further includes a fiber-optic cable 219D that enters the end 554 of housing 534 via passage 552 and extends into the bushing 556. A graded index rod lens 558 is flushly mounted on the end of bushing 556. A second electrical cable 219D enters the housing 534 via passage 552 and enters the bushing 556. At least one transfer member 568, which may be a contact ring, is coupled to a conductor within the electrical cable 218D and is mounted to the end of bushing 556 within opening 542. The contact ring 564 and transfer member 568 are arranged to be in sliding contact with each other during operation to allow electrical signals to pass therebetween. The transfer member 568 may be made from a suitable material such as metal or graphite for example. In another embodiment, the transfer member 568 may be one or more brushes arranged in contact with the outer diameter of the contact ring 564. During operation, signals being transmitted on the fiber-optic cables 219C, 219D traverse the joint via lenses 550, 558 as discussed above. Signals are transmitted on electrical cables 218C, 218D to traverse the joint via contact ring 564 and transfer member 568. In one embodiment, the hybrid slip ring 560 which is configured to provide both electrical and optical signal transfer in an integrated assembly may be a model H18 available from Moog, Inc.

It should be appreciated that the slip ring used in the cartridge 500B may accommodate a plurality of electrical conductors. The communication across the slip ring may be one directional, bidirectional, synchronous or asynchronous. In one embodiment, the bus 218 allows for the transfer of data signals and electrical power over the bus.

Figure 12:
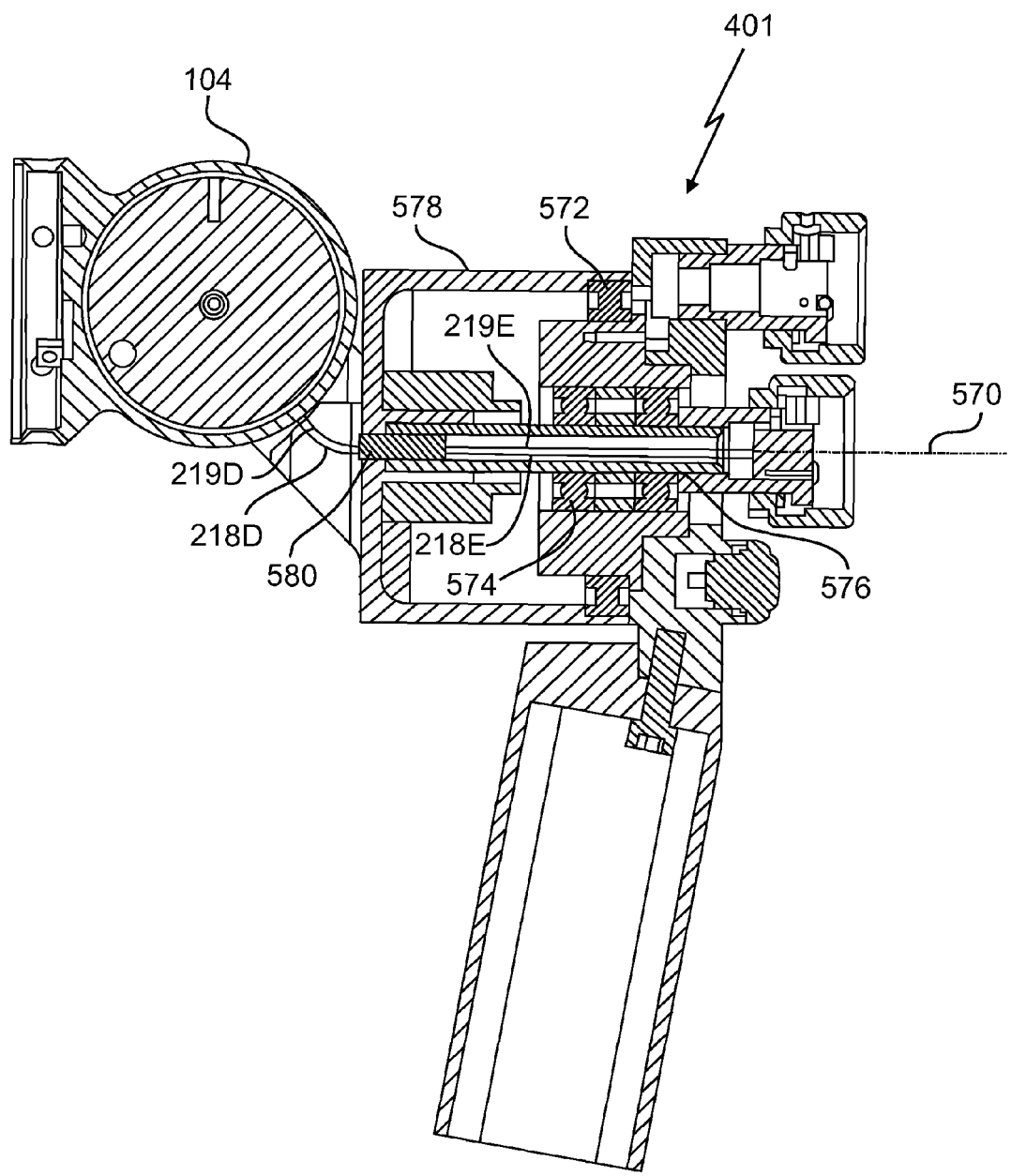
FIG. 12 is a sectional view of the probe end in accordance with another embodiment, the probe end having optical rotary joint of FIG. 10 or a slip ring of FIG. 11.

The optical rotary joint 540 and the slip ring 560 may be used in other joint configurations than cartridges 500, 502 of FIG. 9. FIG. 12 shows a probe end 401 that is rotatable about an axis 570. In this embodiment, the probe end 401 includes a pair of bearings 572, 574. The bearings 572, 574 allow the probe end 401 to rotate about a shaft 576 relative to a housing 578 which is coupled to the end of the arm 401. Arranged within the housing 578 is a rotary coupler 580, which might be a rotary coupler 540 as shown in FIG. 10 or a rotary coupler 560 as shown in FIG. 11, the rotary coupler 540, 560 is configured to allow signals to be transferred from the probe end 401 to the arm portion 104. An optical bus 219E extends from a controller (not shown) in the probe end 401 through the shaft 576 to the rotary coupler 580. Similarly, the bus 218E extends from the controller through the shaft 576 to the rotary coupler 580. Busses 218D, 219D are coupled on one end to the rotary coupler 580 and passes through into the arm portion 104. Thus, rotary coupler 580 provides for signal transfer function between the probe and 401 to the arm portion 104 over busses 218, 219.

Figure 13:
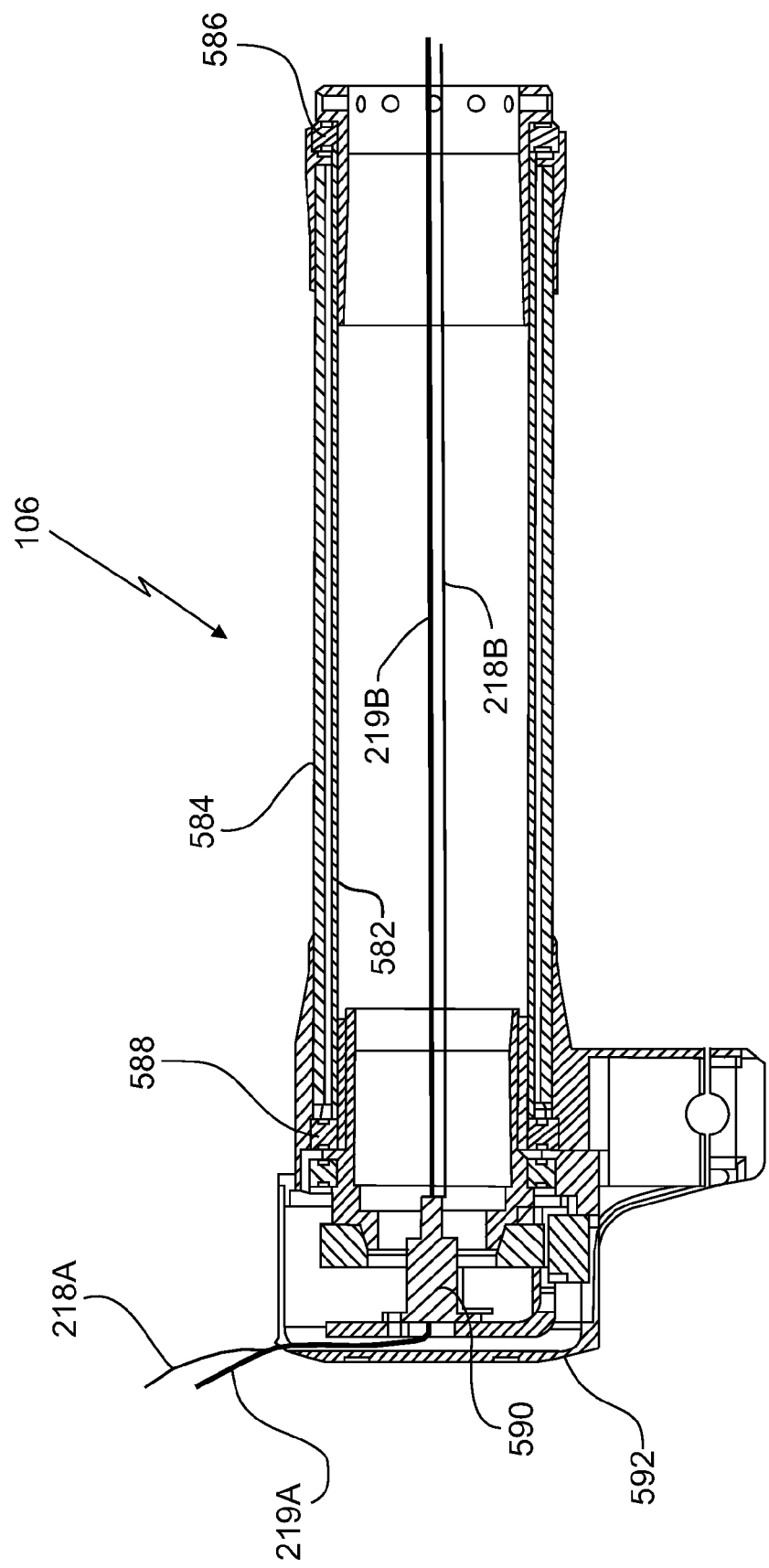
FIG. 13 is a sectional view of a portion of an arm segment in accordance with another embodiment, the arm section having a optical rotary joint of FIG. 10 or a slip ring of FIG. 11.

Referring now to FIG. 13, the optical rotary joint 540 and the slip ring 560 may further be used in arm segments, such as arm segment 106 for example. In this embodiment, the arm segment 106 includes an inner shaft 582 and an outer housing 584. The inner shaft 582 is configured to rotate independently of the outer housing 584. The inner shaft 582 rotates on a first bearing 586 and a second bearing 588 arranged on opposite ends of the inner shaft 582. As with the embodiments discussed above, bearings 586, 588 may be preloaded and press fit into the housing 584. Arranged on one end of the arm segment 106 is a rotary coupler 590. In this embodiment, the rotary coupler 590 may be a rotary coupler 540 as in FIG. 10 or a rotary coupler 560 as in FIG. 11, the rotary coupler 590 configured to allow signals to be transferred between busses 218A, 219A arranged at end 592 of inner shaft 582 and busses 218B, 219B coupled to the inner shaft 582. Thus, the signals may be transferred without interfering with the rotation of the inner shaft 582.

Figure 14:
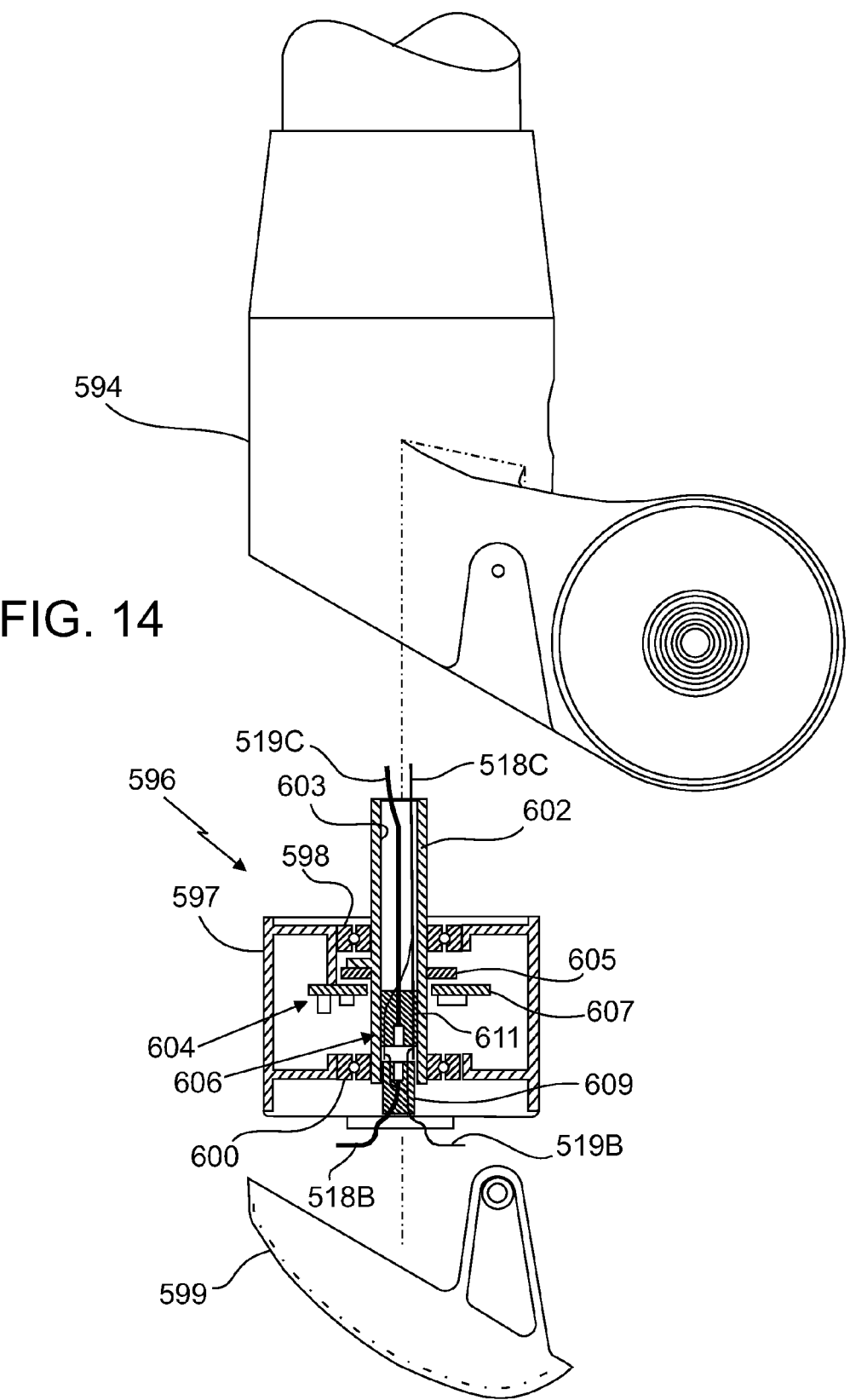
FIG. 14 is sectional view of a two dual axis rotational connection in accordance with another embodiment, the rotational connection having one or more optical rotary joints or slip rings of FIG. 10 or FIG. 11.

Still another embodiment is shown in FIG. 14 providing rotational connection having two rotational axes with one of the connections providing greater than 360 degrees of rotation. In this embodiment, the rotational connection has a housing 594 sized to receive an encoder assembly 596. The encoder assembly 596 includes a housing 597 having a pair of bearings 598, 600 that define an axis of rotation about which a shaft 602 rotates relative to the housing 597. A rotary encoder 604 is disposed about the shaft 602, which generates a signal in response to rotation of the shaft 602. In one embodiment, the rotary encoder 604 includes an encoder disk 605 coupled to rotate with the shaft 602 and a read-head 607 coupled to the housing 597. The encoder disk includes a plurality of measurable characteristics that are illuminated by the read head. Reflected or transmitted light through the disk are received by the read head and used to obtain an angular reading. A cover 599 is configured to enclose the encoder assembly 596 within the housing 594.

The shaft 602 includes a bore 603 that extends therethrough. The bore 603 is sized to receive a rotary coupler 606, which is at least partially disposed therein. A first segment of busses 518B, 519B are received in one end of the bore 603 and coupled to a first half 609 of the rotary coupler 606. The first half 609 is fixed relative to the housing 597. A second segment of the busses 518C, 519C is coupled to the second half 611 of the rotary coupler 606. The second half 611 is fixed to the bore 603 and rotates with the shaft 602. The rotary coupler 606 is substantially similar in operation to the optical rotary joints 540, 560 to allow signals to be transferred between the busses 518B, 519B and busses 518C, 519C without interfering with the rotation of the shaft 602 relative to the encoder assembly 596.

Figure 15:
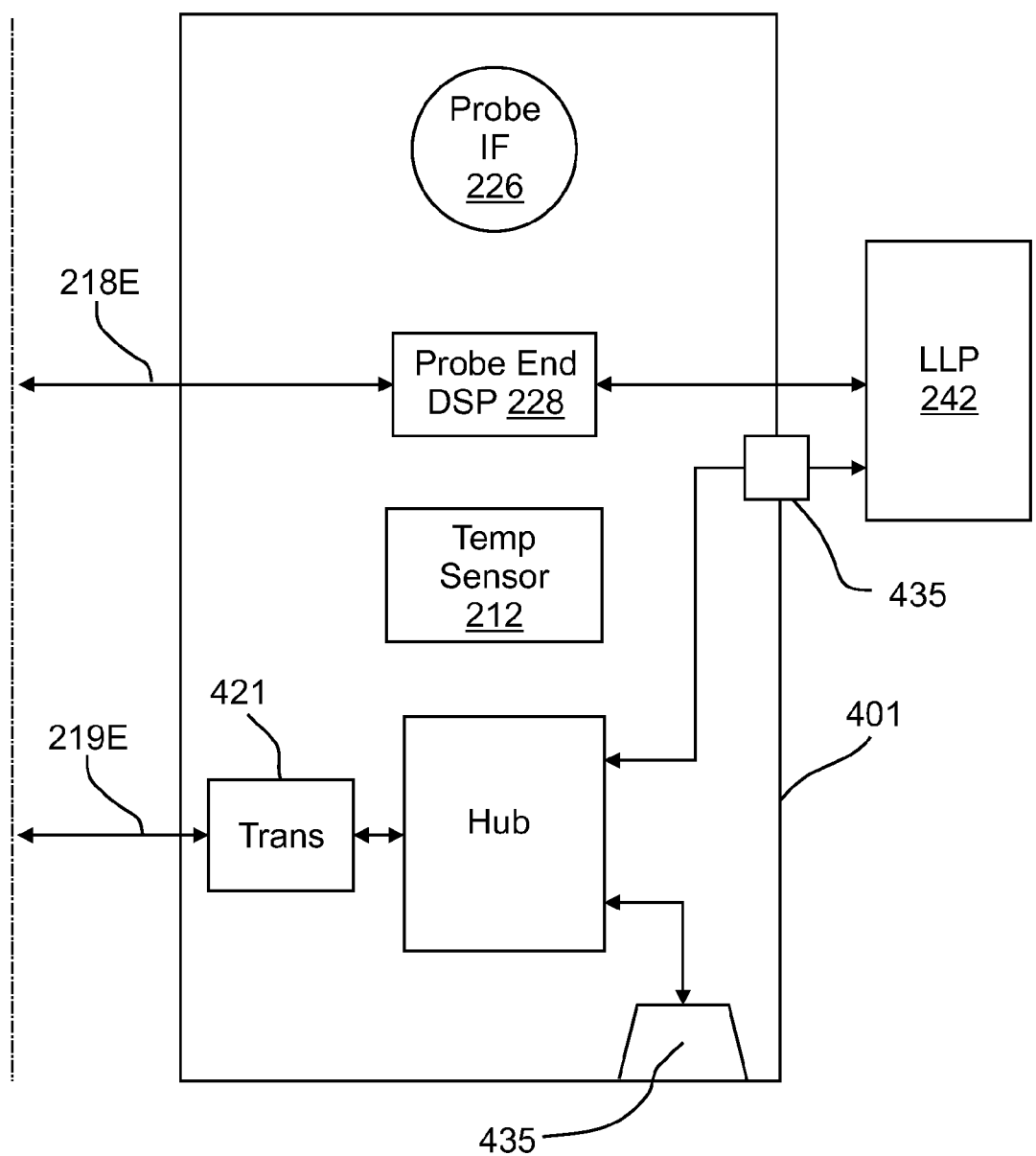
FIG. 15 is a schematic diagram of another embodiment of the probe end of FIG. 4.

The buses 218, 219 allow the bidirectional, asynchronous transfer of signals between the data processing system 210 and the probe end 401. In some applications, it may be desirable to connect multiple devices or accessories on the probe end 401 as shown in FIG. 15. For example, it may be desirable to have both a laser line probe 242 and a high definition camera separately connected to the probe end. In one embodiment, multiple connection points are coupled by separate optical busses to the electronic data processing system 210. In another embodiment, the probe end 401 includes a single optical bus 219E that couples with a transceiver 421. The transceiver 421 allows for bi-directional communication between an optical and an electrical communications medium. Opposite the optical bus 219E, the transceiver 421 is connected to a routing device 495, such as a hub (for a USB 3.0 connection) or a switch (for a gigabit Ethernet connection). The routing device 495 allows multiple accessory devices to couple with a single optical bus 219E.

In other embodiments of the present invention, the device 400 coupled to the AACMM 100 may include a functional device that utilizes the high transmission speed of the optical bus 219E to transmit data to the electronic data processing system 210. The device 400 may be, but is not limited to a high definition still camera, a high definition video camera (e.g. greater than 1280×720 pixels), a bar-code scanner, thermal scanner, an audio recording system, an image projector, a time of flight scanner, a flying spot scanner, a structured light scanner and an IR thermometer. In one embodiment, the device 400 may include multiple video cameras, including but not limited to "pico" cameras, "ultra miniature" cameras or three dimensional image cameras for example. In one embodiment, the device 400 may include a retroreflector holder such as that described in commonly-assigned U.S. Pat. No. 7,804,602 entitled "Apparatus and Method for Relocating an Articulating-Arm Coordinate Measuring Machine" which is incorporated herein in its entirety. In yet another embodiment, the device 400 may include an ultrasonic probe such as that described in commonly-owned U.S. Pat. No. 5,412,880 entitled "Method of Constructing a 3-Dimensional Map of a Measurable Quantity Using Three Dimensional Coordinate Measuring Apparatus" which is incorporated by reference herein in its entirety. In an embodiment, the device 400 includes multiple functions such as an image projector and a laser line probe. The image (e.g. CAD) data may be transmitted via bus 218E to the image projector while the data acquired by the LLP image sensor may be transmitted via the optical bus 219E. It should be appreciated that the integration of these devices may provide advantages in allowing the operator to acquire measurements faster and with a higher degree of reliability. For example, with the still camera or video camera device attached, the operator may record high definition image or images of the object being measured with the device. The image data may be transmitted via the optical bus 219 while the measurement data is transmitted simultaneously via bus 218. These images may be displayed on display 328, output to a video monitor via HDMI port 311, or incorporated into an inspection report for example. In one embodiment, the operator may place graphical markers on the displayed image to define measurement points via the user interface board 202. In this way, the operator can later recall the marked up image from memory and quickly see where to make measurements. In other embodiments, a video is captured of the object being measured. The video is then replayed via the user interface board 202 to assist the operator in repeating multiple measurements on the next object to be inspected or as a training tool for new operators.

In yet another embodiment, the device is configured to be a paint spray device having a nozzle. In this embodiment, the device 400 receives a signal from the electronic data processing system 210 and selectively sprays one or more colors from one or more spray nozzles that are each connected to a reservoir (e.g. red, green, and blue) each with a single color of paint. It should be appreciated that the spray nozzles may also be an inkjet type of spray mechanism that deposits droplets of paint, ink, pigments or dies onto a surface. The inkjet nozzles may include but are not limited to continuous inkjets, thermal inkjets, and piezoelectric inkjets. Since the electronic data processing system knows the position and orientation of the probe housing 102, the device may receive commands to spray a particular color at a particular location to match a desired image stored in memory. Thus, an image or picture may be reproduced by the device 400 as the operator moves the device 400 across the desired surface (e.g. a wall). This embodiment may also provide advantages in manufacturing environments to create layout markings on an article, such as sheet metal for example.

In another embodiment, the AACMM 100 may be used in an operating room for example. A doctor may use a portable AACMM to determine the location for making an incision or finding a tumor, correlating the position of the probe or measurement device 118 with 3D data from Computer Axial Tomography data. In this case, a projector in device 400 may receive an image signal via the optical bus and project an image on the patient, providing markers or actual replication of CAT scan imagery to guide the surgeon. Surgery performed remotely by manually operated robots may use projection systems in the same way as described above.

In applications where an AACMM is used in a manufacturing environment, a device 400 having a projector may provide guidance for a variety of operations requiring positioning that is driven from 3D CAD or image files. This includes, for example: drilling holes for rivets, instruments, accessories; applying decals or adhesive backed stripes to cars, planes, buses or large parts; painting letters, details or images; grinding/sanding surfaces or welds until they conform to drawing requirements; and locating studs or structural members behind sheathing for nail or screw locations.

Embodiments of this aspect of the present invention provide for visualization of hidden features such as pipes, wiring, ducts, or other objects under walls, bulkheads, floors or behind locked doors helps to determine where cuts can be safely made. These embodiments also provide for projected visualization and guidance for drilling, cutting and access to critical components of explosive ordinance (e.g., when 3D CAD data of the device is available).

According to embodiments of this aspect of the present invention, a projection system for an AACMM projects guidance and part data (e.g., structural CAD data) onto a surface of a part. It also may be used to project images of what is inside walls, structures, or the human body for use in building modification, surgery or other invasive procedures. One or more miniature projectors attached to the arm can project images or data on a part or surface or provide guidance to the operator. The arm/projector combination may provide visualization of features hidden by walls, inside the human body, inside explosive devices, etc. When a 3D record (e.g., CAD drawing, CAT scan, etc.) of the object exists the projector and arm combination can project an image that shows the location of features, as if seeing through the wall.

As used herein, the terms "bus", "wire" and "conductor" in reference to bus 218 are used interchangeably to refer to a transmission medium for transmitting signals such as synchronizing pulses and/or data.

Technical effects and benefits include the ability to simultaneously transmit arm position signals on one bus and accessory device data on a high speed bus, such as an optical bus for example. This may lead to increased system performance and throughput by allowing more data to be collected in response to each capture signal. In addition, the AACMM 100 may be able to support a broader range of accessory devices by not requiring all accessory devices to be compliant with the internal bus utilized to collect position data.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, C# or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A portable articulated arm coordinate measurement machine (AACMM), comprising:
a manually positionable articulated arm portion having opposed first end and second end, the arm portion including a plurality of connected arm segments, each of the arm segments including at least one position transducer for producing a position signal, wherein the plurality of connected arm segments includes a first arm segment and a second arm segment;
a measurement device coupled to the first end;
a base coupled to the second end;
an electronic circuit configured to receive the position signals from each of the at least one position transducers and to determine three dimensional coordinates of the measurement device with respect to the base;
a probe end disposed between the measurement device and the first end;
a first bus for communication with the electronic circuit, wherein at least a portion of the first bus is an optical communication bus configured to transmit light; and
a rotary coupler having a first portion and a second portion, the second portion configured to rotate relative to the first portion about a first axis, a first bearing having first part and a second part, the first part affixed to the first portion and the second part affixed to the second portion, a second bearing having a third part and a fourth part, the third part affixed to the first portion and the fourth part affixed to the second portion, the first portion affixed to the first arm segment, the second portion coupled to the second arm segment, the rotary coupler configured to transfer the transmitted light through the optical communication bus between the first portion and the second portion;

wherein the rotary coupler includes the at least one position transducer of the first arm segment that measures the rotation of the second portion about the first axis and includes a first element and a second element, the first element affixed to the first portion and the second element affixed to the second portion, the first element being one of the group consisting of a periodic pattern of a measurable quantity and a first read head spaced from and in communication with the periodic pattern of a measurable quantity, and the second element being the other of the group consisting of the periodic pattern of a measurable quantity and the first read head spaced from and in communication with the periodic pattern of a measurable quantity.

2. The portable AACMM of claim 1, wherein the first arm segment is rotatable by at least 360° about the first axis.

3. The portable AACMM of claim 2 wherein the rotation about the first axis may take on any value.

4. The portable AACMM of claim 1, further comprising a second bus coupled for electrical communication between the probe end and the electronic circuit, wherein the second bus and the optical communication bus are configured to operate simultaneously.

5. The portable AACMM of claim 4 wherein the rotary coupler is a hybrid coupler configured to transfer electrical signals on the second bus between the first portion and the second portion.

6. The portable AACMM of claim 1 wherein the rotary coupler includes a first lens and a second lens with a gap therebetween, the first lens affixed to the first portion and the second lens affixed to the second portion, the first lens and the second lens being coupled to the optical communication bus, the first lens and the second lens being configured to transfer the light therebetween.

7. The portable AACMM of claim 1, further comprising an accessory device coupled to the optical communication bus.

8. The portable AACMM of claim 7 further comprising a transceiver coupled for communication between the accessory device and the optical communication bus, the transceiver configured to convert an electrical signal from the accessory device to an optical signal and to place the optical signal onto the optical communication bus.

9. The portable AACMM of claim 7 further comprising a transceiver coupled for communication between the accessory device and the optical communication bus, the transceiver configured to convert an optical signal on the optical communication bus into an electrical signal and to send the electrical signal to the accessory device.

10. The portable AACMM of claim 7 wherein the accessory device is further coupled to a second bus, the second bus coupled for electrical communication between the probe end and the electronic circuit.

11. The portable AACMM of claim 1 further comprising a transceiver configured to convert an optical signal on the optical communication bus into an electrical signal and to send the electrical signal to the electronic circuit.

12. The portable AACMM of claim 1 wherein the probe end is affixed to the second portion.

13. A rotary coupler transducer cartridge comprising:
a mechanical assembly including a first portion and a second portion, wherein the first portion is configured to rotate relative to the second portion about a first axis;
a first bearing having a first part and a second part, the first part affixed to the first portion and the second part affixed to the second portion;
a second bearing having a third part and a fourth part, the third part affixed to the first portion and the fourth part affixed to the second portion;
a transducer configured to measure an angle of rotation of the first portion about the first axis, the transducer including a first element and a second element, the first element affixed to the first portion and the second element affixed to the second portion, wherein the first element includes a periodic pattern of a measurable characteristic and the second element includes a first read head spaced from and in communication with the periodic pattern; and
a rotary coupler having a first component and a second component, the first component attached to the first portion and the second component attached to the second portion, the first component attached to a first end of a first optical fiber and the second component attached to a second end of a second optical fiber, wherein the rotary coupler transducer cartridge is configured to transmit light between the first optical fiber and the second optical fiber and measure the angle of rotation.

14. The rotary coupler transducer cartridge of claim 13 wherein the second element further includes a second read head spaced from and in communication with the periodic pattern.

15. The rotary coupler transducer cartridge of claim 13 wherein the angle of rotation may vary by at least 360 degrees.

16. The rotary coupler transducer cartridge of claim 15 wherein the angle of rotation may take on any value.

17. The rotary coupler transducer cartridge of claim 13 wherein the first component includes a first lens and the second component includes a second lens, the first lens and the second lens configured to transfer the light therebetween.

18. The rotary coupler transducer cartridge of claim 13 further comprising a slip ring, the slip ring including a first conductor and a second conductor, the first conductor attached to the first portion and the second conductor attached to the second portion, the slip ring configured to transmit an electrical signal between the first conductor and the second conductor.

19. The rotary coupler transducer cartridge of claim 18 wherein the angle of rotation may vary by at least 360 degrees.

20. The rotary coupler transducer cartridge of claim 19 wherein the angle of rotation may take on any value.

* * * * *